US012765481B2

(12) United States Patent
Nishimura et al.

(10) Patent No.: US 12,765,481 B2
(45) Date of Patent: Oct. 20, 2026

(54) NUTRIENT SOLUTION TRAY

(71) Applicant: PLANTX CORP., Tokyo (JP)

(72) Inventors: Shin Nishimura, Tokyo (JP); Kazutaka Ohshima, Tokyo (JP)

(73) Assignee: PLANTX CORP., Tokyo (JP)

( * ) Notice: Subject to any disclaimer, the term of this patent is extended or adjusted under 35 U.S.C. 154(b) by 0 days.

(21) Appl. No.: 18/689,850

(22) PCT Filed: Sep. 9, 2022

(86) PCT No.: PCT/JP2022/033976
§ 371 (c)(1),
(2) Date: Mar. 6, 2024

(87) PCT Pub. No.: WO2023/038130
PCT Pub. Date: Mar. 16, 2023

(65) Prior Publication Data

US 2024/0292795 A1 Sep. 5, 2024

(30) Foreign Application Priority Data

Sep. 10, 2021 (JP) ................................ 2021-147489
Apr. 6, 2022 (JP) ................................ 2022-063600

(51) Int. Cl.
*A01G 31/06* (2006.01)
*A01G 9/24* (2006.01)

(52) U.S. Cl.
CPC ............. *A01G 31/06* (2013.01); *A01G 9/247* (2013.01)

(58) Field of Classification Search
CPC ................................ A01G 31/06; A01G 9/247
See application file for complete search history.

(56) References Cited

U.S. PATENT DOCUMENTS 4,493,163 A * 1/1985 de Monbrison ....... A01G 31/06 47/61
4,685,246 A * 8/1987 Fennell .................. A01G 9/028 47/85

(Continued)

FOREIGN PATENT DOCUMENTS

CN 105075817 A 11/2015
JP 1992-067251 U1 9/1993

(Continued)

OTHER PUBLICATIONS

Partial Supplementary European Search Report dated Jul. 17, 2025 as received in Application No. 22867451.1.

*Primary Examiner* — Marisa V Conlon
(74) *Attorney, Agent, or Firm* — Maschoff Brennan

(57) ABSTRACT

The present invention provides a system for changing an interval between plants without performing thinning work or transplanting work of plants. The nutrient solution tray is configured to include: a receptacle part for housing a plant, a nutrient solution-inflow area for allowing inflow of water or nutrient solution, and a nutrient solution-outflow area having at least one nutrient solution-outflow port for allowing the water or the nutrient solution to flow out. At least the receptacle part, the nutrient solution-inflow area, and the nutrient solution-outflow area form a bottom surface of the nutrient solution tray. The nutrient solution tray includes a first installation surface pair comprising a first installation surface and a second installation surface. The first installation surface is formed in a side of the nutrient solution-inflow area in a longer side direction of the nutrient solution tray. The second installation surface is formed in a side of the nutrient solution-outflow area in the longer side direction (Continued)

of the nutrient solution tray. The first installation surface is farther away from the bottom surface than the second installation surface.

11 Claims, 64 Drawing Sheets

(56) References Cited

U.S. PATENT DOCUMENTS

| | | | | |
|---|---|---|---|---|
| 7,278,237 | B2 * | 10/2007 | Okabe | A01G 9/246 47/60 |
| 8,984,806 | B2 * | 3/2015 | Uchiyama | A01G 9/24 47/17 |
| 9,032,664 | B2 * | 5/2015 | Yusibov | A01G 31/06 47/62 N |
| 9,854,750 | B2 * | 1/2018 | Brusatore | A01G 31/06 |
| 11,246,274 | B2 * | 2/2022 | Zhan | A01G 7/02 |
| 11,337,387 | B2 * | 5/2022 | Adams | A01G 27/02 |
| 11,849,685 | B2 * | 12/2023 | Travaglini | F24F 7/08 |
| 2010/0115837 | A1 * | 5/2010 | Van Der Poel | A01G 7/045 47/66.6 |
| 2022/0225581 | A1 | 7/2022 | Akiyama et al. | |
| 2023/0225260 | A1 | 7/2023 | Ohshima et al. | |

FOREIGN PATENT DOCUMENTS

| | | | |
|---|---|---|---|
| JP | 1995-034642 | U1 | 6/1995 |
| JP | 1996-266174 | A | 10/1996 |
| JP | 2011-030578 | A | 2/2011 |
| JP | 2020-071382 | A | 5/2020 |
| JP | 2020-137417 | A | 9/2020 |
| JP | 2020-141566 | A | 9/2020 |
| JP | 2021-166495 | A | 10/2021 |
| WO | 2021/024583 | A1 | 2/2021 |

* cited by examiner (a)

(b)

(a)

(b)

NUTRIENT SOLUTION TRAY

CROSS-REFERENCE TO RELATED APPLICATIONS

This application claims priority of Japanese Patent Application No. 2021-147489 entitled "PLANTING POT AND NUTRIENT SOLUTION TRAY" filed on Sep. 10, 2021, and Japanese Patent Application No. 2022-063600 entitled "PLANTING POT AND NUTRIENT SOLUTION TRAY" filed on Apr. 6, 2022, and the respective contents of which are incorporated herein by reference in its entirety.

TECHNICAL FIELD

The present invention relates to a nutrient solution tray.

BACKGROUND

As a background art of the present technical field, there is a document of Japanese Patent Application No. 2020-071382 (Patent Document 1). This document discloses "a plant cultivation device which includes a plurality of sensors for monitoring a growing condition of a plant to be cultivated; an environment management means for managing an environment which is a condition of at least one of light, air, water, and space in the plant cultivation device; and a process management means for managing a work process for cultivating the plant (refer to the Abstract)."

PRIOR ART DOCUMENT

[Patent Document 1] Japanese Patent Application No. 2020-071382

SUMMARY OF THE INVENTION

Problem to be Solved by the Invention

In the above-mentioned Patent Document 1, a system for carrying out both of the environment management within the device at the plant cultivation device, and the process management for the work processes for cultivating plants is disclosed. However, this patent document does not fully disclose a system for more easily cultivating plants or for cultivating plants in a more proper environment.

Accordingly, the present invention provides a system for changing an interval between plants without performing thinning work or transplanting work of plants.

Means for Solving the Problem

In order to solve the above-mentioned problems, for example, the configurations described in the claims can be adopted.

Although the present application includes a plurality of means for solving the above-mentioned problems, for example, according to an embodiment, a nutrient solution tray is provided. The nutrient solution tray is configured to include: a receptacle part for housing a plant, a nutrient solution-inflow area for allowing inflow of water or nutrient solution, and a nutrient solution-outflow area having at least one nutrient solution-outflow port for allowing the water or the nutrient solution to flow out. In addition, at least the receptacle part, the nutrient solution-inflow area, and the nutrient solution-outflow area form a bottom surface of the nutrient solution tray. The nutrient solution tray includes a first installation surface pair comprising a first installation surface and a second installation surface. The first installation surface is formed in a side of the nutrient solution-inflow area in a longer side direction of the nutrient solution tray.

The second installation surface is formed in a side of the nutrient solution-outflow area in the longer side direction of the nutrient solution tray. Also, the first installation surface is farther away from the bottom surface than the second installation surface.

Effect of the Invention

According to the present invention, it is possible to provide a system or the like for more easily cultivating plants or for cultivating plants in a more proper environment.

Problems, configurations and effects other than those described above will be clarified by the following description of the embodiment.

BRIEF DESCRIPTION OF THE DRAWINGS

FIG. 21 depicts an example showing a top view and a bottom view of the nutrient solution tray.

FIG. 63 depicts an example giving another explanation of a spacing of the cultivation plate including plants having biased growing areas.

DESCRIPTION OF THE PREFERRED EMBODIMENTS

Hereinafter, examples will be described with referring to the figures.

Example 1

A planting pot and a nutrient solution tray of the present example are configured to be used, for example, in an artificial-light-type plant factory or the like, and preferably in a plant factory having a large production scale, while managing the cultivation environment is considered as difficult in the conventional type.

The term of a "planting pot" can be replaced with a "nursery pot" or "cultivation pot". The planting pot of the present example is configured to be capable of changing an interval (or space) between the pots so that it is especially distinguished from the conventional nursery pots or the cultivation pots.

In addition, the term of a "nutrient solution (or nourishing solution)" can be replaced with a "water or nutrient solution" in the following explanation, as long as such a replacement will not cause any contradiction in the technical contents.

Before describing the present example, the specific example of the above-mentioned plant factory will be described with referring to FIGS. 29 to 33.

Figure 29:
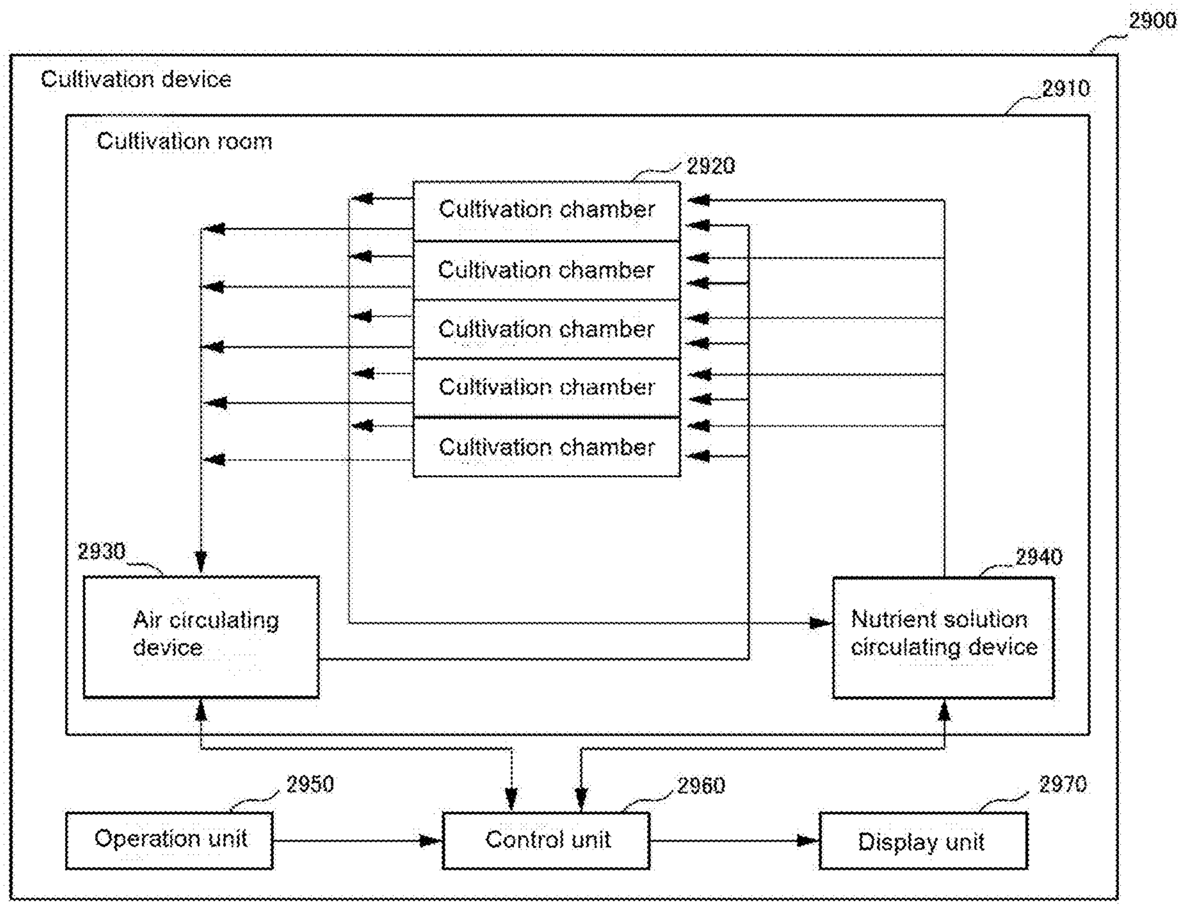
FIG. 29 depicts a functional block diagram showing a configuration of a cultivation device.

FIG. 29 depicts a functional block diagram showing a configuration of a cultivation device 2900 which is capable of being used in a plant factory.

The cultivating device 2900 includes a cultivation room 2910, a plurality of cultivation chambers 2920, an air circulating device 2930, a nutrient solution circulating device 2940, an operation unit 2950, a control unit 2960, and a display unit 2970.

The cultivation room 2910 is provided with a rectangular-shaped outer walls which are capable of sealing the inside thereof, and of maintaining the cultivation environment independent from the environment (temperature and/or humidity) of the working room of the plant factory in which the cultivation device 2900 is arranged. It is preferable to use a heat insulator as the material of the outer wall so as not to be affected by the environment of the working room which is outside of the cultivation room 2910.

Figure 30:
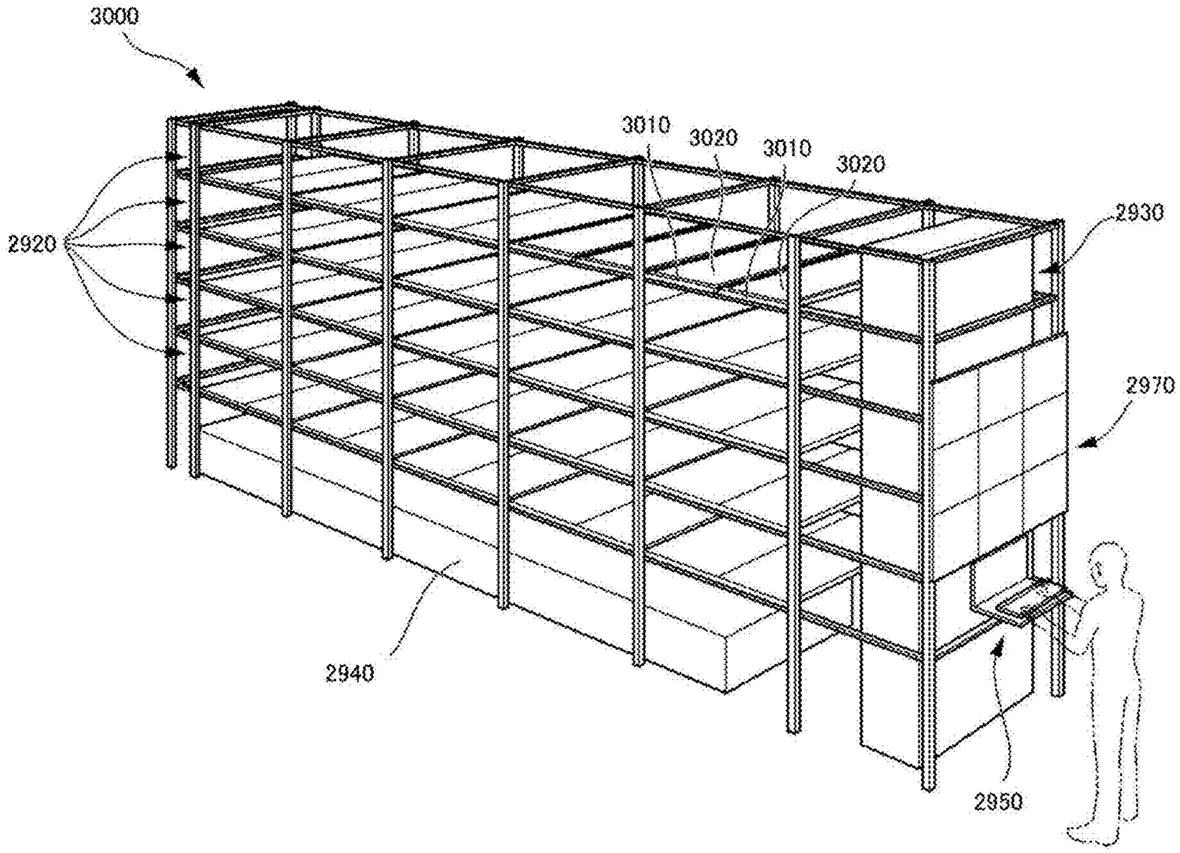
FIG. 30 depicts an example showing an inside of the cultivation device.

FIG. 30 depicts an example showing an inside of the cultivation device.

FIG. 30 depicts the cultivation device 2900 when the outer walls of cultivation room 2910 are removed.

Figure 31:
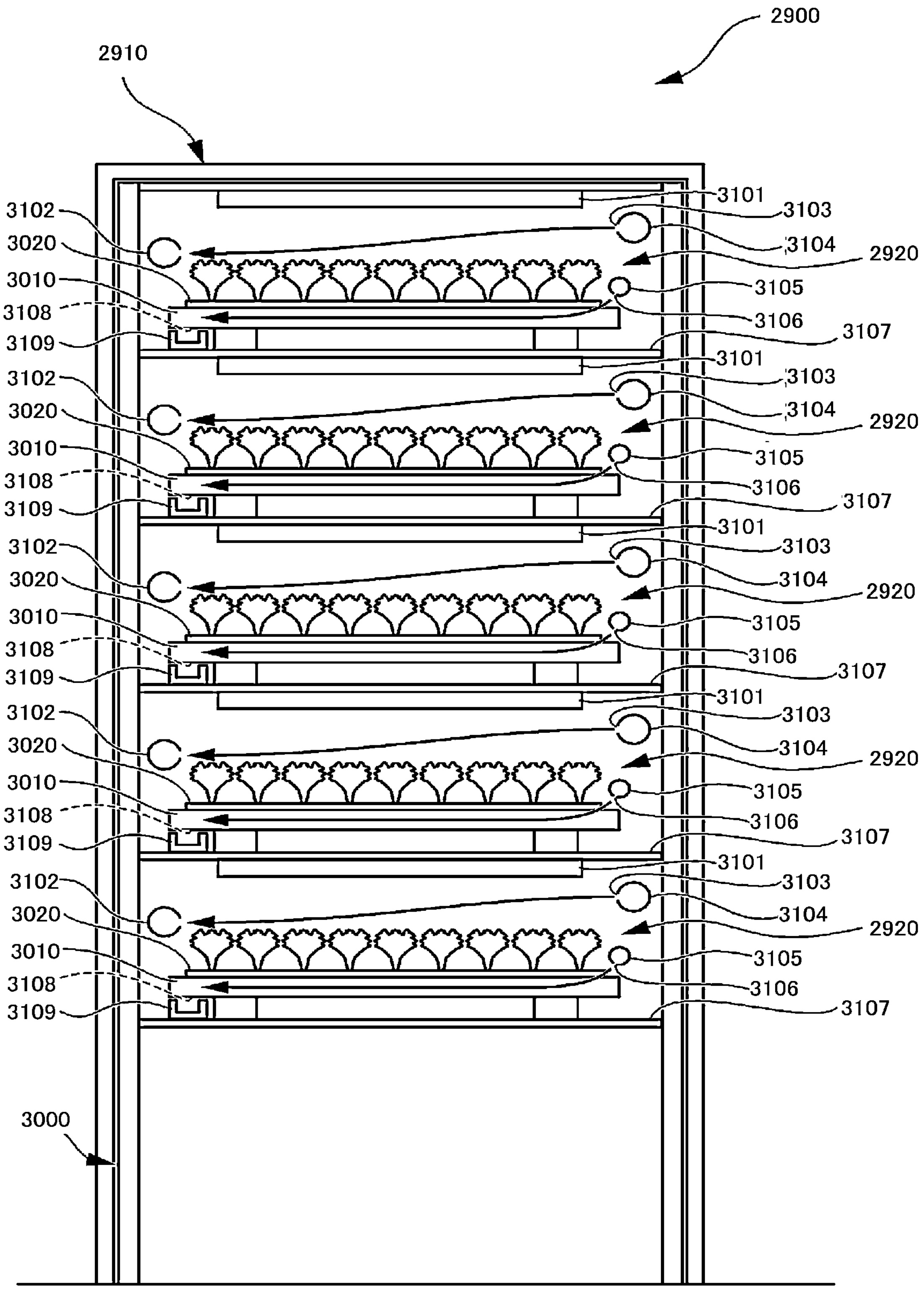
FIG. 31 depicts an example giving an explanation of the cross-sectional view of the cultivation room seen from a longer side direction.

FIG. 31 depicts an example giving an explanation of the cross-sectional view of the cultivation room 2910 seen from a longer side direction (or longitudinal direction).

Figure 32:
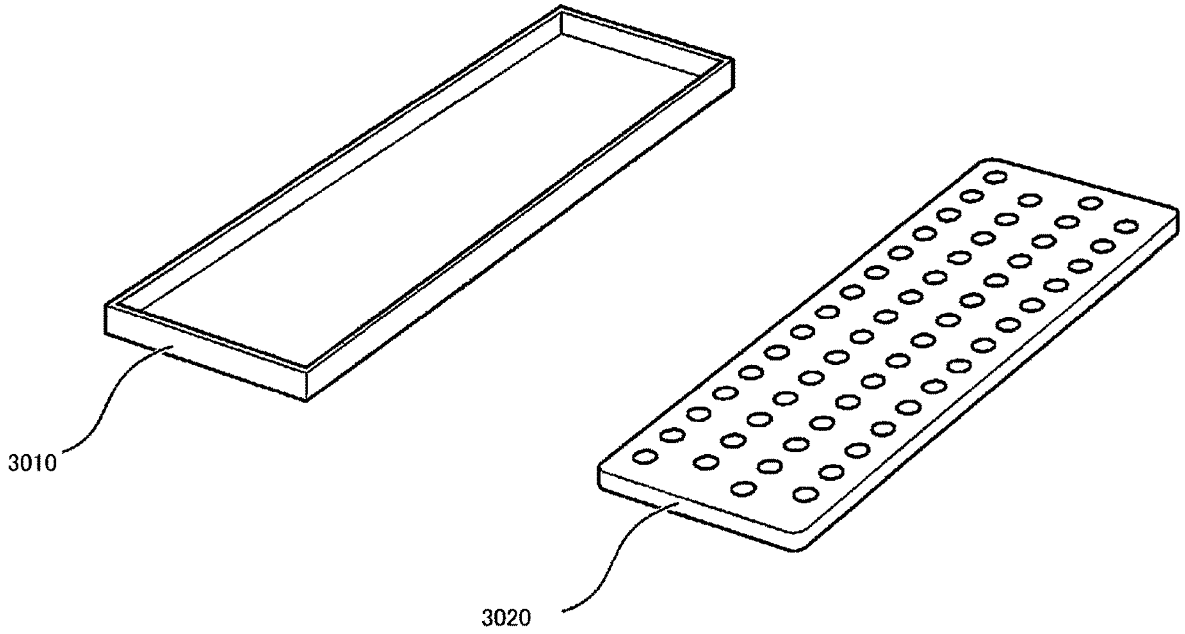
FIG. 32 depicts an example showing a cultivation plate and a cultivation tray which are arranged in a cultivation device.

The cultivation room 2910 is partitioned at predetermined intervals in the vertical direction by using cultivation shelves 3107 so that a plurality of cultivation chambers 2920 are defined as illustrated in FIG. 32. Each of the cultivation chambers 2920 is formed to have an approximately rectangular parallelepiped shape. The plurality of cultivation chambers 2920 may be configured by providing an exterior material to a conventionally known multistage type cultivation shelf. In the present embodiment, it is configured by providing an exterior material (or an outer wall of the cultivation room 2910) to a five-stage type cultivation shelf 3107.

FIG. 32 depicts an example showing a cultivation plate and a cultivation tray.

Figure 33:
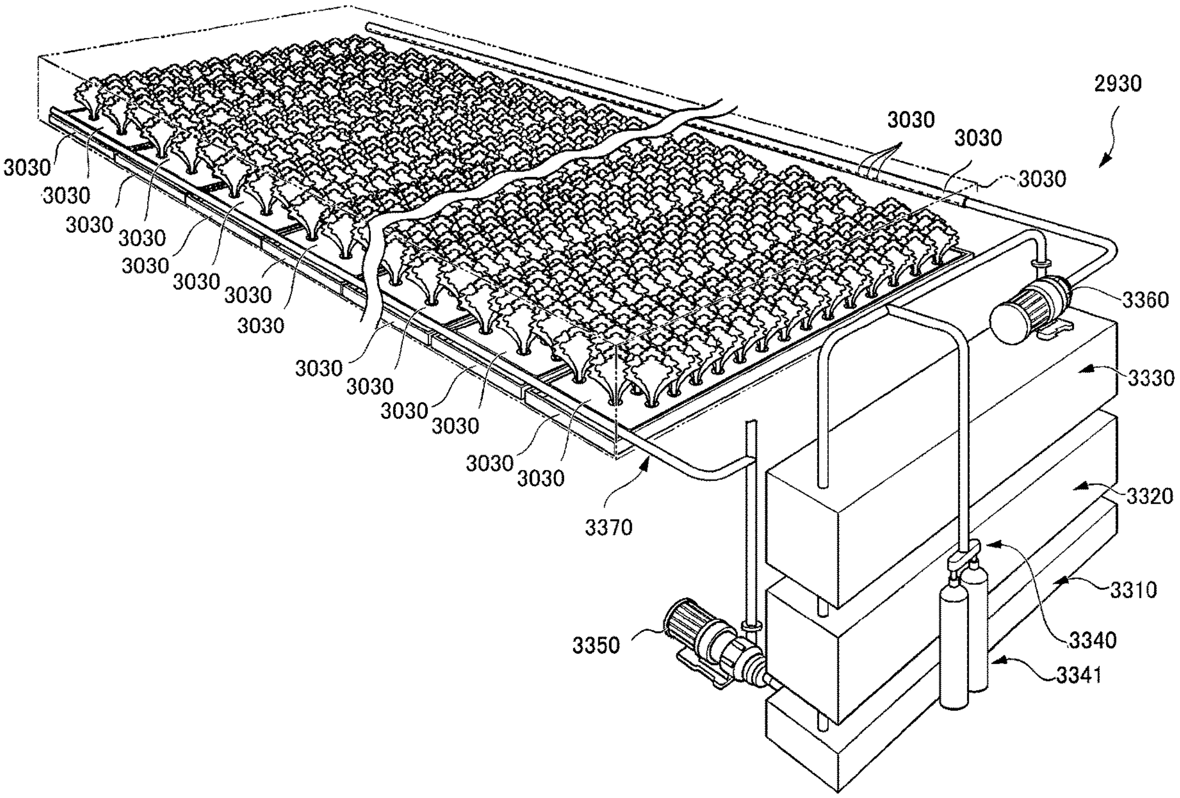
FIG. 33 depicts an example showing an air circulation device provided in the cultivation device.

In each of the cultivation chambers 2920, a plurality of nutrient solution trays 3010 and cultivation plates 3020 are provided as illustrated in FIG. 33. In this case, a shorter side direction (or lateral direction) of the nutrient solution trays 3010 and the cultivation plates 3020 are directed in a longer side direction of the cultivation chamber 20A as illustrated in FIG. 33. The nutrient solution tray 3010 has a substantially same size as that of the rectangular cultivation plate 3020, and the nutrient solution tray 3010 is configured as a rectangular tray so as to fit and arrange the cultivation plate 3020 therein. In this embodiment, sixteen items are provided on each of the cultivation chambers 2920 in a state in which the cultivation plate 3020 is fitted into the nutrient solution tray 3010 having a size of approximately 30 cm×120 cm as illustrated in FIG. 33. The number of items may be increased depending on the size of the cultivation device illustrated in FIG. 29.

As for the shape of the cultivation chamber 2920, it is preferable that the cultivation chamber 2920 has a lengthy shape in which a length in a longer side direction is more than double a length in a shorter side direction, because the cultivation chamber 2920 is preferably used in a plant factory having a relatively large scale of production. In the embodiment, the ratio of the length in the shorter side direction to the length in the longer side direction is one to five (or, the length in the shorter side direction: the length in the longer side direction=1:5). Please notice that the size of the cultivation chamber 2920 (or the number of the cultivation plates 3020 arranged in the cultivation chamber 2920) is not limited to the above-mentioned size of the embodiment.

In addition, according to the embodiment, the nutrient solution tray 3010 and the cultivation plate 3020 are depicted as being rectangular. Please notice that the shapes are not limited to the example. For example, the shapes may be a square. In such a case, one side of the square cultivation plate 3020 is arranged in the longer side direction of the cultivation chamber 2920.

In this manner, in a state where the nutrient solution trays 3010 are arranged, each of the plurality of cultivation chambers 2920 is in a closed condition or semi-closed condition.

In the nutrient solution trays 3010, a discharge port 3108 for discharging a supplied nutrient solution (see FIG. 31) is formed on one end side in the longer side direction (or downstream side of a flow of the nutrient solution). In addition, the nutrient solution tray 2920 is provided with an inclined surface which is inclined at a predetermined angle (for example, about 1 degree) with respect to the shorter side direction of the cultivation chamber 2920. As a result, a downstream side of a flow of the nutrient solution is lowered. Consequently, the supplied nutrient solution will not stay in the nutrient solution tray 3010, and a flow will be created in one direction at a predetermined flow rate according to a flow rate of the supplied flow. Further, a nutrient solution collect pipe 3109 is arranged below of the discharge port 3108 (see FIG. 31).

Please notice that the nutrient solution tray 3010 may not have a size corresponding to one cultivation plate 3020. It is possible to configure the nutrient solution tray 3010 to arrange a plurality of cultivation plates 3020 therein.

Further, as depicted in FIG. 31, an artificial light source 3101 is provided above each of the cultivation chambers 2920, and a light control device for dimming the artificial light sources 3101 is connected to them. In the embodiment, two artificial light sources 3101 are arranged in the longer side direction of the nutrient solution tray 3010 and that of the cultivation plate 3020 (or in the shorter side direction of the cultivation chamber 2920). It is preferable to use an LED that consumes less power and is able to be configured to be thin, as the artificial light source 3101. Also, it is possible to use a fluorescent lamp as the artificial light source.

FIG. 33 depicts an example showing an air circulation device provided in the cultivation device.

Explanation is given to the configuration of the air circulation device 2930 with referring to FIG. 33. The air circulation device 2930 may have a function of adjusting at least a temperature, a humidity, a carbon dioxide concentration, and a flow rate (or an amount of flow) of air. The air circulation device 30 of the embodiment is configured to include an air sterilization device 3310; a direct expansion type air conditioner 3320 (or an air conditioner of a type of using a refrigerant for directly cooling air) having functions of heating, cooling and dehumidifying; a humidifying device 3330 having a humidifying function; a carbon dioxide supply device 3340 for adjusting a carbon dioxide concentration; a suction pump 3350; and a compression pump 3360.

As a device having a function of adjusting a temperature, it is possible to use an indirect expansion type chiller device (or a chiller device of a type of using a refrigerant for cooling air via water).

Each of the cultivation chambers 2920 and the air circulation device 2930 are connected via an air collect pipe 3370 and an air supply pipe 3830. The air collect pipe 3370 and the air supply pipe 3380 extend in the longer side direction of the cultivation chamber 2920. In the air collect pipe 3370, a plurality of air collect ports are formed at predetermined intervals. Also, in the air supply pipe 3380, a plurality of air supply ports 3381 are formed at predetermined intervals. A constant flow rate valve (not shown) is also provided for these air supply ports 3381.

Further, in each of the cultivation chambers 20A, a temperature sensor, a humidity sensor, and a carbon dioxide concentration sensor (not shown) are provided at predetermined locations for monitoring a temperature, a humidity, and a carbon dioxide concentration of the circulating air.

By using the suction pump 3350, an air is collected from each of the cultivation chambers 2920 via the air collect pipe 3370. Then. the air is sterilized through the air sterilization device 3310 and sent to the air conditioner 3320. In the air conditioner 3320, the temperature adjusting and the dehumidifying are carried out in accordance with measurement results obtained from the temperature sensor and the humidity sensor. Then, the humidifying is carried out in the humidifying device 3330. Thereafter, in the carbon dioxide supply device 3340, a carbon dioxide is supplied from a carbon dioxide supply source 3341 such as a carbon dioxide cylinder or the like according to measurement results obtained from the carbon dioxide concentration sensor. Then, the air adjusted to a predetermined condition and a predetermined flow rate is supplied to each of the cultivation chambers 2920 through the air supply pipe 3380 by using the compression pump 3360.

The set value of the flow rate of the air may be fixed. Alternatively, the set value may be made variable.

As depicted in FIG. 31, a flow direction of air in the cultivation chamber 2920 is oriented in the shorter side direction of the cultivation chamber 2920. Consequently, compared with a case where a flow direction of air is oriented in the longer side direction of the cultivation chamber 2920, it becomes possible to shorten a time period from supplying of air to collecting of air. Therefore, it becomes possible to suppress a change in the cultivation environment such as a temperature, a humidity, a carbon dioxide concentration or the like occurring on the upstream side and the downstream side of the air flow.

Without being limited by the above-mentioned case, a flow direction of air in the cultivation chamber 2920 may be oriented from the upper side to the lower side of the cultivation chamber 2920.

In the embodiment, one cultivation device 2900 is configured to include one cultivation room 2910, and the one cultivation room 2910 is configured to include a plurality of cultivation chambers 2920 and one air circulation device 2930 in order to provide an air from the single air circulation device 2930 to a plurality of cultivation chambers 2920.

However, without being limited by this, one cultivation device 2900 may include one cultivation room 2910, and the one cultivation room 2910 may include a plurality of cultivation chambers 2920 and a plurality of air circulation devices 2930 corresponding to each of the cultivation chambers 2920 so that an air may be provided from the corresponding air circulation devices 2930 to each of the cultivation chambers 2920. In this case, it becomes possible to change a temperature, a humidity, a carbon dioxide concentration, a flow rate (or an amount of flow) and the like of the circulating air for each of the cultivation chambers 2920.

In addition, one cultivation device 2900 may include a plurality of cultivation rooms 2910, and each of the cultivation rooms 2910 may include a plurality of cultivation chambers 2920 and one air circulation device 2930.

Further, one cultivation device 2900 may include a plurality of cultivation rooms 2910, and each of the cultivation rooms 2910 may include a plurality of cultivation chambers 2920 and a plurality of air circulation devices 2930 corresponding to each of the cultivation chambers 2920.

As depicted in FIG. 30, the nutrient solution circulation device 2940 is provided below the cultivation room 2910 to supply a nutrient solution which is adjusted to a predetermined condition, to the nutrient solution trays 3010 of the respective cultivation chambers 2920 at a predetermined flow rate. The nutrient solution circulation device 2940 is also configured to collect the nutrient solution that has passed through the respective nutrient solution trays 3010, and to adjust the collected nutrient solution to satisfy a predetermined condition. The nutrient solution circulation device 2940 repeats these tasks to circulate and supply a nutrient solution.

The above-mentioned cultivation device is suitable to provide a uniform or desired growth environment for plants regardless of environmental changes, but as in the case of conventional plant cultivation, it is necessary to extend the interval between individual plants according to the growth condition of plants to be cultivated, that is, to perform thinning out plants in accordance with the growth of the plants.

However, usually, a root(s) of a plant which is thinned out (or which is extracted from a field or a pot) is often damaged or deformed, and the thinned out plants are often discarded as such. In addition, even if the extracted plant is transplanted to another cultivation site, there are many times that the plant is not capable of growing as scheduled compared with a case where a plant is not thinned out, due to the above-mentioned damage or deformation of the root or the changes in the environment.

For example, in a case where a plant to be cultivated is a plant which is capable of being used as a source of valuable effective ingredients, or is a vegetable or fruit having high functionality to which the improvement of the nutritional value is recognized as compared to before, economical losses will be greatly caused by the disposal of these extracted plants.

In order to resolve the problem that the light receiving quantity per unit area of an individual leave tends to decrease due to overlapping of leaves accompanied by the growth of the plant, it is conceivable that the interval is widely taken with the assumption that the size of the plant is increased. However, this will result in occurring of vacant spaces and deterioration of the area-utilization efficiency because each plant is initially small.

In addition, it is conceivable that a plant is transplanted after the growth of the plant for a period of time to adjust the interval, combined with the thinning work of the plant, for achieving both the light receiving quantity and the area-utilization efficiency of the plant. However, it is difficult to prevent the occurrence of fracture or cutting of roots or leaves at the time of the work, as described above, and accordingly, there is a risk that the growth rate may be decreased.

These problems can be solved by using the planting pot and the nutrient solution tray of the present embodiments. In particular, it is possible to rapidly and easily carry out the thinning work (or spacing work), in the above-mentioned cultivation device, to avoid the occurrence of entanglement or collision of roots of the plant at a lower side of the pot, or the excessive overlapping of leaves of the plant at a upper side of the pot, etc. Thereby, it is possible to excellently promote the growth of the plant after the thinning work.

So far, explanation of specific examples of the plant factory, the cultivation device, or the like suitable for use of the planting pot and the nutrient solution tray of the present embodiment has been given with referring to FIGS. 29 to 36. However, the planting pot and the nutrient solution tray of the present embodiment can be used in different environments. The planting pot and the nutrient solution tray of the present embodiment can be used for the house cultivation such as using a vinyl house or a glass house, the open field cultivation at the outdoors, or the home garden, etc.

The planting pot and the nutrient solution tray of the embodiment are capable of providing a rapid and easy system, for a user, to change the interval between the pot holes, in other words, the interval between plants without necessity to extract the plants from the pot holes, in both environments.

Figure 1:
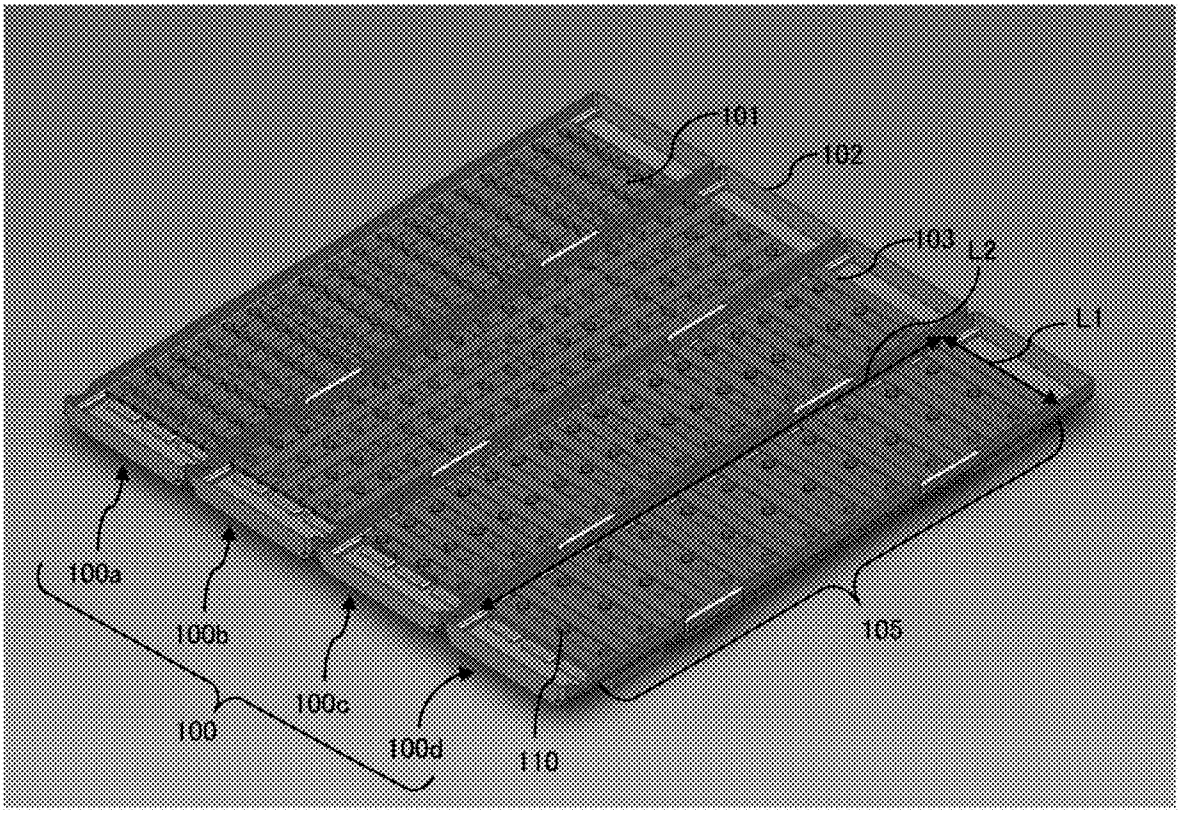
FIG. 1 depicts an example showing a perspective view of planting units in different spacing conditions for comparing them.

FIG. 1 depicts an example showing a perspective view of planting units in different spacing conditions for comparing them.

In FIG. 1, four planting units 100 (from 100*a* to 100*d*) having different spacing conditions of pot holes 110 are illustrated. The planting units 100 (from 100*a* to 100*d*) are capable of being used to cultivate plants in an appropriate spacing condition within a prescribed period from the sowing, for example, from sowing to harvesting, or from sowing to transplanting plants into a large facility or field. For example, the respective planting units 100 can also be utilized as a nursery unit (as a combination of a nursery pot and a nutrient solution tray).

In the planting unit 100*a*, the respective planting pots 101 are pots each having three pot holes 110, and are housed or housed in a planting-pot-receptacle area (or planting-pot-housing area) 105 of the nutrient solution tray 102. In addition, in the planting unit 100*b* to 100*d*, the planting pot 101 and a spacer 103 are housed in the nursery-pot-receptacle area 105 of the nutrient solution tray 102.

In the planting-pot-receptacle area 105 of the planting unit 100*a* to 100*d*, the planting pot 101 and the spacer 103 are arranged in respectively different states with regard to the orientation of the planting pot 101 and the spacer 103, and in addition, to the extending/contracting condition of the planting pot 101, and to the orientation of the planting pot 101 and the spacer 103 (for example, a relation of the longer side direction of the planting pot 101 and the spacer 103 regarding the longer side direction of the nutrient solution tray 102).

The nutrient solution tray 102 of the planting unit 100 is capable of housing the planting pot 101 in the planting-pot-receptacle area 105 in any of the extended state or the contracted state, and in any orientation state in which the longer side direction of the planting pot 101 is directed in the longer side direction or the shorter side direction of the nutrient solution tray.

The sizes of the planting-pot-receptacle area 105 of the nutrient solution tray 102 are preferably designed such that the longest extended length of the planting pot 101 corresponds to a length L1 of a first side of the planting-pot-receptacle area 105; an integer multiple of the shortest extended length of the planting pot 101 corresponds to a length L2 of a second side of the planting-pot-receptacle area 105; and an integer multiple of the length of the width in the shorter side direction of the planting pot 101 corresponds to the length L2 of the second side of the planting-pot-receptacle area 105.

In the embodiment of FIG. 1, the planting pot 101 is capable of taking either one of the contracted state and the extended state by moving a component(s) constituting the planting pot 101 in the longer side direction of the growing pot 101. Two or more may be sufficient for the number of the components constituting the planting pot 101, but in the present specification, explanation will be mainly given with regard to a configuration having three components.

Each planting pot 101 is housed in either one of two states with different lengths in the longer side direction, in other words, in the contracted state or in the extended state, and in a state in which its longer side direction is oriented in either one of the longer side direction or the shorter side direction of the nutrient solution tray 102, regarding the planting pot 101.

The planting pot 101, the nutrient solution tray 102, and the spacer 103 are preferably constructed from a thermoplastic, particularly preferably from polypropylene (PP) or high impact polystyrene (HIPS). The materials which can be used for comprising the planting pot 101, the nutrient solution tray 102, and the spacer 103 further have the wear resistance, the light shading, the light resistance, the water resistance, or the like and preferably are elastic deformable.

In a case where a light source is used to promote to make plants grow, it is advantageous that the light source is arranged to efficiently throw light on leaves of the plants. However, even in such a case, it is preferable that an amount of light entering a nutrient solution is as small as possible in order to suppress the occurrence or growth of algae or the like in the nutrient solution.

In a case where the planting pot 101 and the spacer 103 are made of a light shading material, it becomes possible to make light not to enter nutrient solution which is flowing under the planting pot 101 and the spacer 103, and as a result, it becomes possible to suppress the occurrence or growth of algae or the like in the nutrient solution.

Preferably, the light resistance of the material of the planting pot 101, the nutrient solution tray 102, and the spacer 103 has a high light resistance to light, in particularly, to light of photosynthetic photon flux density (PPFD) which is intended to be used for the light source. For example, a material having the high light resistance to light having a wavelength in a range of from about 400 nm to about 700 nm, which is an absorbing wavelength area of chlorophyll, is preferred.

Considering the fact that ultraviolet light (or UV light) may be used to clean and sterilize the planting pot 101, the nutrient solution tray 102, and the spacer 103 after use, a material having the high light resistance to light having a wavelength in a range of from about 200 nm to about 300 nm is preferable A user can appropriately select the planting units 100*b* to 100*d* in different states and orientations in the nutrient solution tray 102 in order to adjust or change the interval of the pot holes 110 of the planting pot 101 for housing (or planting) plants at the planting pot 101 to be more suitable for the growing condition of the plants, in particularly, for the conditions of roots of the plants at the lower side of the planting pot 101 or the overlapping condition of leaves of the plants at the upper side of the planting pot 101.

Accordingly, plants are allowed to perform photosynthesis more efficiently even when the photosynthetic photon flux densities of light in the cultivation environment are the same.

The interval between the pot holes 110 is made variable, and accordingly, a work for extracting a plant from the pot hole 110 for thinning the plant is eliminated. As a result, the occurrence of damage or deformation of roots or leaves resulting from the extracting work can be avoided or suppressed.

In other words, it is possible to carry out the thinning work by changing the interval which is formed between the pot holes 110 of the planting unit 100 (from 100*b* to 100*d*) without extracting a plant from the respective pot holes 110. Therefore, the conventional problems resulting from the extracting plants from the pot holes 110 can be radically avoided.

Figure 2:
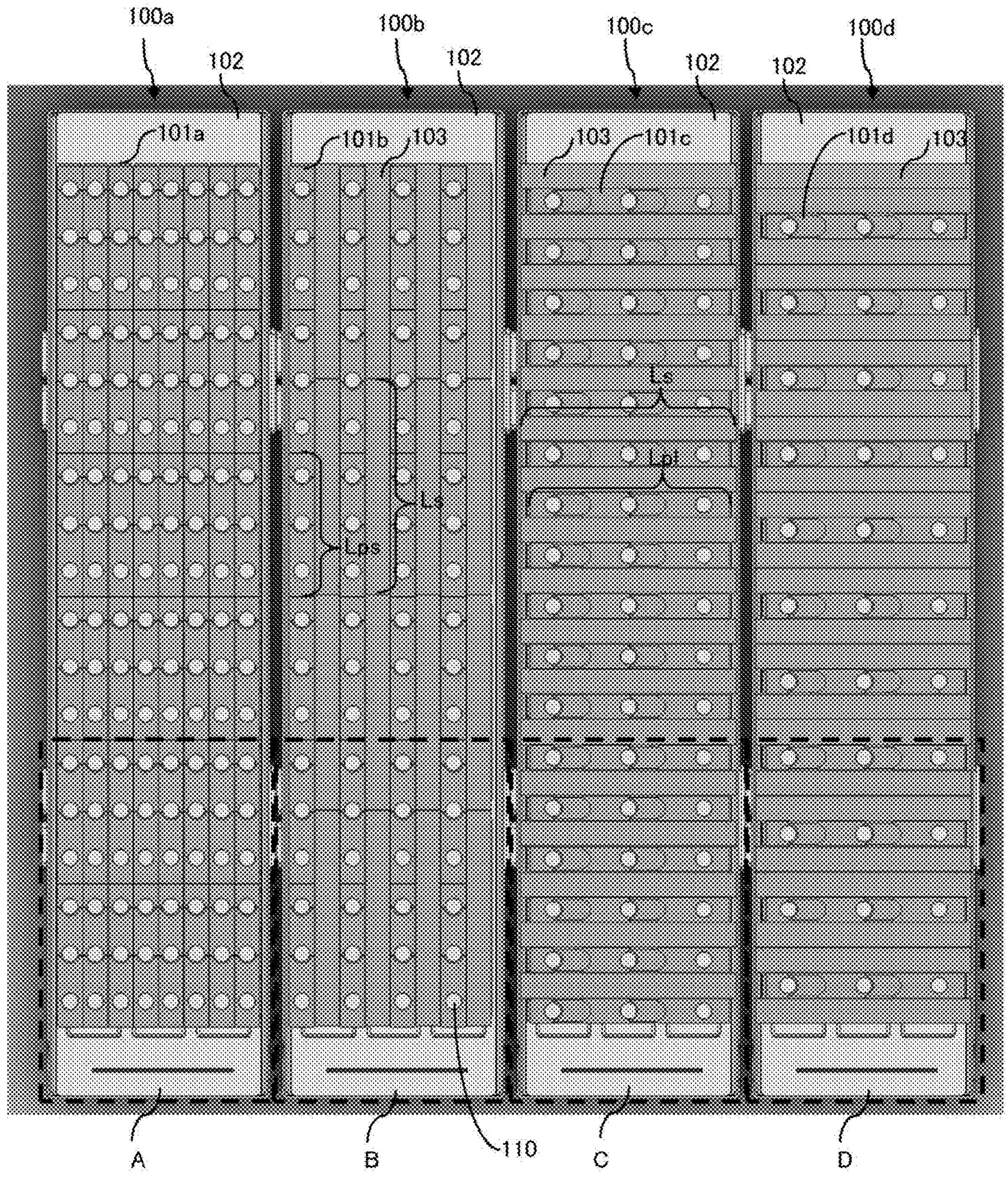
FIG. 2 depicts an example of a top view of the planting units in different spacing conditions for comparing them.

FIG. 2 depicts an example of a top view of the planting units in different spacing conditions for comparing them.

In FIG. 2, areas A to D are indicated by broken lines for the respective planting units 100*a* to 100*d*.

At the planting unit 100*a*, several planting pots 101*a* are contained in a contracted state in a nutrient solution tray 102. The longer side direction of the planting pot 101*a* is identical to the longer side direction of the nutrient solution tray 102 in the planting unit 100*a*.

At the planting unit 100*b*, the plurality of planting pot 101*b* in a contracted state and a plurality of spacers 103 are contained in the nutrient solution tray 102. The longer side direction of the planting pot 101*b* and that of the spacer 103 are identical to the shorter side direction of the nutrient solution tray 102 in the planting unit 100*b*. One spacer 103 is provided between the two planting pots 100*b*.

In the embodiment of FIG. 2, the length Ls in the longer side direction of the spacer 103 is approximately 1.5 times the length Lps in the longer side direction of the planting pot 101*b* in a contracted state. In a different embodiment, for example, the length Ls of the spacer 103 may be an integral multiple of the length Lps of the planting pot 101*b* in a contracted state.

The spacer 103 is configured to have not only the function for maintaining the interval of the planting pots 101*b*, but also the function for preventing light from entering into a nutrient solution contained in the nutrient solution tray 102. The spacer 103 is capable of surely cutting off light, and accordingly, it becomes possible to suppress the occurrence or growth of algae or the like in the nutrient solution tray 102.

At the planting unit 100*c*, a plurality of planting pot 101*c* in the extended state and a plurality of spacers 103 are arranged in the nutrient solution tray 102. The longer side direction of the planting pot 101*c* and that of the spacer 103 are identical to the shorter side direction of the nutrient solution tray 102 in the planting unit 100*c*. One spacer 103 is provided between the two planting units 100*c*.

In the embodiment of FIG. 2, the length Ls of the spacer 103 is slightly longer than the length Lpl in the longer side direction of the planting pot 101*c* in the extended state. As the length Ls of the spacer 103 is slightly longer than the length Lpl of the planting pot 101*c* in the extended state, the spacer 103 can cover the planting-pot-receptacle area 105 of the nutrient solution tray 102 in a wider range. Accordingly, the spacer 103 is capable of further reducing a light from entering into the nutrient solution tray 102.

At the planting unit 100*d*, a plurality of planting pot 101*d* in the extended state and a plurality of spacers 103 are arranged in the nutrient solution tray 102. The longer side direction of the planting pot 101*d* and that of the spacer 103 are identical to the shorter side direction of the nutrient solution tray 102 in the planting unit 100*d*. Two spacers 103 are arranged between the two planting units 100*c*.

A user can appropriately select and change the states of the planting units 100*a* to 100*d* in order to arrange the pot holes 110 in different intervals and to change the intervals of the pot holes 110.

More specifically, by selecting and changing the direction of the planting pot 101 and the spacer 103 and the length of the planting pot 101 in the planting unit 100, the intervals of plants to be planted in the pot holes 110 can be flexibly and easily changed.

According to FIGS. 1, 2, and to other figures, explanation is given to the embodiment in which only the planting pots 101 each having three pot holes are included in the planting unit 100. However, it is possible to combine a planting pot 101 of a different type having different number of pot holes, without changing the nutrient solution tray 102, as long as the extension length and the contraction length of the planting pot 101 are identical. Such a configuration is advantageous when cultivating different kinds of plants, particularly having different sizes, in a single planting unit 100.

The planting pots 101 of different type having different number of pot holes may be, for example, a combination of four or more pot pieces each having one pot hole. Also, it may be a combination of pot pieces each having two pot holes of different sizes (that is, a small one and a large one).

For example, when cultivating a main plant and an additional plant (for example, a so-called companion plant) in the same planting unit 100, it is possible to perform more suitable spacing between a plurality of kinds of plants having different sizes.

By growing or developing a plurality of kinds of plants in the single planting unit 100, advantageous effects can be expected comparing to a case in which only main plants are cultivated in the single planting unit of 100, especially, when cultivating them in a greenhouse such as a vinyl house or a glass house, in the open field cultivation at the outdoors, or in the home garden, etc. As advantageous effects of using the companion plants, for example, insect removal, promotion of fruiting, control and prevention of disease or the like can be expected.

In addition, a configuration in which the planting pots 101 having different number of pot holes of which the length of expansion/contraction is normalized can be used in the same planting unit 100 is advantageous in that it can cope with the cultivation of different plants, as described above. Especially, when a person carries out the plant cultivation, a space available for the plant cultivation is limited in comparison with the cases of the cultivation plants and farms. Therefore, the system in which such a limited space can be flexibly managed and used according to the individual person's request is advantageous.

Figure 3:
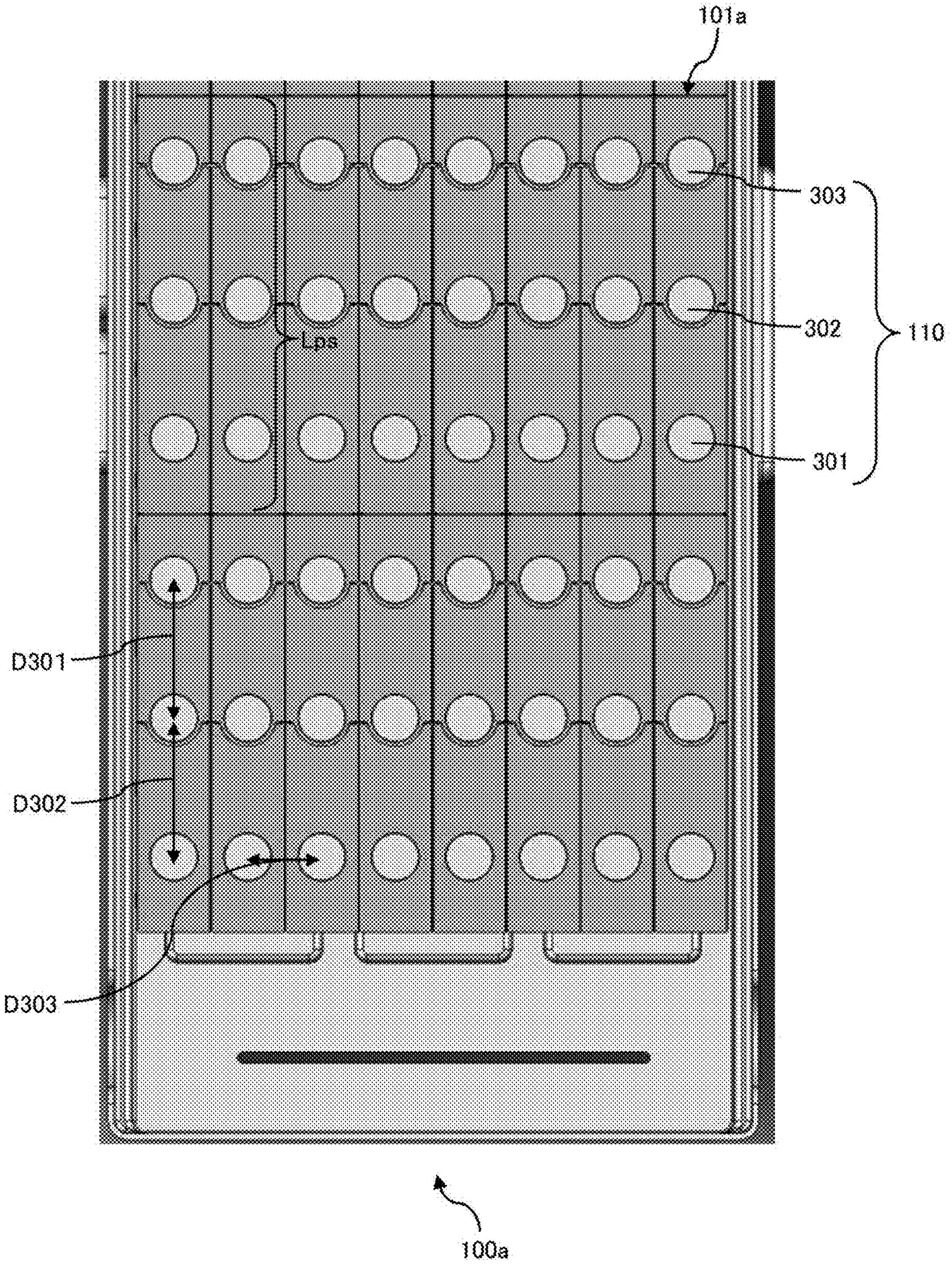
FIG. 3 depicts an example of enlarged view of an area A in FIG. 2.

FIG. 3 depicts an example showing an enlarged view of the area A in FIG. 2.

The interval D301 indicates a spacing between the first pot hole 301 and the second pot hole 302 of the planting pot 101*a* in the contracted state.

The interval D302 indicates a spacing between the second pot hole 302 and the third pot hole 303 of the planting pot 101*a* in the contracted state.

In the embodiment of FIG. 3, the interval D301 and the interval D302 are substantially the same, but it is possible to set the interval D301 and the interval D302 to different lengths.

The interval D303 indicates a spacing between the pot holes 110 of the two planting pots 101*a*.

In the descriptions below, the "interval of the pot holes" indicates a spacing formed between a center of a pot hole 110 and that of a different pot hole 110.

Therefore, when plants are planted in the planting unit 100*a* in a state of the embodiment illustrated in FIG. 3, the respective plants are placed apart in the longer side direction of the planting pot 101*a* at the interval of "D301=D302" of the two pot holes 110 and are placed apart in the shorter side direction of the planting pot 101*a* at the interval D303 of the two pot holes 110.

In the embodiment illustrated in FIG. 3, the interval of "D301=D302" formed between plants which are provided side by side in the longer side direction of the planting unit 100*a* is longer than the interval D303 formed between plants which are provided side by side in the shorter side direction of the planting unit 100*a* (that is, D301>D303, D302>D303). In other words, in the embodiment illustrated in FIG. 3, the plants provided in the shorter side direction of the planting unit 100*a* are arranged denser than the plants provided in the longer side direction of the planting unit 100*a* in the planting unit 100*a*.

Figure 4:
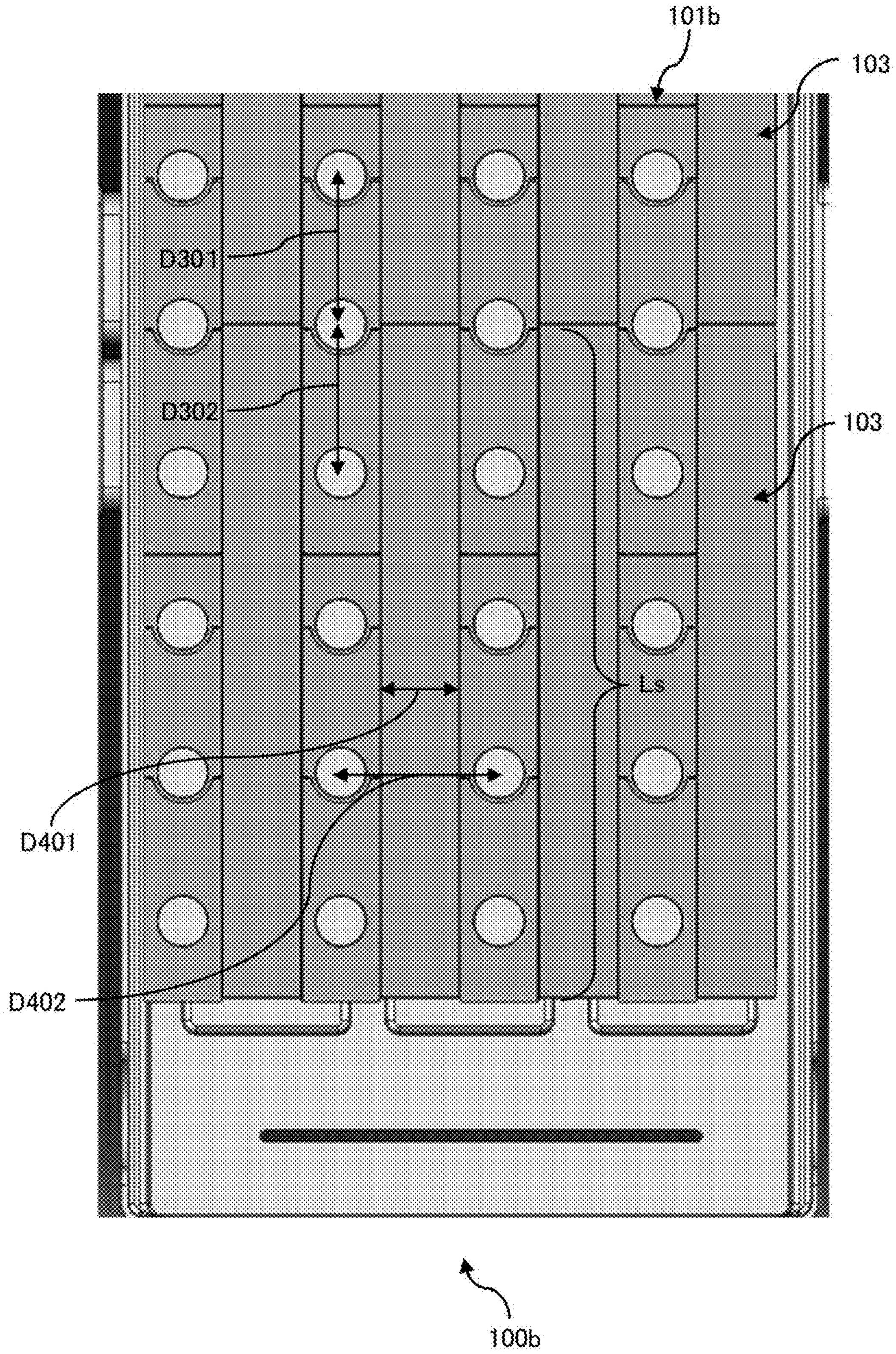
FIG. 4 depicts an example of enlarged view of an area B in FIG. 2.

FIG. 4 depicts an example showing an enlarged view of the area B in FIG. 2.

In the embodiment illustrated in FIG. 4, the interval between the two pot holes 110 in the longer side direction of the planting pot 101*b* is similar to the case of the embodiment illustrated in FIG. 3.

The interval D401 corresponds to a width in the shorter side direction of the spacer 103.

The interval D402 indicates a space formed between the pot holes 110 of the two planting pots 101*b* which are provided side by side in a state of interposing the spacer 103 between the two planting pots 101*b*. The interval D402 corresponds to the sum of the interval D303 in FIG. 3 and the interval D401 (that is, D402=D303+D401).

Therefore, in the embodiment of FIG. 4, the interval D402 which is formed between the plants provided side by side in the shorter side direction of the planting unit 100*b* is larger than the interval D303 which is formed between the plants provided side by side in the shorter side direction of the planting unit 100*a* (D402>D303). As a consequence, in the embodiment of FIG. 4, the pot holes 110 in the planting unit 100*b* are arranged at approximately equal intervals in the shorter side direction and the longer side direction of the planting unit 100*b*.

Accordingly, when plants are planted in the planting unit 100*b* in the state of the embodiment illustrated in FIG. 4, with regard to the respective plants, similar to the case in FIG. 3, the two pot holes 110 are arranged spaced apart at the interval of "D301=D302" in the longer side direction of the planting pot 101*b*, and the two pot holes 110 are arranged spaced apart at the interval D402 (=D303+D401) in the shorter side direction of the planting pot 101*b*.

A user can replace the planting pot 101*a* of the planting unit 100*a* in the state of the embodiment of FIG. 3 with the spacer 103 per one line so as to easily change it to the planting unit 100*b* in the state of the embodiment of FIG. 4. As a result, the two pot holes 110 arranged in the shorter side direction of the planting unit 100*a* are further separated by the interval D401.

Figure 5:
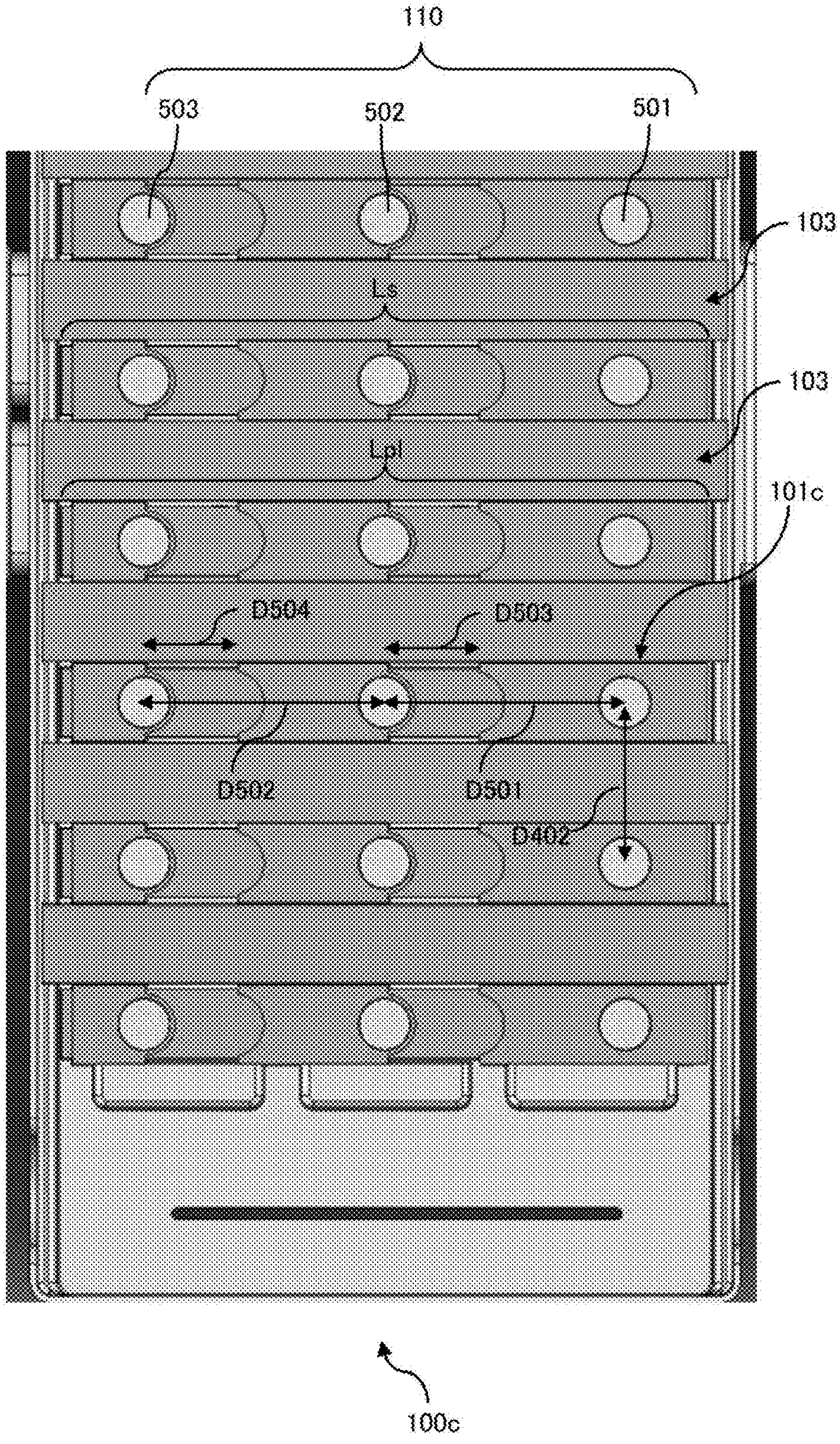
FIG. 5 depicts an example of enlarged view of an area C in FIG. 2.

FIG. 5 depicts an example showing an enlarged view of the area C in FIG. 2.

The interval D501 indicate a space which is formed between the first pot hole 501 and the second pot hole 502 of the planting pot 101*c* in the extended state. The interval D501 is longer than the interval D301 which is formed between the first pot hole 301 and the second pot hole 302 of the planting pot 101*a* in the contracted state, by the interval D503.

The interval D502 indicate a space which is formed between the second pot hole 502 and the third pot hole 503 of the planting pot 101*c* in the extended state. The interval D502 is longer than the interval D302 which is formed between the second pot hole 302 and the third pot hole 303 of the planting pot 101*a* in the contracted state, by the interval D504.

In the embodiment of FIG. 5, the interval D501 and the interval D502 are substantially the same, and also the interval D503 and the interval D504 are substantially the same. However, it is possible to set these intervals to different lengths.

In the embodiment of FIG. 5, the interval formed between the pot holes 110 of the two planting pots 101*c* which are provided side by side in a state of interposing the spacer 103 between the two planting pots 101*c*, in the longer side direction of the planting unit 100*c*, is apart by the interval D402 of the embodiment in FIG. 4. As stated above, the interval D402 is substantially the same as the interval of "D301=D302" in the longer side direction of the planting pot 101*b* of the embodiment in FIG. 4 (D301=D302 (nearly equal to) D402).

A user can extend the planting pot 101*b* in the contracted state in the planting unit 100*b* of the embodiment of FIG. 4 so as to transfer the planting pot 101*c* to the extended state. Subsequently, a user can rotate the planting pot 101*c* and the spacer 103 at an angle of 90 degrees so as to be placed in the nutrient solution tray 102. Accordingly, it becomes possible to disperse the pot holes 110 by further enlarging the interval in the shorter side direction of the planting pot 101*c* than the state of the planting unit 100*b* of the embodiment in FIG. 4 while maintaining the interval of "D301=D302 (D402)" in the longer side direction of the planting pot 101*b* of the embodiment in FIG. 4.

As a result, in the embodiment of FIG. 5, the interval of "D501=D502" between plants which are provided side by side in the shorter side direction of the planting unit 100*c* is larger than the interval D402 between plants which are provided side by side in the longer side direction of the planting unit 100*c* (D501>D402, D502>D402). In other words, in the embodiment of FIG. 5, with regard to plants in the planting unit 100*c*, the plants in the longer side direction of the planting unit 100*c* are arranged denser than the plants in the shorter side direction of the planting unit 100*c*.

Figure 6:
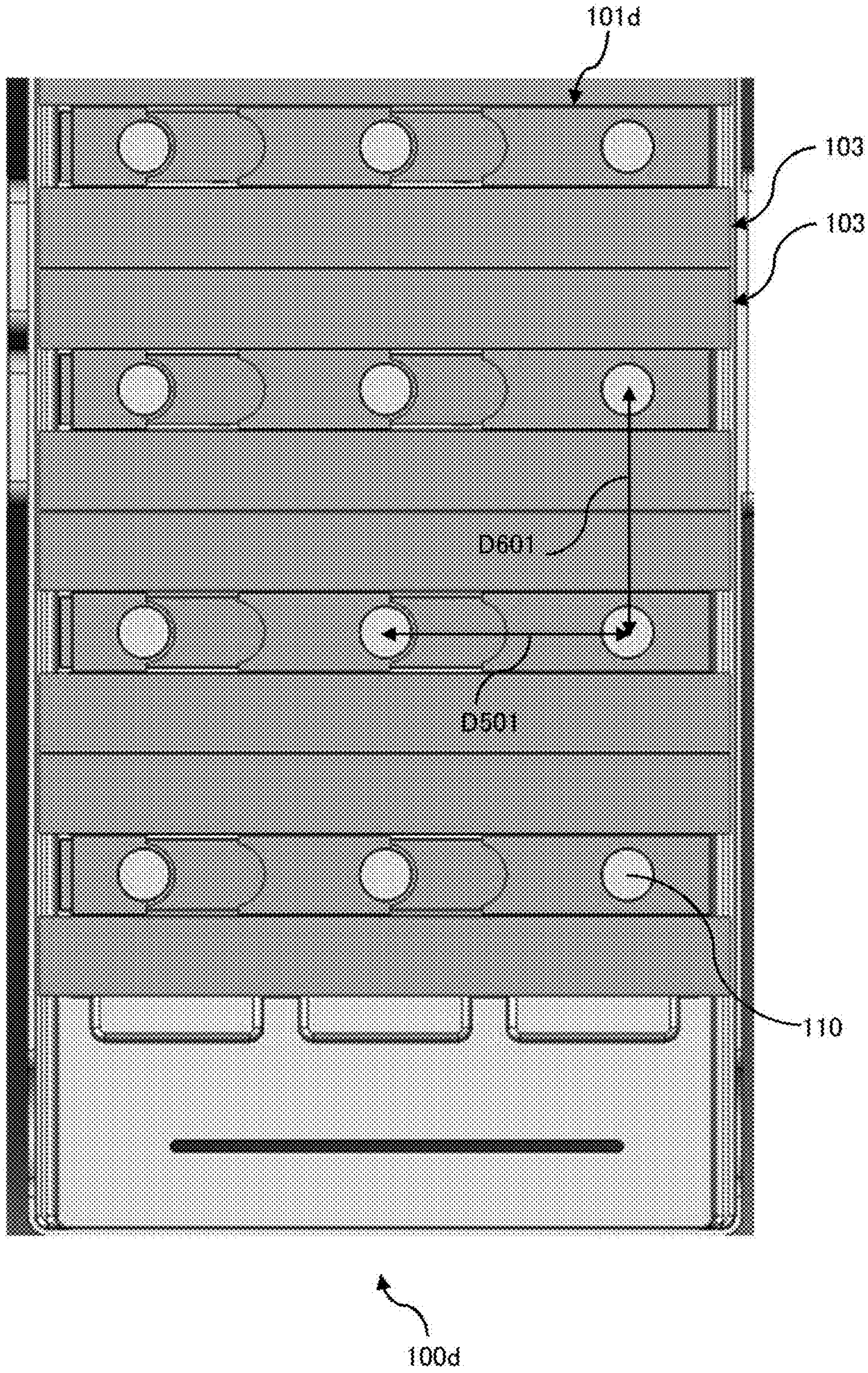
FIG. 6 depicts an example of enlarged view of an area D in FIG. 2.

FIG. 6 depicts an example showing an enlarged view of the area D in FIG. 2.

The interval D601 indicates a space formed between the pot holes 110 of the two planting pots 101*d* provided side by side in a state of interposing the two spacers 103 between the two planting pots 101*d*.

Thus, a user can add further one spacer 103 between the two planting pots 101*c* of the two planting units 100*c* of the embodiment in FIG. 5. Accordingly, it becomes possible to arrange the pot hole 110 in a dispersed state by further enlarging the interval in the longer side direction of the planting pot 101*c* than the state of the planting unit 100*c* while maintaining the interval D501, D502 in the shorter side direction of the planting pot 101*c* of the embodiment in FIG. 5.

Accordingly, in the embodiment of FIG. 6, the interval D601 which is formed between plants provided side by side in the longer side direction of the planting unit 100*d* is larger than the interval D 402 which is formed between plants provided side by side in the longer side direction of the planting unit 100*c* of the embodiment of FIG. 5 (D601>D402). As a consequence, in the example of FIG. 6, the pot holes 110 in the planting unit 100*d* are arranged at approximately equal intervals in the shorter side direction and the longer side direction of the planting unit 100*c*.

In both cases of the embodiment of FIG. 4 and the embodiment of FIG. 6, the pot holes 110 are arranged at approximately equal intervals in the shorter side direction and the longer side direction of the planting unit 100 (100*b*, 100*d*). However, in the embodiment of FIG. 6, the pot holes 110 are arranged to have a bigger interval than the case of the embodiment of FIG. 4.

Please notice that it is possible to arrange three or more spacers 103 between the two planting units 100.

A user can change the state of the planting pots 101 to be placed in the planting unit 100, the number of the spacers 103 to be placed between the planting pots 101, and the arrangement direction of the planting pots 101 and spacers 103. Thereby, it is possible to easily and flexibly change the intervals of the pot holes 110, on either one of the shorter side direction, the longer side direction, and a combination of the shorter side direction and the longer side direction, in a stepwise fashion in the shorter side direction and the longer side direction of the planting unit 100, without performing a pulling work of plants from the pot holes 110.

Figure 7:
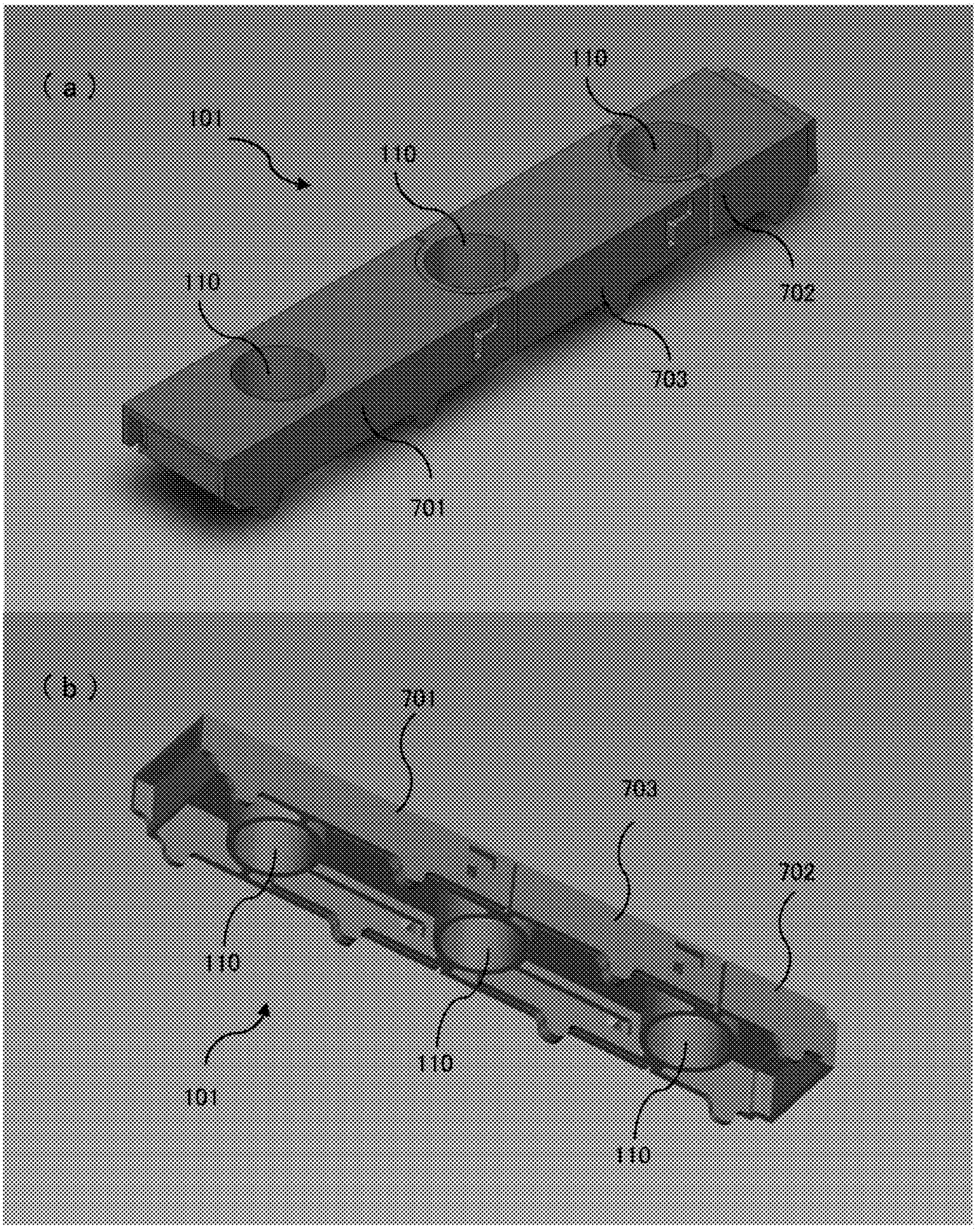
FIG. 7 depicts an example of a perspective view of a planting pot in a contracted state.

FIG. 7 depicts an example showing a perspective view of the planting pot 101 in the contracted state.

FIG. 7 (*a*) depicts an example showing a perspective view of the planting pot 101 in the contracted state, seen from above.

FIG. 7 (*b*) depicts an example showing a perspective view of the planting pot 101 in the contracted state, seen from below.

In the planting pot 101 at the contracted state, the intervals formed between a first-end potpiece (or a pot piece at a first end part) 701, a second-end potpiece (or a pot piece at a second end part) 702, and an intermediate potpiece (or a pot piece at a middle part) 703 are the shortest.

Figure 8:
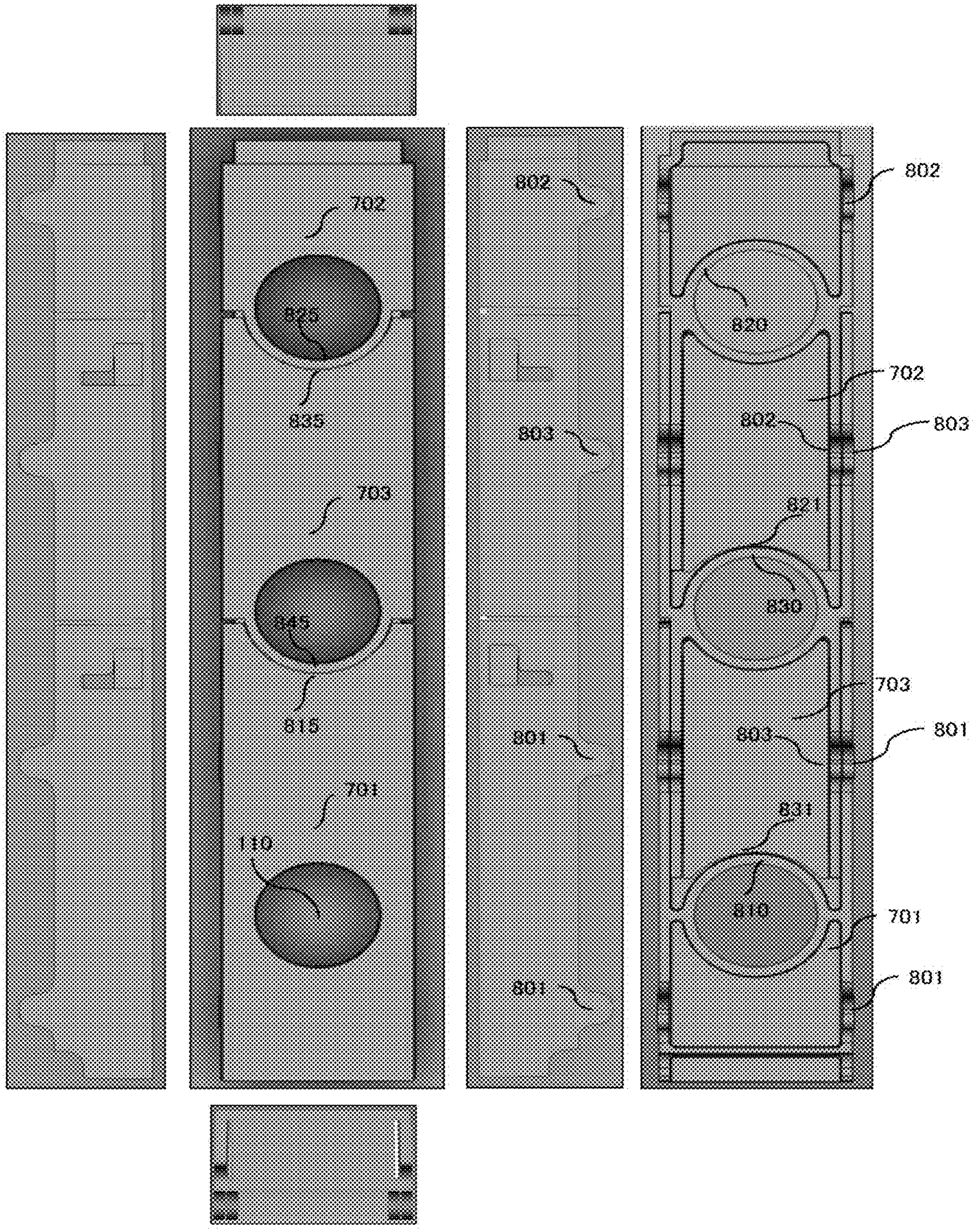
FIG. 8 depicts an example of a perspective view of the planting pot in an extended state.

In the embodiment of FIG. 7, the top surface and the side surface in the long side of each of the first-end potpiece 701, the second-end potpiece 702, and the intermediate potpiece are made flush to have the top surface and the side surface in the long side of the planting pot 101 in the contracted state FIG. 8 depicts an example showing a six-view drawing of the planting pot 101 in the contracted state.

Each of the first-end potpiece 701, the second-end potpiece 702, and the intermediate potpiece 703 is provided with one pot hole 110.

In the embodiment of FIG. 8, each of the first-end potpiece 701, the second-end potpiece 702, and the intermediate potpiece 703 is made flush to have the top surface and the side surface in the long side of the planting pot 101 in the contracted state.

Each of the first-end potpiece 701, the second-end potpiece 702, and the intermediate potpiece 703 is provided with leg parts 801, 802 or 803 which are arranged so as to come into contact with a bottom surface of the planting-pot-receptacle area 105. In the planting pot 101 at the contracted state, the contours of the adjacent leg parts of different pot pieces are overlapped with each other. Thereby, it is possible to minimize the resistance of the leg parts to a flow of a nutrient solution flowing below the planting pot 101 when the planting pot 101 in the contracted state is arranged, seen from the longer side direction, perpendicular to the flow direction of the nutrient solution.

The upper surface part forming the receptacle area of the first-end potpiece 701, and the upper surface part forming the receptacle area of the intermediate potpiece 703 are provided with cutouts (or notches) 815, 835 having an arc shape, respectively. Similarly, the upper surface part forming the insertion area of the intermediate potpiece 703, and the upper surface part forming the insertion area of the second-end potpiece 702 are provided with cutouts (or notches) 831, 821 having an arc shape, respectively.

In the embodiment of FIG. 8, the arc shaped cutouts 815, 835 formed in the respective receptacle areas are made to come into contact with the wall parts 845, 825 of the respective pot holes 110. Similarly, the arc shaped cutouts 831, 821 formed in the respective insertion areas are made to come into contact with the cylindrical wall parts 810, 830 of the respective pot holes 110. As a result, the contracting movement toward the longer side direction of each of the first-end potpiece 701, the second-end potpiece 702, and the intermediate potpiece 703 is stopped.

In a case where the planting pot 101 is consisting of two potpieces of the first-end potpiece 701 and the second-end potpiece 702, the arc shaped cutout 815 formed in the receptacle area of the first-end potpiece 701 comes into contact with the wall part 825 of the pot hole 110 of the second-end potpiece 702. As a result, the contracting movement toward the longer side direction of each of the first-end potpiece 701 and the second-end potpiece 702 is stopped.

By using the wall structures defining the pot holes 110 which are provided at the respective pieces as a stopper for the movement in the longer side direction, it is possible to obtain a very simple constitution for that purpose.

Figure 9:
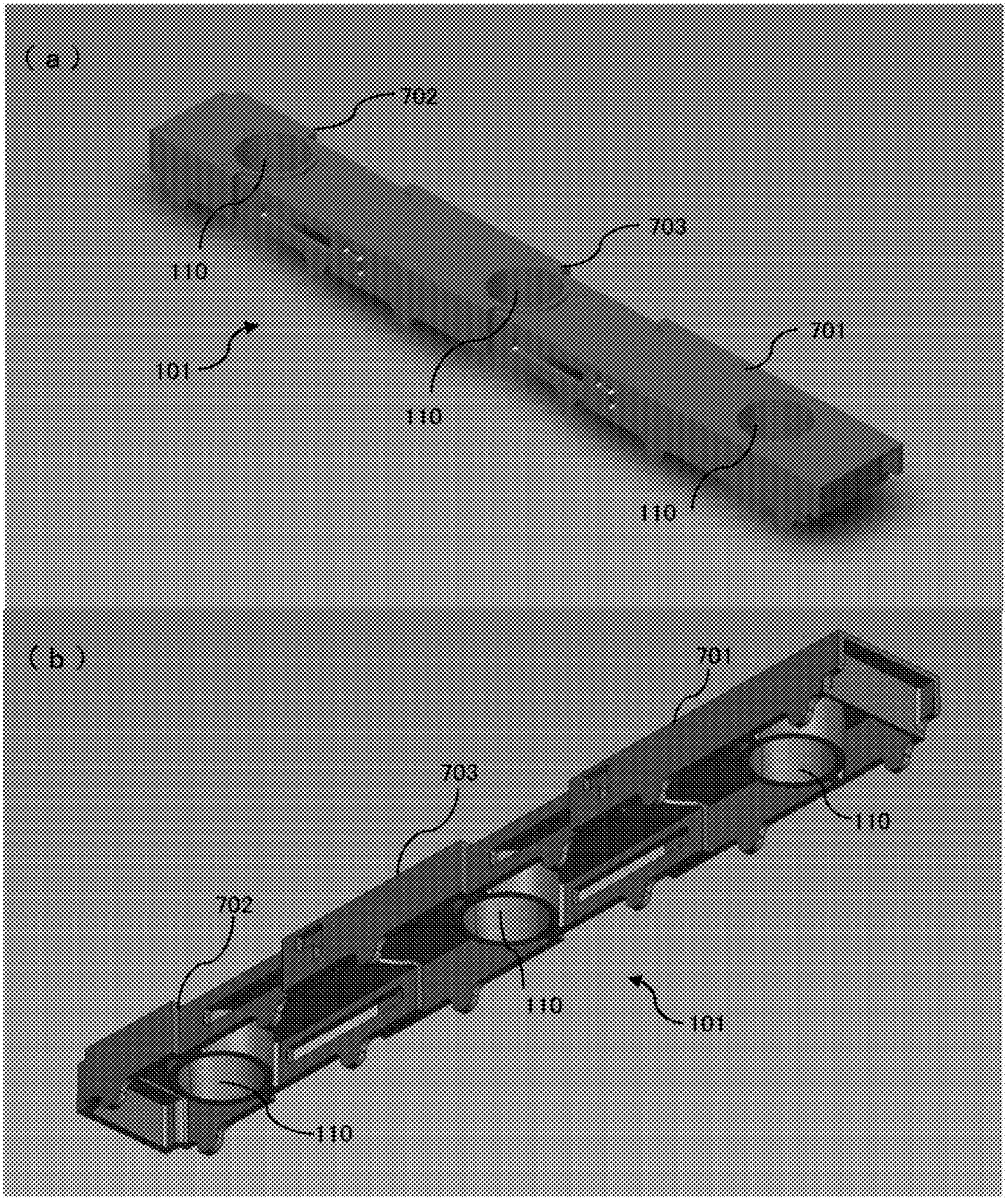
FIG. 9 shows an example of an oblique view of an elongated planting pot.

FIG. 9 depicts an example showing a perspective view of the planting pot 101 in the extended state.

FIG. 9 (*a*) depicts an example showing a perspective view of the planting pot 101 in the extended state, seen from above.

FIG. 9 (*b*) depicts an example showing a perspective view of the planting pot 101 in the extended state, seen from below.

In the extended state of the planting pot 101, the intervals formed between the respective pot holes 110 at the first-end potpiece 701, the second-end potpiece 702, and the intermediate potpiece 703 are the longest.

In the embodiment of FIG. 9, the respective intervals formed between these pot holes 110 are substantially the same, but it is possible to set these intervals to different lengths.

Figure 10:
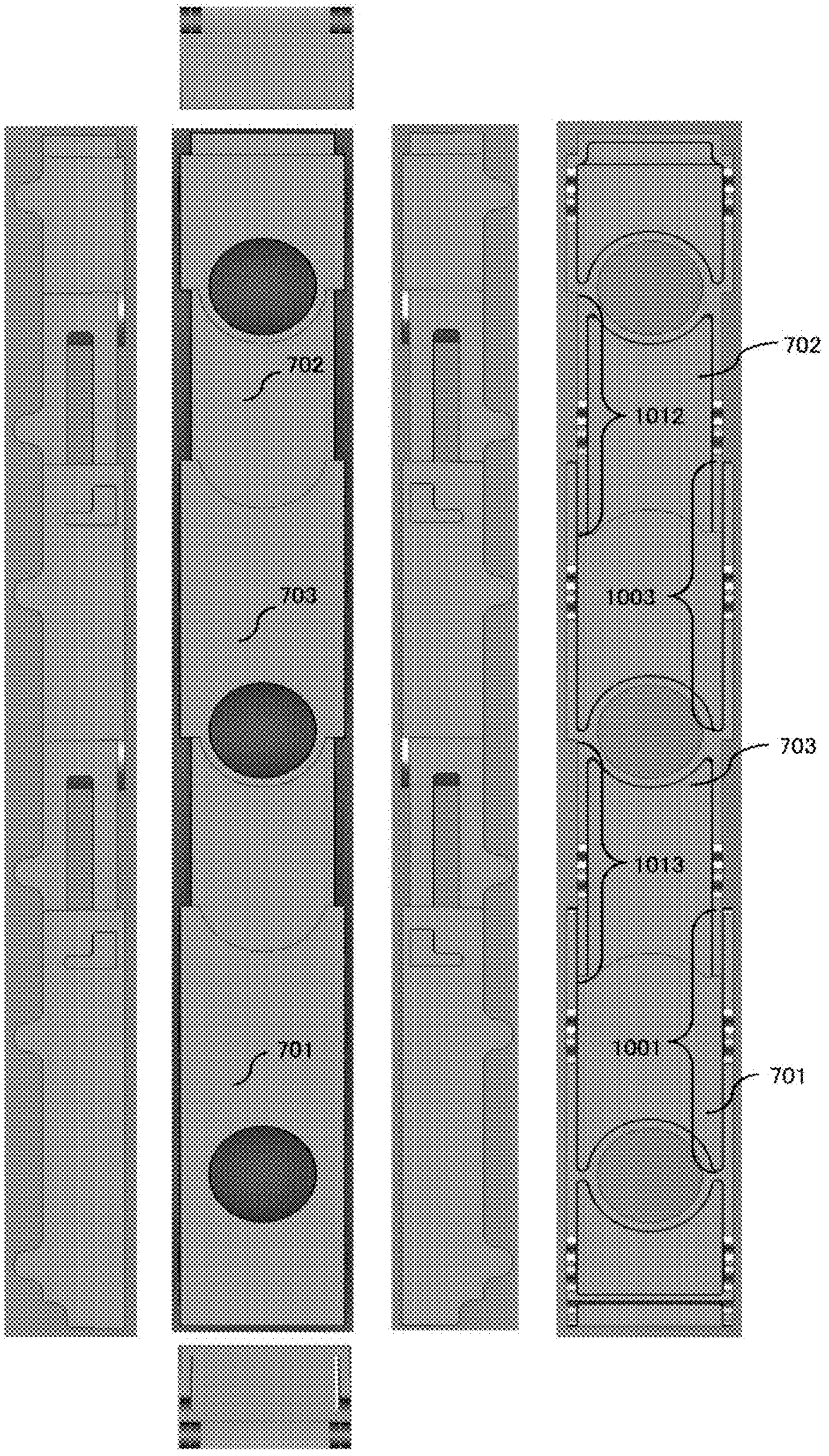
FIG. 10 depicts an example showing a six-view drawing of the planting pot in the extended state.

FIG. 10 depicts an example showing a six-view drawing of the planting pot 101 in the extended state.

When the planting pot 101 is in the extended state, the area 1013 of the intermediate potpiece 703 is pulled out to the fullest extent from the receptacle area 1001 of the first-end potpiece 701.

When the planting pot 101 is in the extended state, the insertion area 1012 of the second-end potpiece 702 is pulled out to the fullest extent from the receptacle area 1003 of the intermediate potpiece 703.

In the embodiments illustrated in FIGS. 7 to 10, only one intermediate potpiece 703 is provided between the first-end potpiece 701 and the second-end potpiece 702. However, it is possible to provide two or more intermediate potpieces 703 between the first-end potpiece 701 and the second-end potpiece 702. In such a case, it is possible to easily change the interval of plants even in a case where a large sized planting unit 100 is used or a large sized cultivation device 2900 is used in accordance with the large sized planting unit 100.

In addition, it is also possible to provide, for example, an intermediate pot without having a pot hole between the first-end potpiece 701 and the second-end potpiece 702, depending on the kind of plant to be cultivated and the adjustment of the cultivation amount (or production amount) thereof.

Accordingly, it is possible to further increase the variations of interval adjustment.

Figure 11:
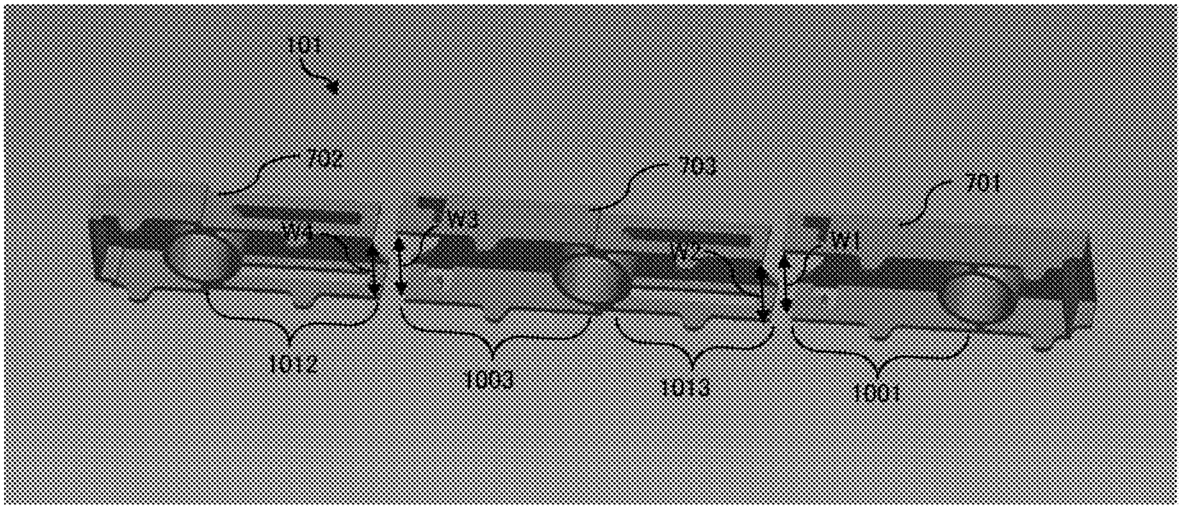
FIG. 11 depicts an example showing an exploded view of the planting pot.

FIG. 11 depicts an example showing an exploded view of the planting pot 101.

In FIG. 11, it is illustrated that the planting pot 101 is constituted by the first-end potpiece 701, the second-end potpiece 702, and the intermediate potpiece 703 which are separable from each other.

In such a case, when any one of the first-end potpiece 701, the second-end potpiece 702, and the intermediate potpiece 703 is damaged or broken, it is possible to continuously use the remaining pieces by exchanging only the damaged piece. In addition, by being separably constituted, it is possible to easily perform the cleaning and maintenance of the first-end potpiece 701, the second-end potpiece 702, and the intermediate potpiece 703.

The first-end potpiece 701 is provided with a receptacle area 1001 for inserting the insertion area 1013 of the intermediate potpiece 703.

The intermediate potpiece 703 is provided with a receptacle area 1003 for inserting the insertion area 1012 of the second-end potpiece 702.

In the embodiment of FIG. 11, the width W1 of the receptacle area 1001 of the first-end potpiece 701 and the width W3 of the receptacle area 1003 of the intermediate potpiece 703 are equal to each other. Also, the width W2 of the insertion area 1013 of the intermediate potpiece 703 and the width W4 of the insertion area 1012 of the second-end potpiece 702 are equal to each other.

Accordingly, structurally, it is possible to insert the plurality of intermediate potpieces 703 between the first-end potpiece 701 and the second-end potpiece 702. Also, it is possible to directly connect the first-end potpiece 701 with the second-end potpiece 702. Therefore, the planting pot 101 can be consisting of four or more pot pieces. Also, the planting pot 101 can be consisting of two pot pieces.

Figure 12:
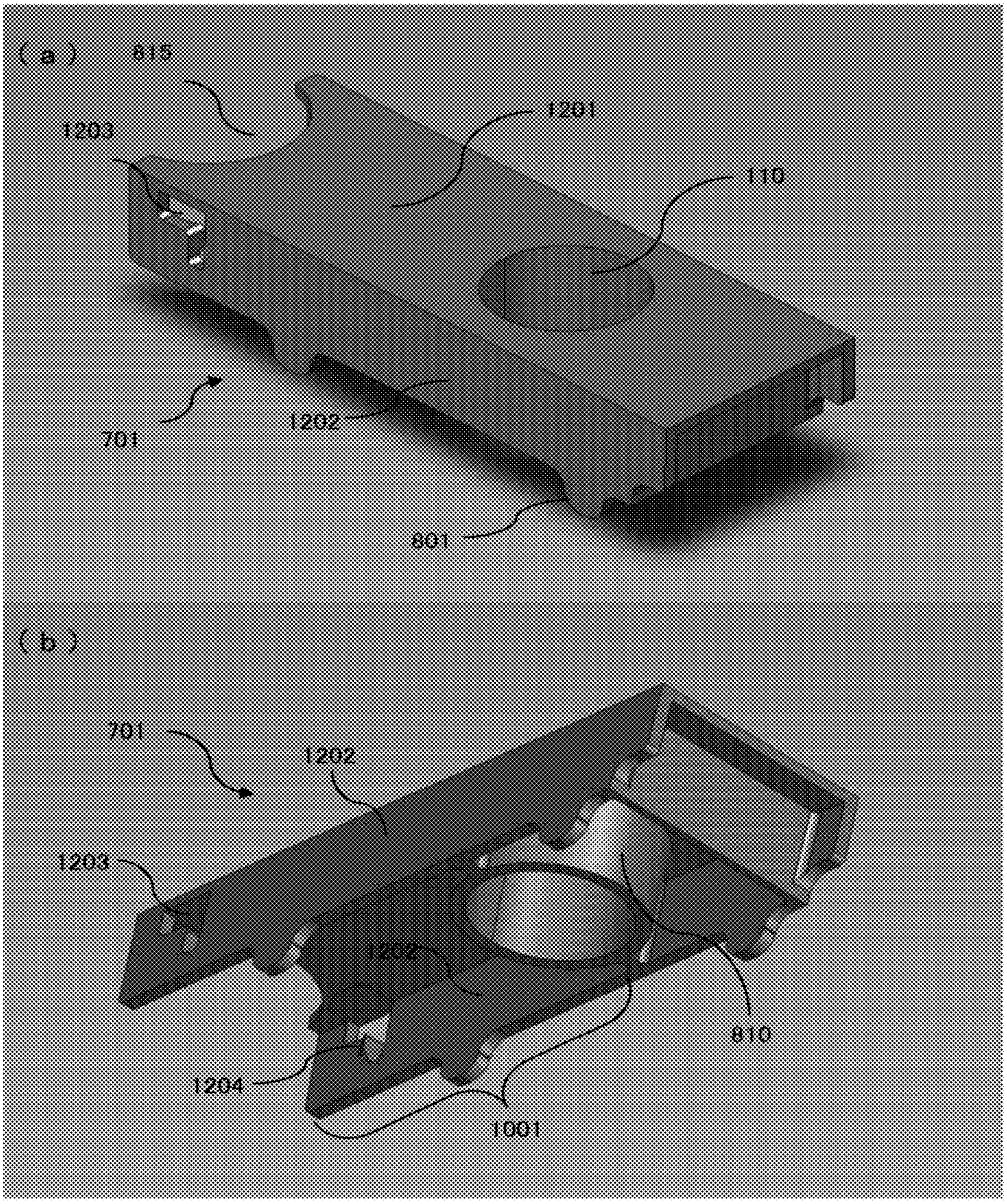
FIG. 12 depicts an example showing a perspective view of a first-end potpiece.

FIG. 12 depicts an example showing a perspective view of the first-end potpiece 701.

FIG. 12 (*a*) depicts an example showing a perspective view of the first-end potpiece 701, seen from above.

FIG. 12 (*b*) depicts an example showing a perspective view of the first-end potpiece 701, seen from below.

The first-end potpiece 701 has a pot hole 110 for inserting a plant (or a sapling or a seeds, etc.) into the upper surface 1201 in order to cultivate it. At one end of the first-end potpiece 701 is provided with an arc-shaped cutout 815. A hook-shaped opening 1203 is formed in the side wall part 1202 in the vicinity of the arc-shaped cutout 815. Two leg parts 801 are provided on both side walls, respectively. The leg part 801 is provided to be come into contact with the bottom surface of the nutrient solution tray when the planting pot 101 is arranged in the nutrient solution tray 102. Accordingly, a space for making a nutrient solution flow is formed between the planting pot 101 and the bottom surface of the nutrient solution tray 102.

Also, the leg part 801 is arranged in a position not to overlap with the pot hole 110, seen from the side surface of the first-end potpiece 701, that is, as seen in a direction from one side wall 1202 toward the other side wall 1202. Accordingly, it becomes possible to stably hold the potpiece without inhibiting a flow path through which a nutrient solution is supplied toward roots of plant. Even in a case where the insertion area 1013 of the intermediate potpiece 703 is inserted to the receptacle area 1001 of the first-end potpiece 701 (in a case where the planting pot 101 is consisting of the three pot pieces 701, 702, 703), even in a case where the insertion area 1012 of the second-end potpiece 702 is inserted thereto (in a case where the planting pot 101 is consisting of the two pot pieces 701, 702), it is possible to supply a nutrient solution to roots of plant arranged in the pot hole 110 without having the inhibition of the nutrient solution by the leg part 803 of the intermediate potpiece 703 or the leg part 802 of the second-end potpiece 702.

The first-end potpiece 701 is provided with a cylindrical wall part 810 which is connected with the pot hole 110. The cylindrical wall part 810 is configured to be capable of suitably holding a plant therein. The cylindrical wall part 810 may be formed in a cylindrical trapezoid to prevent a plan from falling off therefrom.

The receptacle area 1001 for housing the insertion area 1013 of the below-mentioned intermediate potpiece 703 is provided in the first-end potpiece 701. The receptacle area 1001 is defined by both of the inner surfaces of the side wall part 1202 of the first-end potpiece 701 and the outer peripheral surface of the cylindrical wall part 810.

A hook-shaped opening 1203 is provided in the vicinity of the arc-shaped cutout 815 in each of the side wall part 1202 forming the receptacle area 1001 of the first-end potpiece 701. The hook-shaped opening 1203 is capable of assisting the first-end potpiece 701 to be elastically displaced in the shorter side direction when the insertion area 1013 of the intermediate potpiece 703 is inserted into the receptacle area 1001, by the insertion area 1013 of the intermediate potpiece 703, due to a latch claw 1204.

Figure 13:
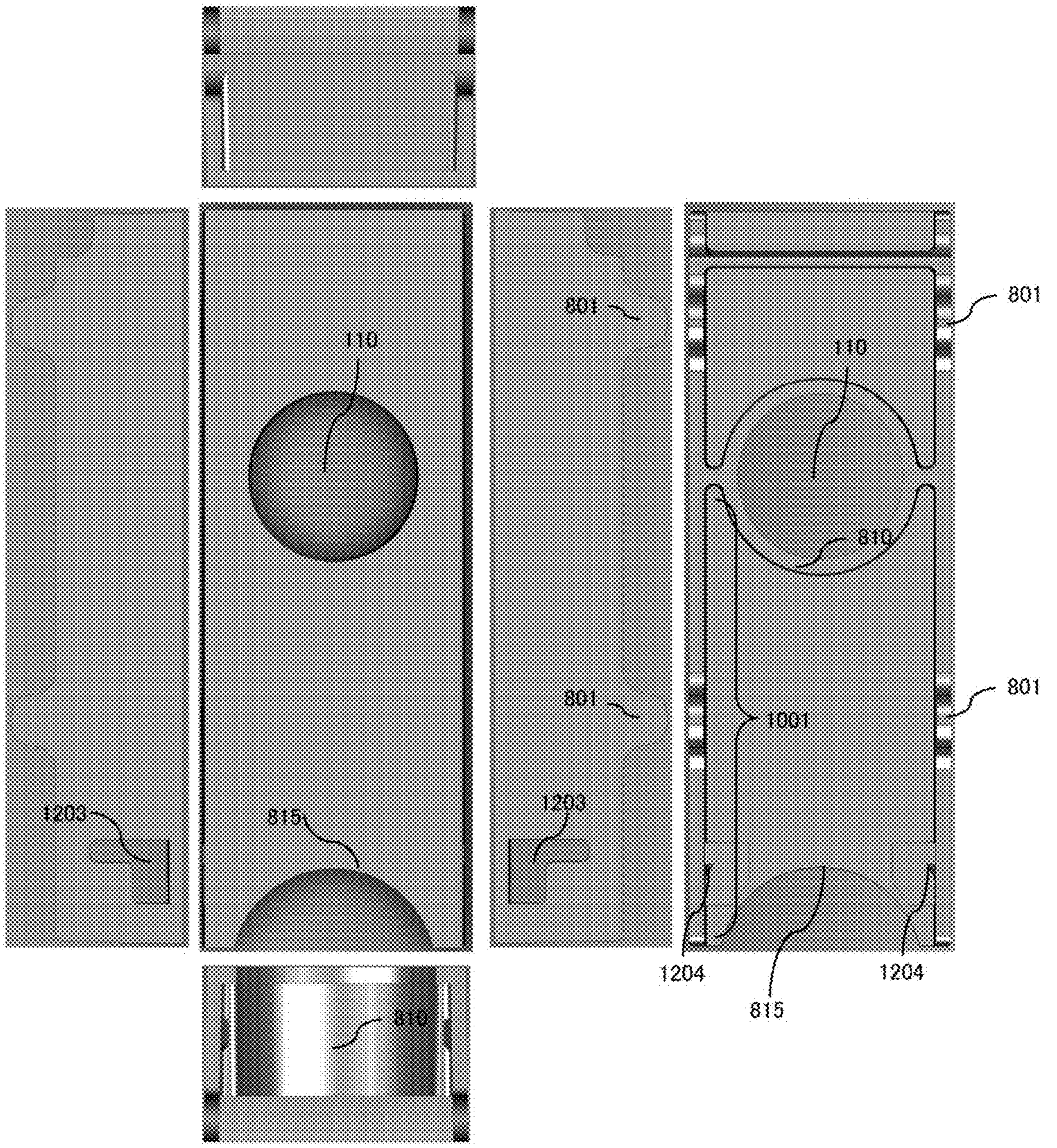
FIG. 13 depicts an example showing a six-view drawing of the first-end potpiece.

FIG. 13 depicts an example showing a six-view drawing of the first-end potpiece 701.

FIG. 13 depicts an example showing a top view, a lower view, both side views, and both end surfaces of the first-end potpiece 701. The shape, the configuration, and the ratio of each part may be designed and modified as appropriate. The descriptions regarding the individual parts are as described with referring to FIG. 12 and will be omitted.

Figure 14:
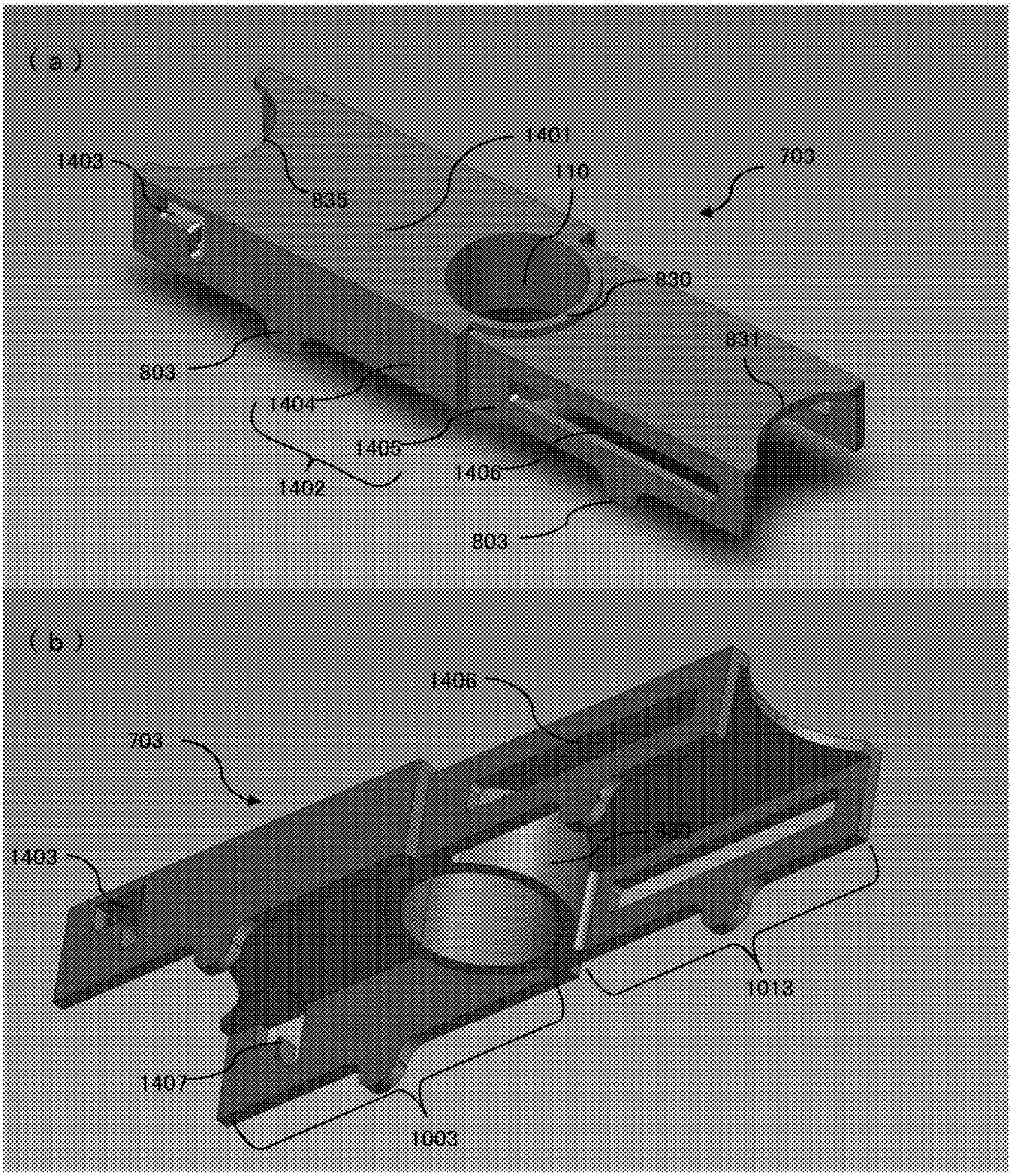
FIG. 14 depicts an example showing a perspective view of an intermediate potpiece.

FIG. 14 depicts an example showing a perspective view of the intermediate potpiece 703.

FIG. 14 (*a*) depicts an example showing a perspective view of the intermediate potpiece 703, seen from above.

FIG. 14 (*b*) depicts an example showing a perspective view of the intermediate potpiece 703, seen from below.

The intermediate potpiece 703 is provided with a pot hole 110 for inserting a plant (or a sapling or a seeds, etc.) into the upper surface 1401 in order to cultivate it.

Two leg parts 803 are provided on both side wall parts 1402 of the intermediate potpiece 703, respectively. The leg part 803 is provided to be come into contact with the bottom surface of the nutrient solution tray 102 when the planting pot 101 is arranged in the nutrient solution tray 102. Accordingly, a space for making a nutrient solution flow is formed between the planting pot 101 and the bottom surface of the nutrient solution tray 102. Here, the bottom surface of the nutrient solution tray 102 corresponds to a surface of the nutrient solution tray 102 at the side for arranging the planting pot 101 thereon. The bottom surface of the nutrient solution tray 102 can be referred to a top surface (or upper surface) of the nutrient solution tray 102, and its opposite surface can be referred to a lower surface of the nutrient solution tray 102.

Also, the leg part 803 is arranged in a position not to overlap with the pot hole 110, seen from the side surface of the intermediate potpiece 703, that is, as seen in a direction from one side wall part 1402 toward the other side wall part 1402. Accordingly, it becomes possible to stably hold the potpiece without inhibiting a flow path through which a nutrient solution is supplied toward roots of plant. Even in a case where one intermediate potpiece 703 is provided between the first-end potpiece 701 and the second-end potpiece 702 (in a case where the planting pot 101 is consisting of the three pot pieces 701, 702, 703), even in a case where the plurality of intermediate potpieces 703 are provided (in a case where the planting pot 101 is consisting of four or more of the pot pieces 701, 702, 703), it is possible to supply a nutrient solution to roots of plant arranged in the pot hole 110 without inhibition of a nutrient solution by the leg part 801 of the first-end potpiece 701, the leg part 803 of the intermediate potpiece 703 and the leg part 802 of the second-end potpiece 702.

An arc-shaped cutout 831 is provided at one end of the intermediate potpiece 703. Similarly, an arc-shaped cutout 835 is provided at the other end of the intermediate potpiece 703.

Both side walls 1402 forming the receptacle area 1003 of the intermediate potpiece 703 are provided with a hook-shaped opening 1403 in the vicinity of the arc shaped cutout 835. The hook-shaped opening 1403 is capable of assisting the intermediate potpiece 703 to be elastically displaced in the shorter side direction when the insertion area 1012 of the second-end potpiece 702 is inserted into the receptacle area 1003, by the insertion area 1012, due to the latch claw 1407.

A cylindrical wall part 830 which is connected with the pot hole 110 is formed to extend from the top surface 1401 to the inside of the intermediate potpiece 703. The cylindrical wall 830 is configured to be capable of suitably holding a plant therein. The cylindrical wall 830 may be constructed in a cylindrical trapezoid to prevent a plan from falling off therefrom.

The receptacle area 1003 for housing the insertion areas 1012 of the second-end potpiece 702 is provided in the intermediate potpiece 703. The receptacle area 1003 is defined by both of the first side wall parts 1404 and the cylindrical wall part 830 of the intermediate potpiece 703.

Furthermore, the insertion area 1013 for being inserted into the receptacle area 1001 of the first-end potpiece 701 is provided in the intermediate potpiece 703. The insertion area 1013 is defined by both of the second wall parts 1405 and the cylindrical wall part 830 of the intermediate potpiece 703. A slit-shaped opening 1406 is formed in the second wall part 1405.

When the planting pot 101 is extended/contracted between the extended state and the contracted state, the slit-shaped opening 1406 is capable of guiding the movement of the latch claw 1204 of the first-end potpiece 701.

Figure 15:
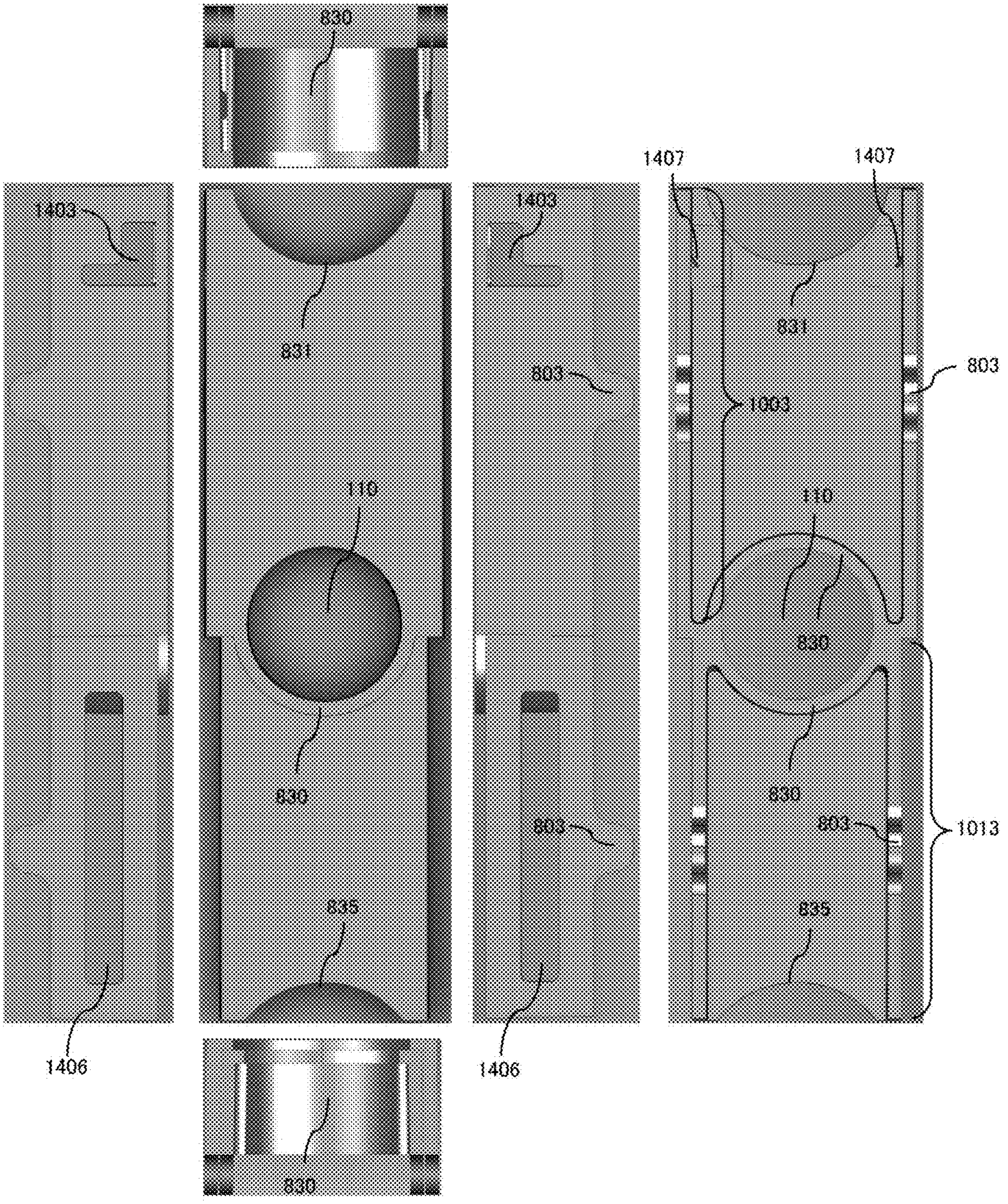
FIG. 15 depicts an example showing a six-view drawing of the intermediate potpiece.

FIG. 15 depicts an example showing a six-view drawing of the intermediate potpiece.

FIG. 15 depicts an example showing a top view, a lower view, both side views, and both end surfaces of the intermediate potpiece. The shape, the configuration, and the ratio of each part may be designed and modified as appropriate. The descriptions of the individual parts are as described with referring to FIG. 14 and will be omitted.

Figure 16:
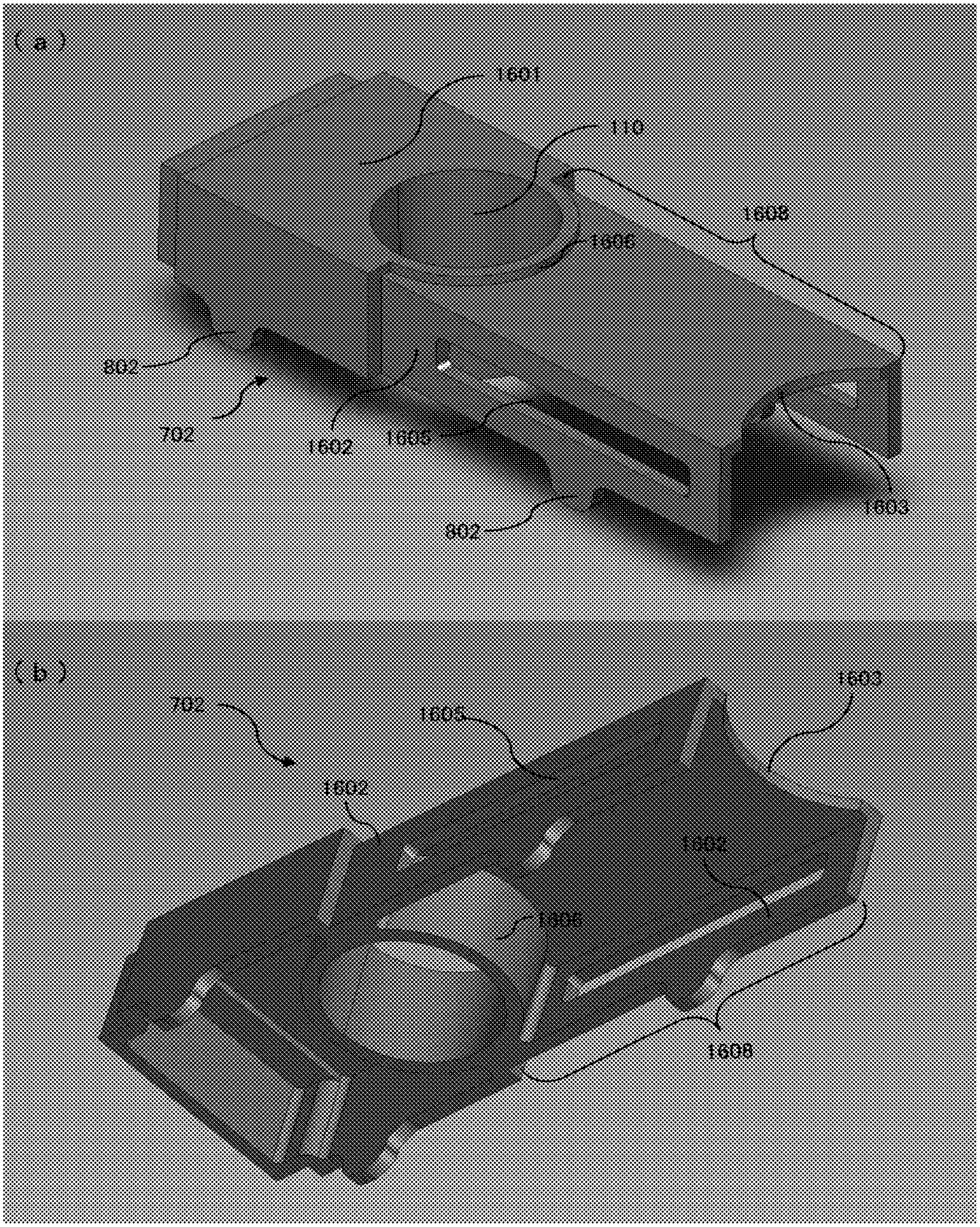
FIG. 16 depicts an example showing a perspective view of a second-end potpiece.

FIG. 16 depicts an example showing a perspective view of the second-end potpiece.

FIG. 16 (*a*) depicts an example showing a perspective view of the second-end potpiece, seen from above.

FIG. 16 (*b*) depicts an example showing a perspective view of the second-end potpiece, seen from below.

The second-end potpiece 702 has a pot hole 110 for inserting a plant (or a sapling or a seeds, etc.) into the upper surface 1601 in order to cultivate it. An arc-shaped cutout 1603 is provided at one end of the second-end potpiece 702. At the both side wall parts 1602 of the second-end potpiece 702, a slit-shaped opening 1605 is formed to linearly extend from the vicinity of the arc-shaped cutout 1603 to the vicinity of the pot hole 110.

Two leg parts 802 are provided on both side wall parts 1602 of the second-end potpiece 702. The leg part 802 is provided to be come into contact with the bottom surface of the nutrient solution tray 102 when the planting pot 101 is arranged in the nutrient solution tray 102. Accordingly, a space for making a nutrient solution flow is formed between the planting pot 101 and the bottom surface of the nutrient solution tray 102.

Also, the leg part 1604 is arranged in a position not to overlap with the pot hole 110, seen from the side surface of the second-end potpiece 702, that is, as seen in a direction from one side wall part 1602 toward the other side wall part 1602. Accordingly, it becomes possible to stably hold the potpiece without inhibiting a flow path through which a nutrient solution is supplied toward roots of plant. Even in a case where the insertion area 1012 of the second-end potpiece 702 is inserted into the receptacle area 1003 of the intermediate potpiece 703 (in a case where the planting pot 101 is consisting of the three pot pieces 701, 702, 703), and even in a case where it is inserted into the receptacle area 1001 of the first-end potpiece 701 (in a case where the planting pot 101 is consisting of the two pot pieces 701, 702), it is possible to supply a nutrient solution to roots of plant arranged in the pot hole 110 without inhibition of a nutrient solution by the leg part 801 of the first-end potpiece 701, or by the leg part 803 of the intermediate potpiece 703.

The second-end potpiece 702 is provided with a cylindrical wall part 1606 which is connected with the pot hole 110. The cylindrical wall part 1606 is configured to be capable of suitably holding a plant therein. The cylindrical wall part 1606 may be constructed in a cylindrical trapezoid to prevent a plan from falling off therefrom.

The insertion area 1608 for being inserted into the receptacle area 1003 of the intermediate potpiece 703 is provided within the second-end potpiece 702. The insertion area 1608 is defined by the outside surfaces of the both side wall parts, and the outer peripheral surface at the side of top surface 1601 of the cylindrical wall part 1606, of the second-end potpiece 702.

Figure 17:
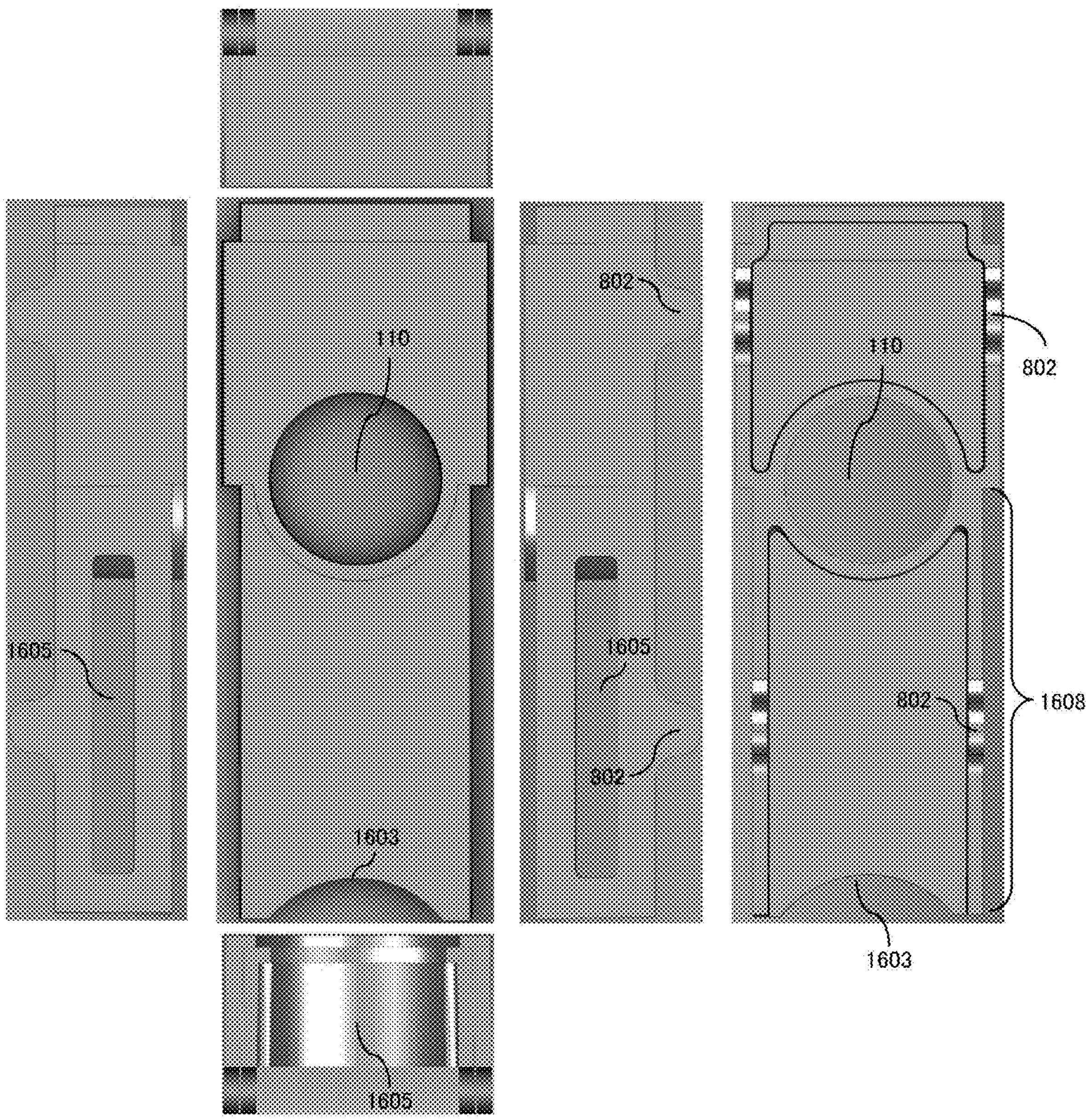
FIG. 17 depicts an example showing a six-view drawing of the second-end potpiece.

FIG. 17 depicts an example showing a six-view drawing of the second-end potpiece.

FIG. 17 depicts an example showing a top view, a lower view, both side views, and both end surfaces of the second-end potpiece. The shape, the configuration, and the ratio of each part may be designed and modified as appropriate. The descriptions of the individual parts are as described with referring to FIG. 16 and will be omitted.

Figure 18:
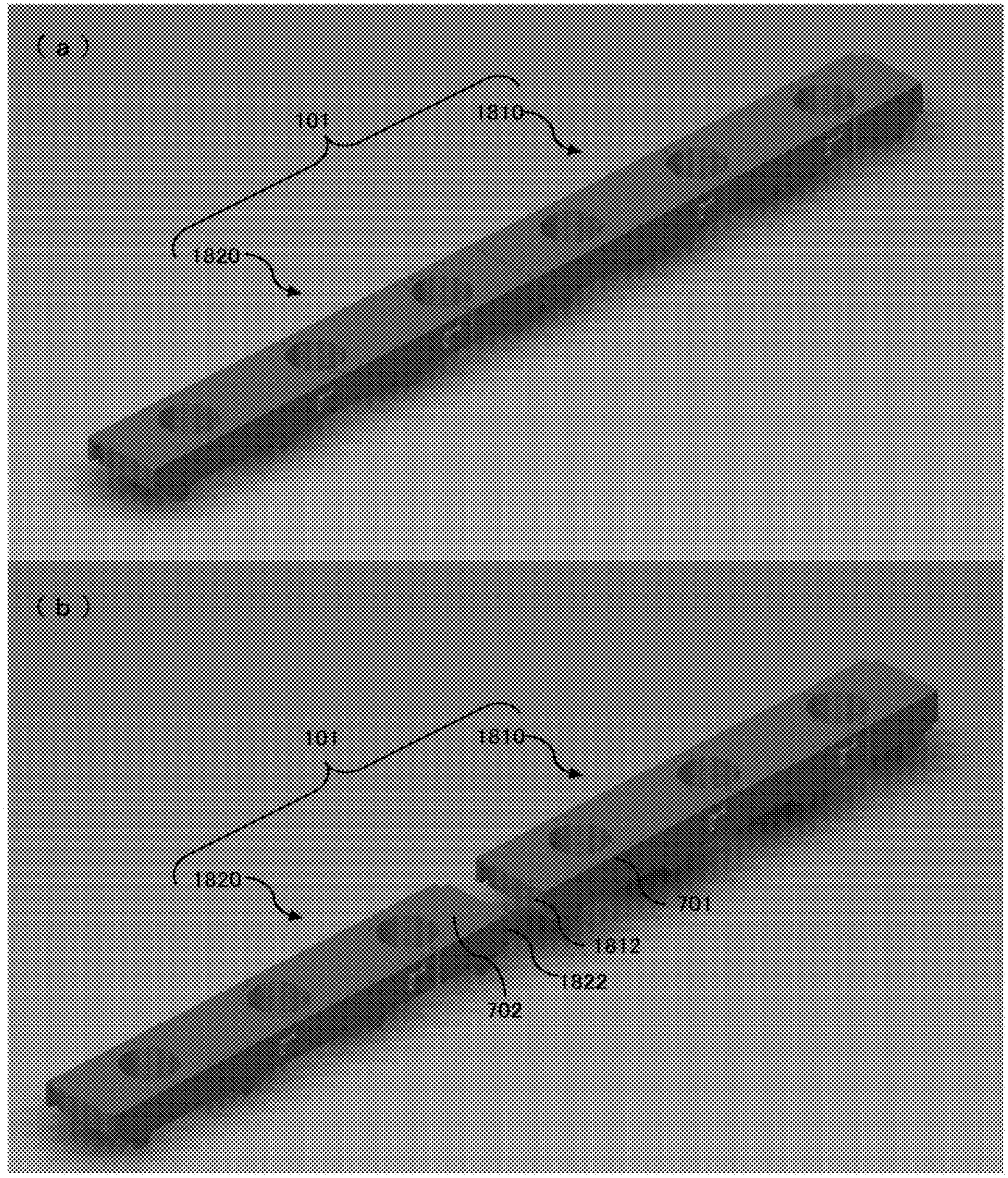
FIG. 18 depicts an example showing two planting pots arranged in a longer side direction.

FIG. 18 depicts an example showing two planting pots arranged in the longer side direction.

FIG. 18 (*a*) depicts an example showing a state in which the two planting pots 101 (1810, 1820) are arranged in the longer side direction and connected with each other.

FIG. 18 (*b*) depicts an example showing a state in which the two planting pots 101 (1810, 1820) are separated from each other after releasing the connected condition of FIG. 18 (*a*).

The first-end potpiece 701 of one planting pot 1810 is provided with a first connecting part 1812 on the opposite side to the receptacle area of the first-end potpiece 701. In addition, the second-end potpiece 702 of the other planting pot 1820 is provided with a second connecting part 1822 on the opposite side to the insertion area of the second-end potpiece 702.

The first connecting part 1812 and the second connecting part 1822 are formed complementary to each other, and the two planting pots 101 (1810 and 1820) can be connected with each other using the first connecting part 1812 and the second connecting part 1822.

In the embodiment of FIG. 18, each of the planting pots 1810, 1820 has a concave portion at one end and a convex portion at the other end which are formed complementary to each other. Accordingly, in a connected condition where the two planting pots 101 are aligned in the longer side direction and are connected in the nutrient solution tray 102 as illustrated in FIG. 18 (*a*), it is possible to stably maintain the aligned condition, for example, against a flow of nutrient solution and an oscillation which can be generated due to the movement.

On the other hand, the two planting pots 101 aligned in the longer side direction can be separated away from one another. As a result, it is possible to easily release the connected condition of FIG. 18 (*a*) and change into the condition of FIG. 18 (*b*).

Figure 19:
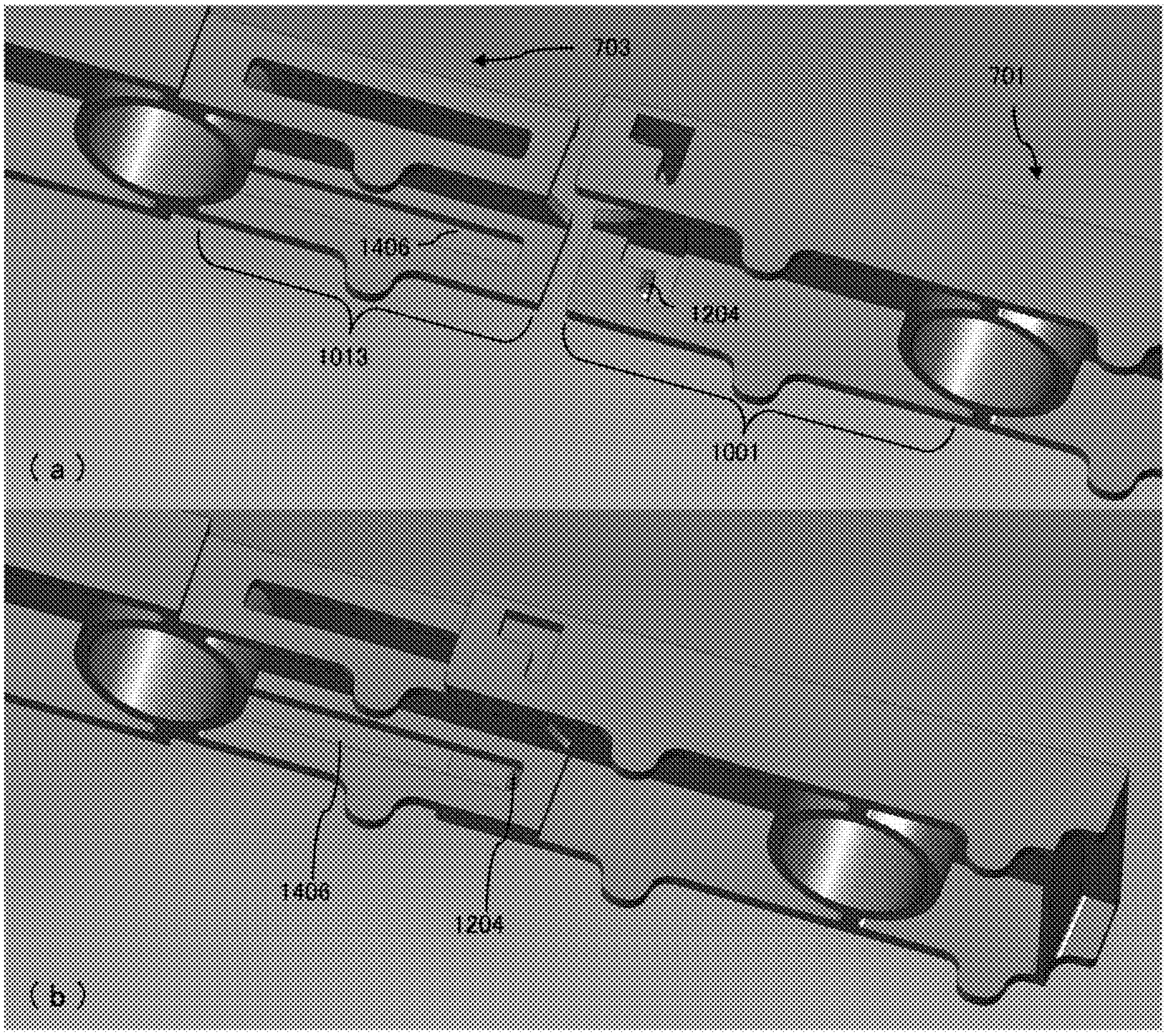
FIG. 19 depicts an example giving an explanation of a state of inserting an insertion area into a receptacle area.

FIG. 19 depicts an example giving an explanation of a state of inserting the insertion area into the receptacle area.

FIG. 19 (*a*) depicts an example giving an explanation of a state before the insertion area 1013 of the intermediate potpiece 703 is inserted into the receptacle area 1001 of the first-end potpiece 701.

FIG. 19 (*b*) depicts an example giving an explanation of a state after the insertion area 1013 of the intermediate potpiece 703 is inserted into the receptacle area 1001 of the first-end potpiece 701.

In FIG. 19 (*b*), a latch claw 1204 which is provided at a wall part defining the receptacle area 1001 of the first-end potpiece 701 is engaged with a slit-shaped opening 1406 which is provided at a wall part defining the insertion area 1013 of the intermediate potpiece 703.

Advantageously, the latch claw 1204 is formed as below. That is, the insertion area 1013 of the intermediate potpiece 703 is configured to smoothly slide on the latch claw 1204 when the insertion area 1013 of the intermediate potpiece 703 is inserted into the receptacle area 1001 of the first-end potpiece 701, and, when it is pulled in a direction opposite to the direction during the insertion, the latch claw 1204 becomes a stopper which is capable of being come into contact with the slit-shaped opening 1406.

Figure 20:
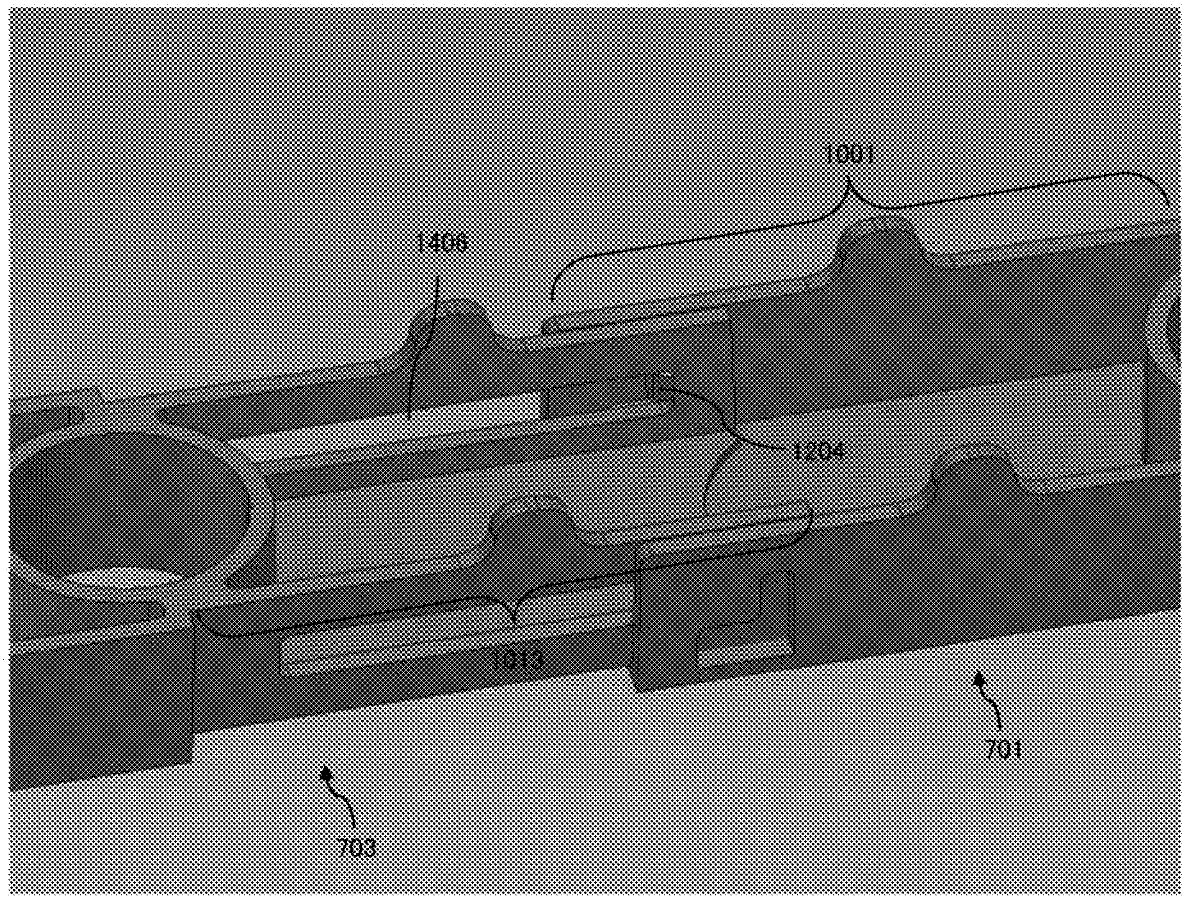
FIG. 20 depicts an example giving an explanation of an engagement condition of a slit-shaped opening and a latch claw.

FIG. 20 depicts an example giving an explanation of the engagement condition of the slit-shaped opening and the latch claw.

In the embodiment of FIG. 20, the latch claw 1204 is in contact with an end part at the side of the receptacle area of the slit-shaped opening 1406, and functions as a stopper to prevent further separation between the first-end potpiece 701 and the intermediate potpiece 703, and to prevent the intermediate potpiece 703 from being extracted off from the first-end potpiece 701.

In FIG. 20, the connected condition which is slidable between the first-end potpiece 701 and the intermediate potpiece 703 is illustrated. There is also a connected condition which is slidable between the intermediate potpiece 703 and the second-end potpiece 702.

When the planting pot 101 is extended and/or contracted, protrusions such as the latch claws 1204 and 1407 are linearly guided and moved within the slit-shaped openings 1406 and 1605, so that the occurrence of rattling of the individual potpieces and the occurrence of deviation in the vertical direction perpendicular to the slit can be prevented. In addition, in the slit-shaped openings 1406, 1605, the protrusions are in contact with the end parts in the longer side direction of the slit-shaped openings 1406, 1605 so that it is possible to surely prevent the intermediate potpiece 703 from being extracted off from the first-end potpiece 701, and prevent the second-end potpiece 702 from being extracted off from the intermediate potpiece 703. In addition, even in a case where the planting pot 101 is consisting of two potpieces of the first-end potpiece 701 and the second-end potpiece 702, the protrusion such as the latch claw 1204 of the first-end potpiece 701 is linearly guided and moved within the slit-shaped opening 1605 of the second-end potpiece 702, thereby achieving the same effect as described above.

Figure 21:
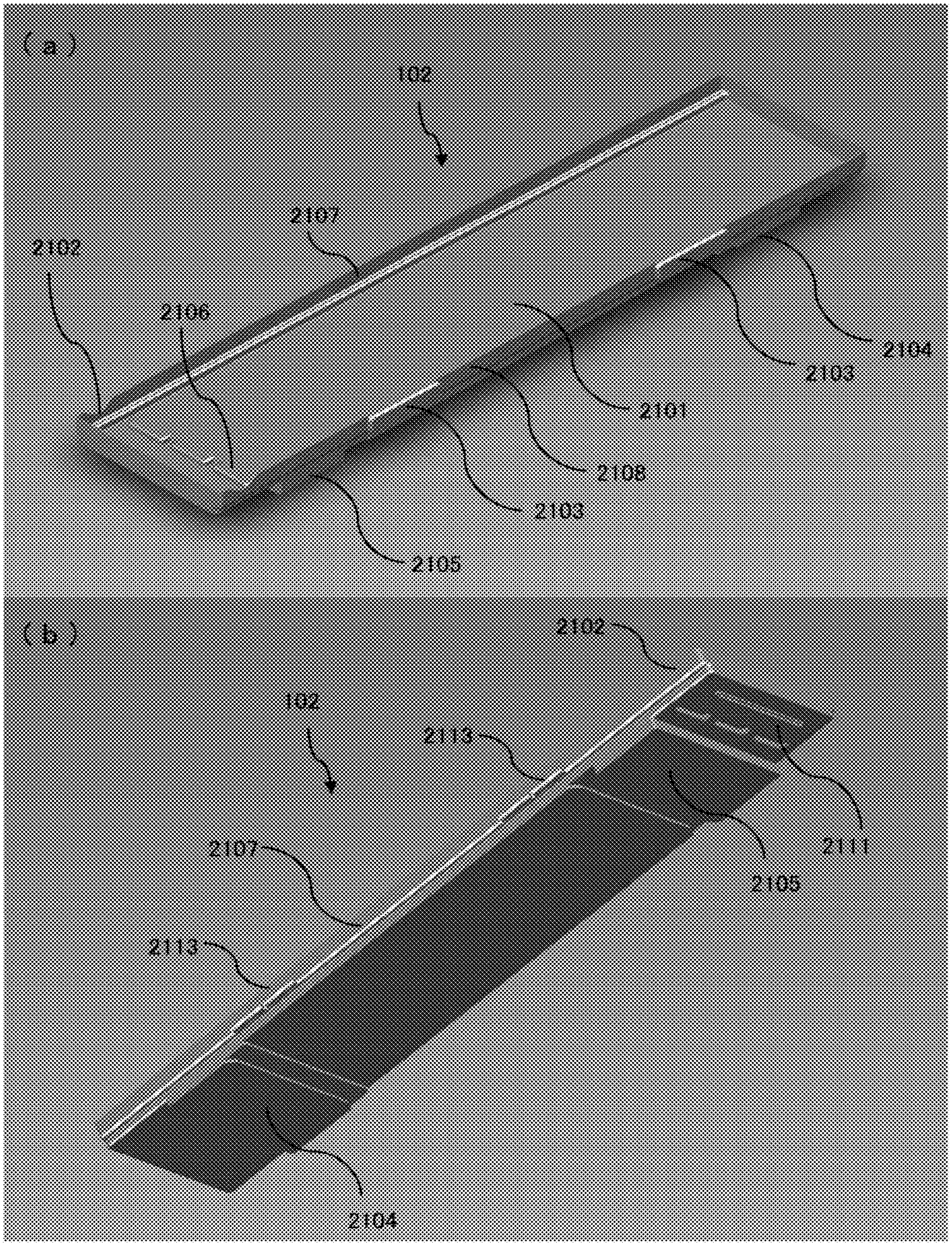
FIG. 21 depicts an example showing a perspective view of a nutrient solution tray.

FIG. 21 depicts an example showing a perspective view of the nutrient solution tray.

FIG. 21 (*a*) depicts an example showing a perspective view of the nutrient solution tray, seen from above.

FIG. 21 (*b*) depicts an example showing a perspective view of the nutrient solution tray, seen from below.

The nutrient solution tray 102 is formed to have a planting-pot-receptacle area 105 for housing the planting pot(s) 101 therein, a nutrient solution-inflow area for allowing a nutrient solution to flow therein, and a nutrient solution-outflow area having a nutrient solution-outflow port(s). These areas will be described in more detail using FIG. 24.

A discharge slit(s) 2111 is provided at one end in the longer side direction of the bottom surface 2101 of the nutrient solution tray 102. A nutrient solution is allowed to be discharged from the discharge slit 2111 which is corresponding to the nutrient solution outflow part.

The nutrient solution tray 102 is provided with a protrusion (or protruding structure) 2106 at the bottom surface 2101 in the vicinity of the discharge slit 2111.

The protrusion 2106 is formed in an area where a nutrient solution in the nutrient solution tray 102 is exposed to a light coming from the light source. When the height of the protrusion 2106 is higher than the height of the liquid surface of the nutrient solution in a state that the nutrient solution is flowed into the nutrient solution tray 102 for cultivating plants, it is possible to reduce the area at which light enters into the nutrient solution. As a result, it becomes possible to reduce the occurrence or growth of algae or the like.

The nutrient solution tray 102 is provided with leg parts 2104 and 2105 of different heights.

Each of the wall parts 2107 and 2108 of the nutrient solution tray 102 is provided with a concave cutout part 2102 at the predetermined position where water is predicted to rise beyond a certain level (or planned overflow position) in the vicinity of the discharge slit 2111. One wall part 2108 additionally has a pair of first connecting structure (or first combining structure) 2103 and the other wall part 2107 additionally has a pair of second connecting structure 2113.

By fitting the first connecting structure 2103 of the embodiment of FIG. 21 to the second connecting structure 2113 from above, the two adjacent nutrient solution trays 102 can be connected with each other. This connected condition can be maintained in a case where the nutrient solution trays 102 are moved horizontally (or shifted), and can be easily released when one nutrient solution tray 102 is moved vertically (or it is lifted).

It is possible to provide a mark (or a mark part) which is structured by using a concave/convex shape or a groove, etc., or a colored mark at the edge part of the wall parts 2107, 2108 of the nutrient solution tray 102 and/or the both wall parts in the shorter side direction of the nutrient solution tray 102.

For example, the control unit of the growth monitoring section is capable of processing images (or pictures) of the nutrient solution tray 102 which are taken from above to identify a plant having a growth rate which is out of a predetermined growth rate in the nutrient solution tray 102, in other words, to identify a plant which is growing earlier than usual or a plant which is growing slower than usual. Subsequently, the control unit is capable of outputting the notice information along with the location information of the mark part to the manager.

Accordingly, it becomes possible to quickly recognize the position of a plant which is deviating from the predetermined growth rate in the nutrient solution tray 102

The control unit of the growth monitoring section is further advantageous when having a configuration which is capable of identifying an abnormality of a plant or a growth rate which is out of standards of plants, based on the image analysis or AI (artificial-intelligence) examination. In such a configuration, it is possible to quickly and accurately determine and distinguish a sign of each lesion that is difficult to be distinguished from human eyes, or an extent upon which each lesion has an effect. In addition, when the location information of the mark part is used, even in a case where an abnormality of a plant is difficult to be distinguished from human eyes, it is possible to identify the scope and location of the planting pot 101 in the target range, and to remove it from the nutrient solution tray 102.

Figure 22:
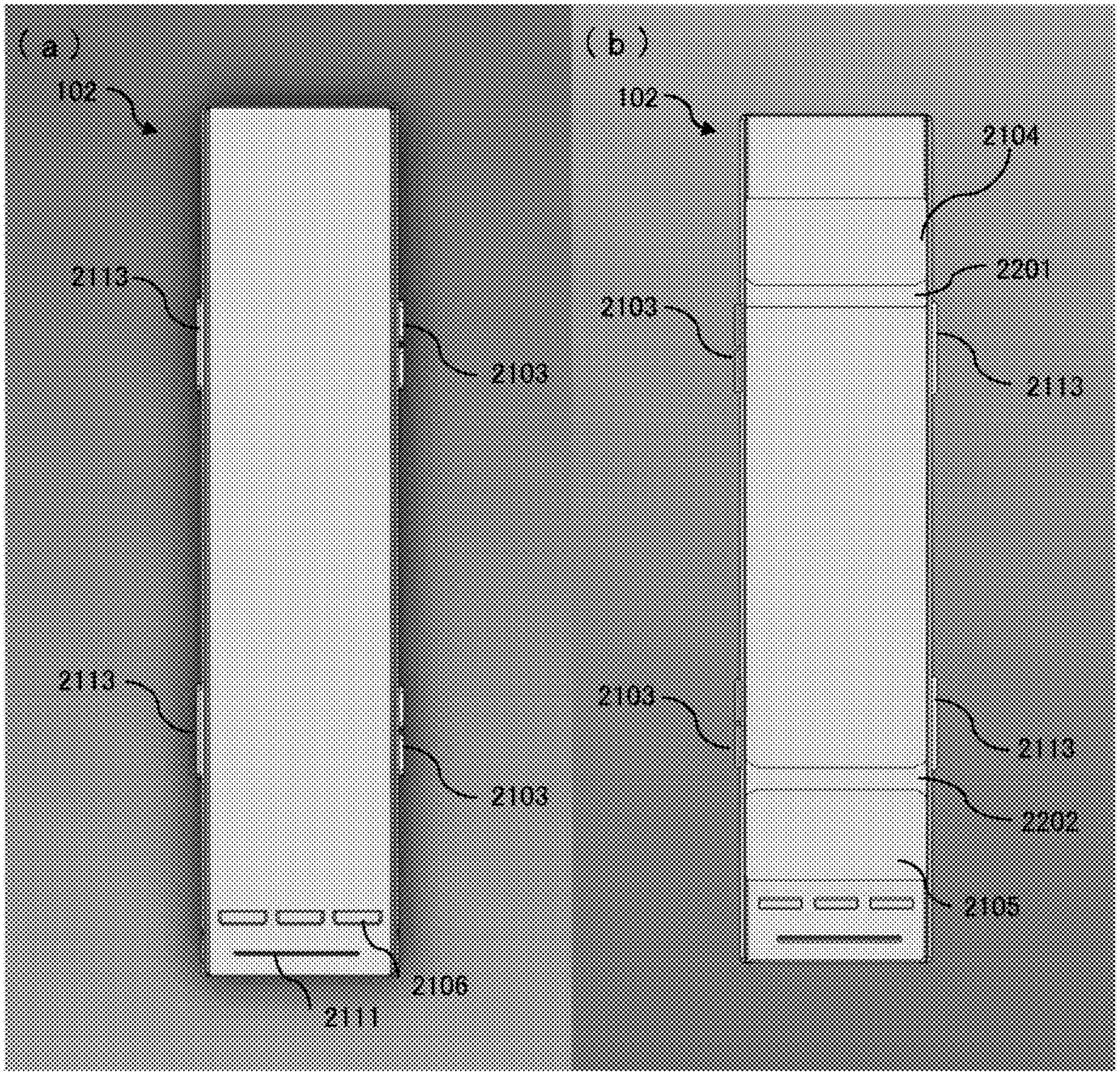

FIG. 22 depicts an example showing a top view and a lower view of the nutrient solution tray.

FIG. 22 (*a*) depicts an example showing a top view of the nutrient solution tray.

FIG. 22 (*b*) depicts an example showing a lower view of the nutrient solution tray.

The respective components of the nutrient solution tray 102 (or, the discharge slit 2111, the protrusion 2106, the leg parts 2104, 2105, the first connecting structure 2103, and the second connecting structure 2113) correspond to the respective components of the nutrient solution tray 102 in FIG. 21, so that the explanation will be omitted.

As illustrated in FIG. 22 (*b*), the lower surface of the nutrient solution tray 102 is provided with a first installation part 2201 and a second installation part 2202. In a condition where the nutrient solution tray 102 is arranged into the cultivation device, the nutrient solution tray 102 comes into contact with two supporting parts having the same height of the cultivation device at the first installation part 2201 and the second installation part 2202, and accordingly, it is supported by the two supporting parts.

Figure 23:
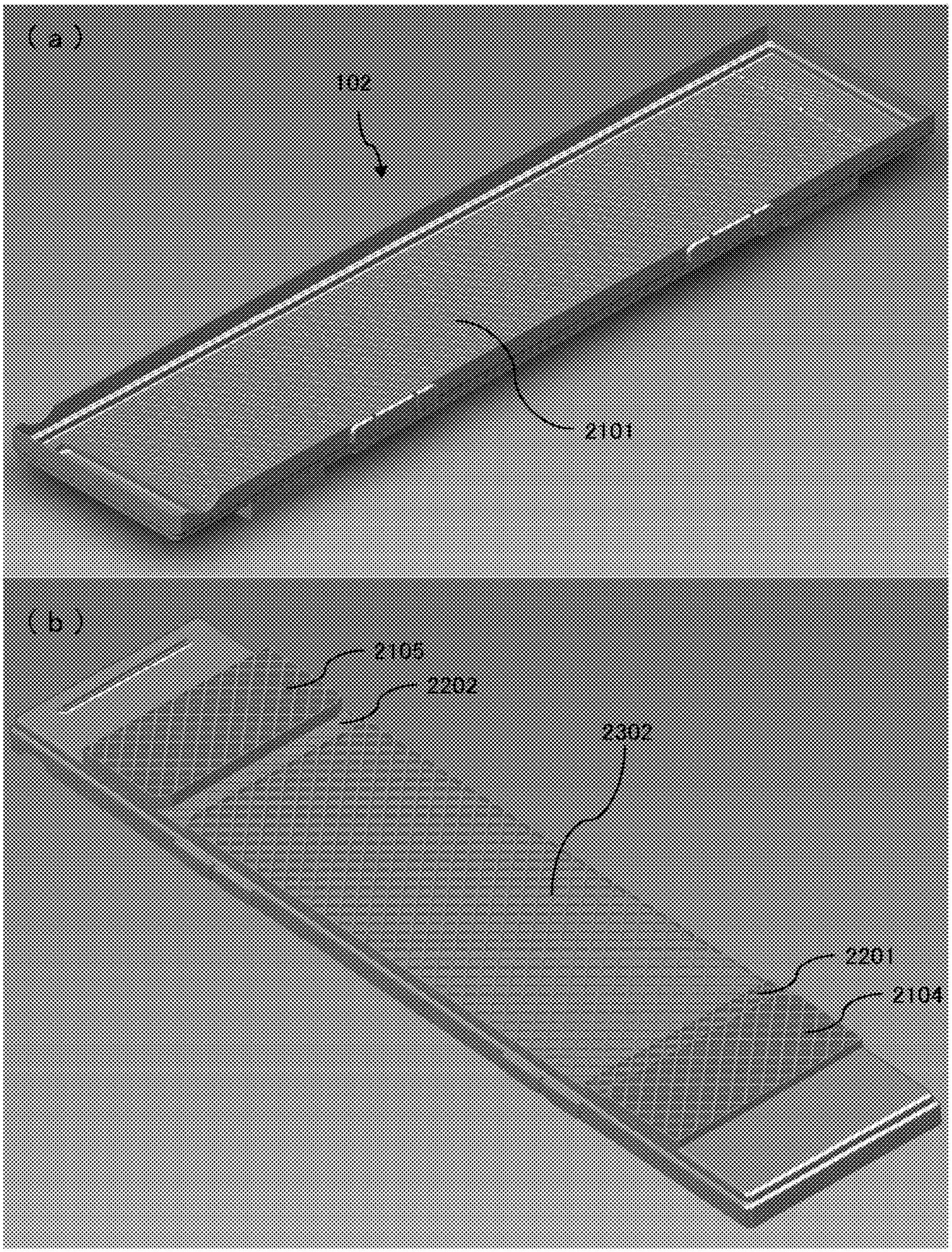
FIG. 23 depicts an example showing a perspective view of the nutrient solution tray having a pattern structure.

FIG. 23 depicts an example showing a perspective view of the nutrient solution tray having a pattern structure.

FIG. 23 (*a*) depicts an example showing a perspective view of the nutrient solution tray having a pattern structure, seen from above.

FIG. 23 (*b*) depicts an example showing a perspective view of the nutrient solution tray having a pattern structure, seen from below.

The nutrient solution tray 102 illustrated in FIG. 23 has a bottom surface 2101 with a pattern structure and a lower surface 2302 with a pattern structure.

In the following description, a "pattern structure" means a structure which is provided on a plane such as the bottom surface 2101 or the lower surface 2302 and is capable of being identified as a three-dimensional pattern with respect to the plane. Incidentally, in FIGS. 23 to 26, a convex structure is illustrated as the pattern structure with regard to the plane on which the convex structure is provided. However, it is possible to provide a concave structure as the pattern structure with regard to the plane on which it is provided.

The pattern structure provided on the bottom surface 2101 promotes to uniformly disperse a nutrient solution to flow in the nutrient solution tray 102. This is explained in more detail with referring to FIGS. 24, 25.

The lower surface 2302 having the pattern structure is provided with a rib pattern structure having a mesh-pattern (for example, hatch pattern or lattice pattern), which allows the stiffness of the nutrient solution tray 102 to be improved while reducing the increase in weight of the nutrient solution tray 102.

Figure 24:
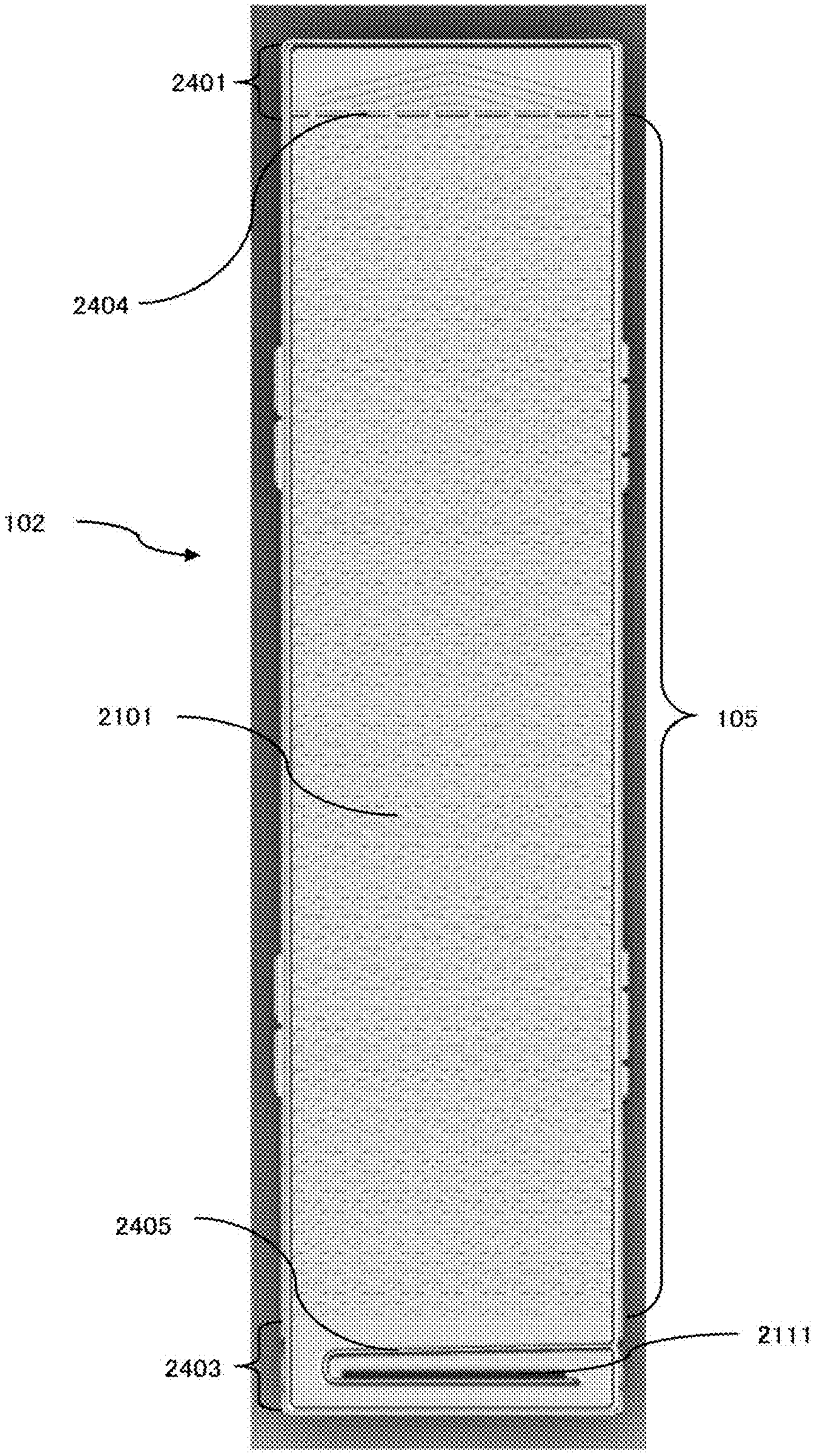
FIG. 24 depicts an example showing a top view of the nutrient solution tray having a pattern structure.

FIG. 24 depicts an example showing a top view of the nutrient solution tray having a pattern structure.

In the embodiment of FIG. 24, the bottom surface of the nutrient solution tray 102 having a pattern structure is formed to have a nutrient solution-inflow area 2401 for allowing the nutrient solution to flow; a planting-pot-receptacle area (or planting-pot-receptacle part) 105 for housing the planting pot(s) 101 therein; and a nutrient solution-outflow area having a discharge slit 2111 which is corresponding to a nutrient solution-outflow port. Thus, the planting-pot-receptacle area 105, the nutrient solution-inflow area 2401, and the nutrient solution-outflow area form a bottom surface on which a nutrient solution flows in the nutrient solution tray 102.

The nutrient solution-inflow area 2401 corresponds to a nutrient solution-inflow part for receiving a nutrient solution flowing in the nutrient solution tray 102. The nutrient solution-inflow area 2401 is provided with a pattern structure. A nutrient solution which is received in the nutrient solution-inflow area 2401 is diffused over an entire width in the shorter side direction of the nutrient solution tray 102 by the pattern structure.

Similarly, the planting-pot-receptacle area 105 is provided with a pattern structure for diffusing a nutrient solution over an entire width in the shorter side direction of the nutrient solution tray 102.

The nutrient solution-outflow area 2403 is provided with a wall part 2405 forming a flow path for guiding a nutrient solution toward the discharge slit 2111.

In the present embodiment, when a pattern structure is provided thereto, the position on the top surface of the pattern structure can be referred to as the bottom surface of the nutrient solution tray 102. However, the bottom surface (in other words, a part of the bottom where a nutrient solution flows) of the nutrient solution tray 102 on which a pattern structure is not provided can also be referred to as the bottom surface.

Figure 25:
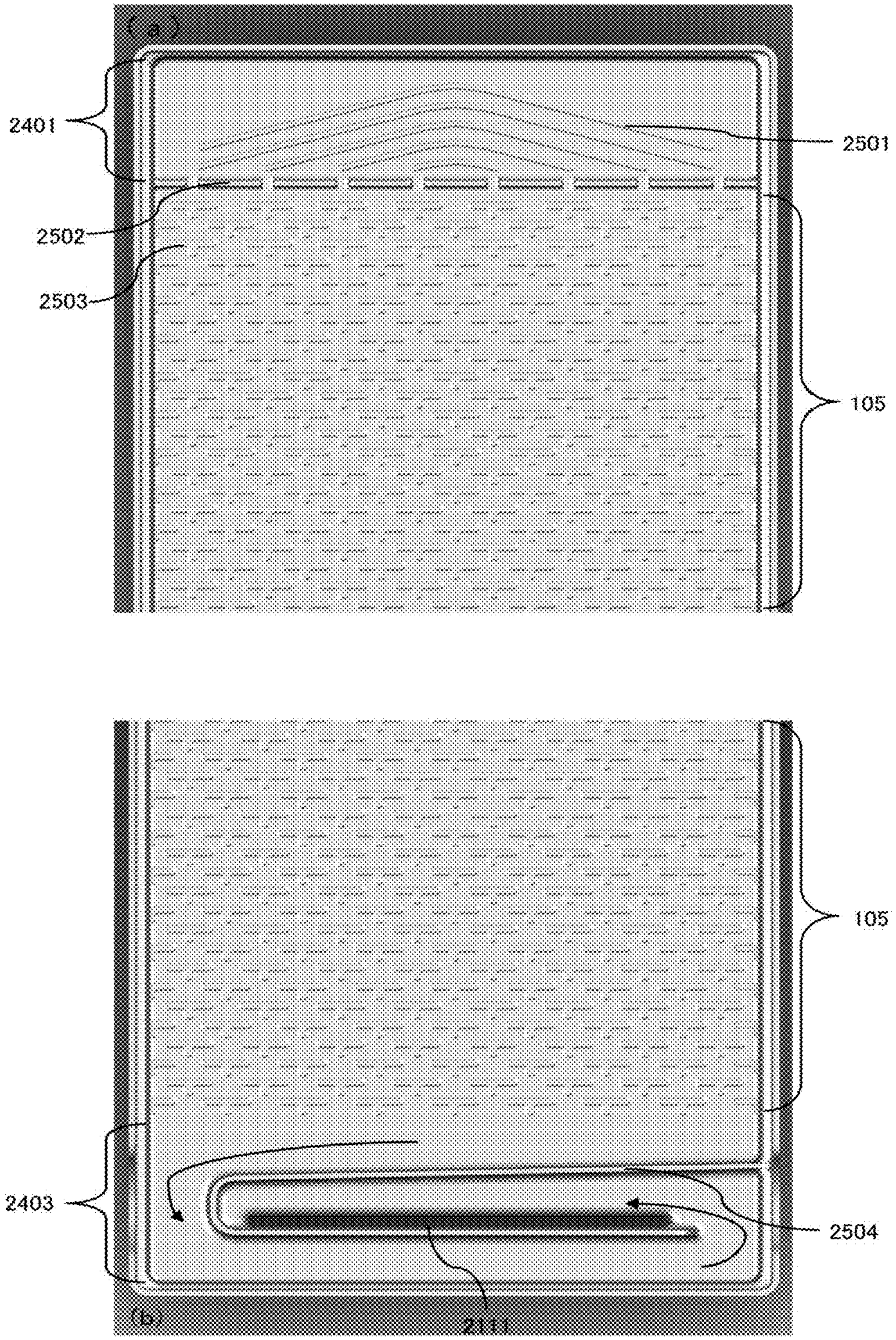
FIG. 25 depicts an example showing an enlarged top view of the end part of the nutrient solution tray having the pattern structure of FIG. 24.

FIG. 25 depicts an example showing an enlarged top view of the end part of the nutrient solution tray having the pattern structure of FIG. 24.

FIG. 25 (*a*) depicts an example showing an enlarged top view of the end area of the nutrient solution-inflow area of the nutrient solution tray having the pattern structure of FIG. 24.

FIG. 25 (*b*) depicts an example showing an enlarged top view of the end area of the nutrient solution-outflow area of the nutrient solution tray having the pattern structure of FIG. 24. The arrow illustrated in the figure represents a flow of nutrient solution toward the discharge slit 2111.

In FIG. 25 (*a*), it is illustrated that a plurality of guide patterns 2501 are formed in the nutrient solution-inflow area 2401 of the nutrient solution tray 102. The guide pattern 2501 can disperse a nutrient solution flowing into the nutrient solution inflow area 2401 over the entire width of the nutrient solution tray 102 so as to guide it toward the planting-pot-receptacle area 105

A plurality of gate patterns (or gating patterns) 2502 are provided between the nutrient solution inflow area 2401 and the planting-pot-receptacle area 105. It is advantageous that the gate patterns 2502 are formed and arranged to make a nutrient solution flow through gaps (or gates) between the gate patterns 2502, for example, which are evenly distributed and arranged so as to make a nutrient solution flow into the planting-pot-receptacle area 105.

The planting-pot-receptacle area 105 advantageously is provided with a plurality of dispersion patterns (or diffusion patterns) 2503 which are arranged evenly distributed over the entire bottom surface of the nutrient solution tray 102 forming the planting-pot-receptacle area 105.

In the embodiment of FIG. 25, all the dispersion patterns 2503 are formed to have a T shape(s) or almost T shape(s). However, the dispersion patterns 2503 may be shaped to have a different shape, or a combination of a plurality of different shapes. The dispersion patterns 2503 may be shaped to have an irregular pattern as long as it can promote to diffuse a nutrient solution in the planting-pot-receptacle area 105.

The guide pattern 2501, the gate pattern 2502, and the dispersion pattern 2503 can promote to diffuse a nutrient solution in the planting-pot-receptacle area 105, especially, at a stage in which a nutrient solution starts to flow into the nutrient solution tray 102.

In the embodiment of FIG. 25, the nutrient outflow area 2403 (FIG. 25 (*b*)) of the nutrient solution tray is provided with a guide wall 2504. After passing through the planting pot receptacle area 2402, a nutrient solution is guided along the guide wall 2504 to flow toward the discharge slit 2111. By providing the guide wall 2507, the flow rate of a nutrient solution flowing through the nutrient solution-outflow area 2403, especially, in the vicinity of a corner of the nutrient solution-outflow area 2403 is increased. Accordingly, it becomes possible to avoid the accumulation of contamination or the like in the corner of the nutrient solution tray 102 and to reduce the occurrence of clogging or contamination at the discharge slit 2111.

Figure 26:
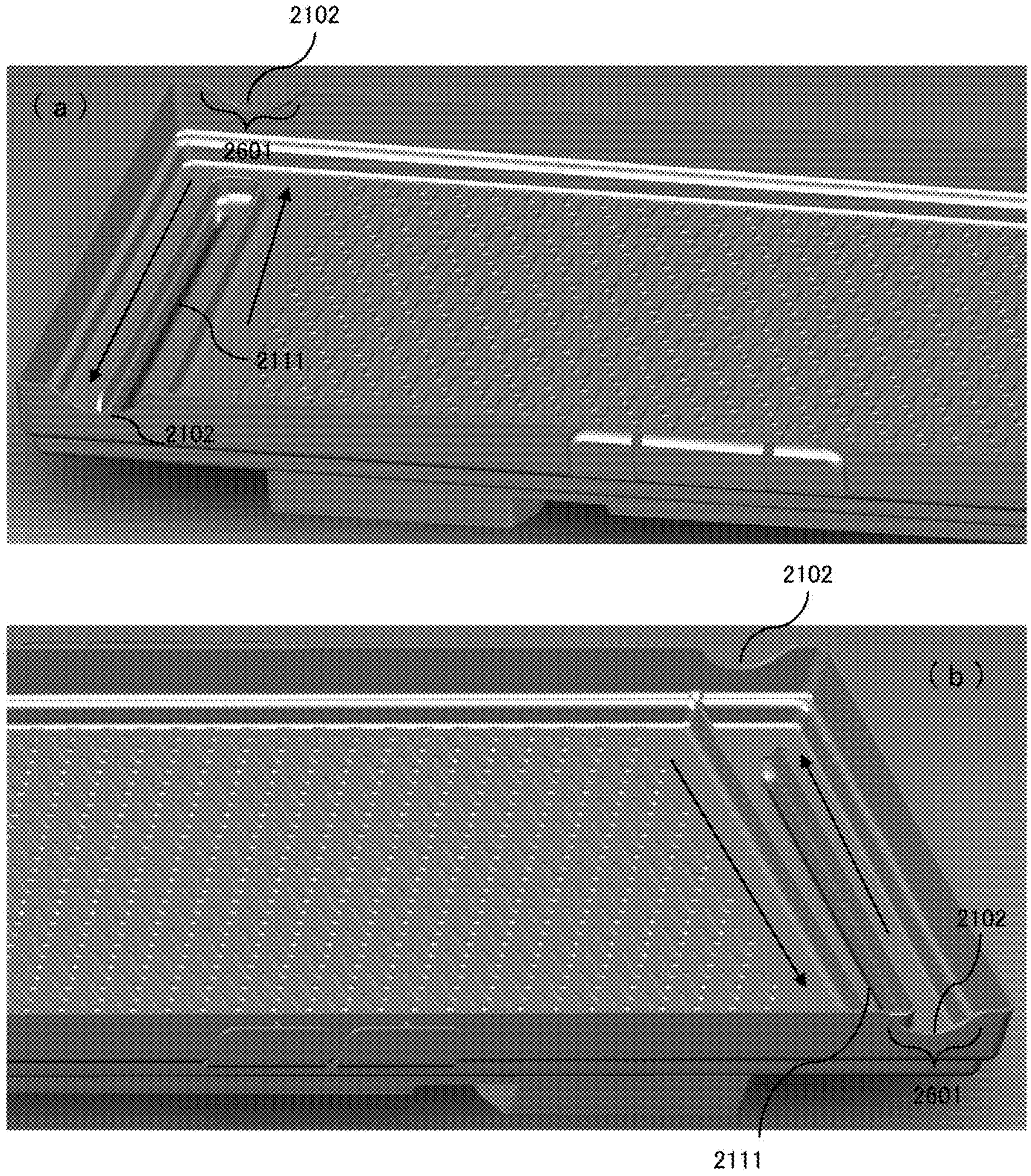
FIG. 26 depicts an example showing an enlarged perspective view of the end part of the nutrient solution tray having the pattern structure of FIG. 24.

FIG. 26 depicts an example showing an enlarged perspective view of the end part of the nutrient solution tray having the pattern structure of FIG. 24.

FIG. 26 (*a*) depicts an example showing an enlarged perspective view of the end part of nutrient solution-inflow area of the nutrient solution tray having the pattern structure of FIG. 24.

FIG. 26 (*b*) depicts an example showing an enlarged perspective view of the end part of nutrient solution-outflow area of the nutrient solution tray having the pattern structure of FIG. 24.

The arrow illustrated in the figure represents a flow of nutrient solution toward the discharge slit 2111.

In FIG. 26 it is illustrated that a concave (or recessed) cutout part 2102 is provided at a predetermined position where water is predicted to rise beyond a certain level (or planned overflow position) 2601 of the wall part of the nutrient solution tray in the extending direction of the discharge slit 2111.

In a condition where the nutrient solution tray 102 is installed in the installation position of the cultivation device, a nutrient solution collector (or recovery unit) of the cultivation device is provided, similarly to the case of the nutrient solution r collect pipe 3109 disposed below the discharge port 3108 in the cultivation room 2910 illustrated in FIG. 31.

Since the cutout 2601 is provided at the planned overflow position 2601 in the extending direction of the discharge slit 2111, it is possible to make a nutrient solution overflow at the cutout 2601, even in a case where the discharge slit 2111 is clogged, or a nutrient solution overflows from the planting unit 100 due to the excessive supply amount of the nutrient solution flowing toward the planting unit 100. Therefore, it is possible to reliably recover a nutrient solution at the nutrient solution collector so as to prevent the device and the like from being wetted and damaged by the nutrient solution overflowing from the unexpected portion of the nutrient solution tray 102 or to prevent other defects from occurring.

Figure 27:
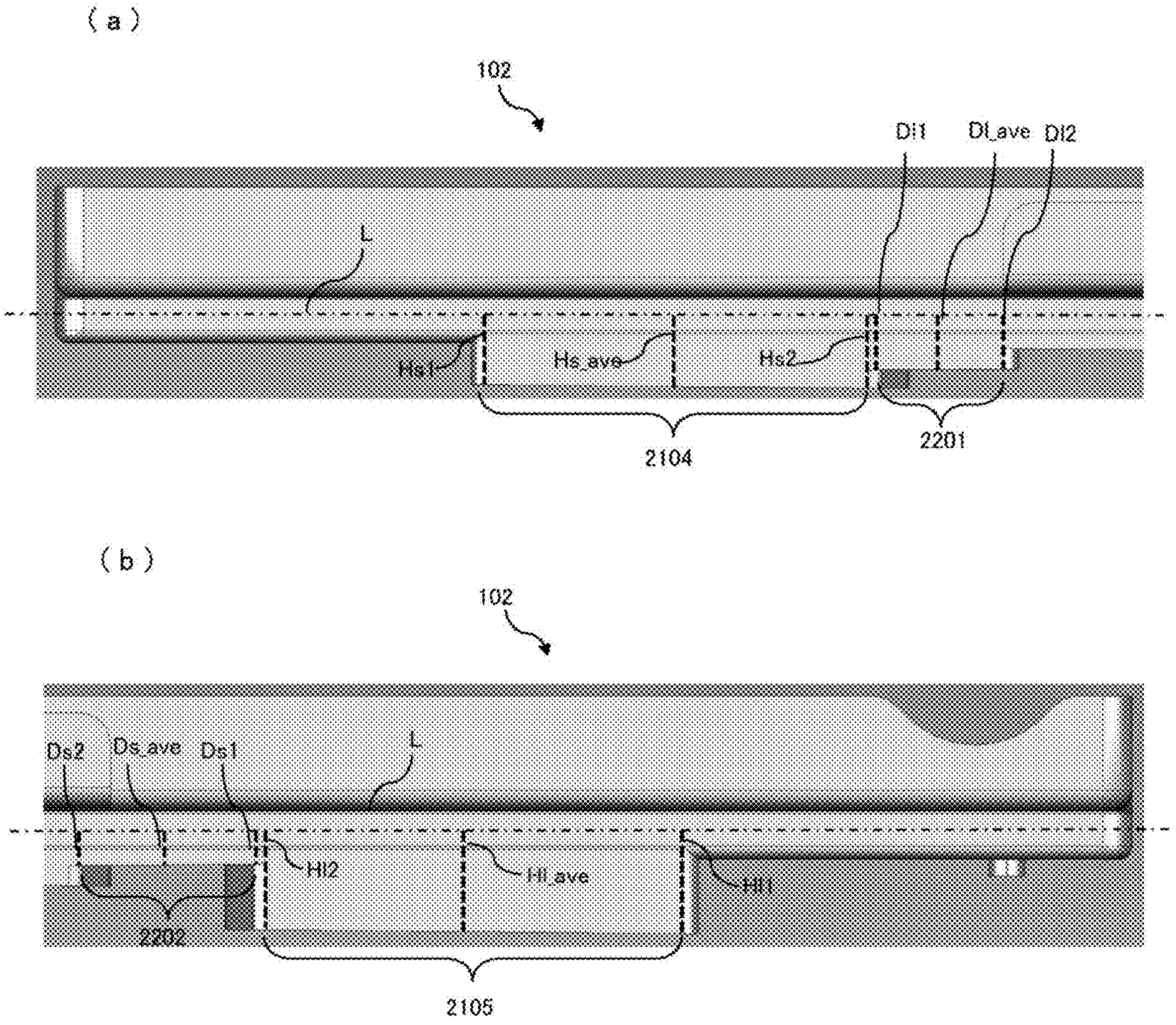
FIG. 27 depicts an example showing a side view of the end area of the nutrient solution tray.

FIG. 27 depicts an example showing a side view of the end area of the nutrient solution tray.

FIG. 27 (*a*) depicts an example showing a side view of the end area of the nutrient solution-inflow area of the nutrient solution tray.

FIG. 27 (*b*) depicts an example showing a side view of the end area of the nutrient solution-outflow area of the nutrient solution tray.

In a case where the nutrient solution tray 102 is supported (or installed) using a first installation surface pair, the nutrient solution tray 102 is inclined in a manner where the nutrient solution-outflow area 2403 is lower than the nutrient solution-inflow area 2401. Alternatively, in a case where the nutrient solution tray 102 is supported using a second installation surface pair, the nutrient solution tray 102 is inclined in a manner where the nutrient solution-outflow area 2403 is upper than the nutrient solution-inflow area 2401.

In the following, this will be explained more specifically.

The end area at the side of the nutrient solution-inflow area 2401 of the nutrient solution tray 102 is provided with the first installation part (the first installation surface) 2201 and the first leg part (the third installation surface) 2104 (FIG. 27 (*a*)).

The end area at the side of the nutrient solution-outflow area 2403 of the nutrient solution tray 102 is provided with the second installation part (the second installation surface) 2202 and the second leg part (the fourth installation surface) 2105 (FIG. 27 (*a*)).

A first installation surface pair which is consisting of the first installation part 2201 and the second installation part 2202 corresponds to a part with which a cultivation device (for example, support frame) comes into contact in a condition where the nutrient solution tray 102 is provided at the inside the cultivation device, for example, on a support frame of a cultivation device.

A second installation surface pair which is consisting of the first leg part 2104 and the second leg part 2105 corresponds to a part with which a worktable or ground, etc., comes into contact in a condition where the nutrient solution tray 102 is placed at the outside of the cultivation device, for example, on a worktable or ground, etc.

The first installation part 2201 and the second installation part 2202 (that is, the first installation surface pair), and the first leg part 2104 and the second leg part 2105 (that is, the second installation surface pair) are designed to have different inclinations, in each case such as the case where the nutrient solution tray 102 is placed at the outside of the cultivation device, and the case where the nutrient solution tray 102 is placed at the inside of the cultivation device.

The first installation part 2201 and the second installation part 2202 constitute the first installation surface pair with which, for example, a support frame of a cultivation device comes into contact, in a condition where the nutrient solution tray 102 is set in the cultivation device and the like.

The first leg part 2104 and the second leg part 2105 constitute the second installation surface pair, and the second installation surface pair is formed to make the nutrient solution tray 102 contact with a work surface of a worktable at the time of performing a spacing work, for example, by putting the nutrient solution tray 102 on a flat working base.

The first leg part 2104 and the first installation part 2201 have different heights (intervals) from a reference line L corresponding to a position of the bottom surface of the nutrient solution tray 102. Furthermore, each of the installation surface of the first leg part 2104 and that of the first installation part 2201 is inclined to the reference line L.

In other words, when the reference line L of the nutrient solution tray 102 is made to be parallel with the horizon, each of the installation surface of the first leg part 2104 and that of the first installation part 2201 is inclined to the horizon.

In the example of FIG. 27 (*a*), the first leg part 2104 has a first height Hs1 and a second height Hs2 at both ends of the nutrient solution tray 102 in the longer side direction. Also, the first leg part 2104 has an average height Hs_ave.

The first installation part 2201 has a first interval D11 and a second interval D12 at both ends of the nutrient solution tray 102 in the longer side direction. In addition, the first installation part 2201 has an average interval Dl_ave.

The second leg part 2105 and the second installation part 2202 have different heights (intervals) from the reference line L of the nutrient solution tray 102 (at the position of the bottom surface). Furthermore, each of the second leg part 2105 and the second installation part 2202 is inclined with respect to the reference line L.

In the embodiment of FIG. 27 (*b*), the second leg part 2105 has a first height H11 and a second height H12 at both ends of the nutrient solution tray 102 in the longer side direction. Also, the second leg part 2105 has an average height Hl_ave.

The second installation part 2202 has a first interval Ds1 and a second interval Ds2 at both ends of the nutrient solution tray 102 in the longer side direction. In addition, the second installation part 2202 has an average interval Ds_ave.

In the embodiment of FIG. 27, the average height Hs_ave of the first leg part 2104 is lower than the average height Hl_ave of the second leg part 2105 (Hs_ave<Hl_ave).

In the embodiment of FIG. 27, the average interval Dl_ave of the first installation part 2201 is longer than the average interval Ds_ave of the second installation part 2202 (Dl_ave>Ds_ave). In the embodiment of FIG. 27, the average height Hs_ave of the first leg part 2104 is longer than the average interval Dl_ave of the first installation part 2201 (Hs_ave>Dl_ave).

That is, the first installation part 2201 (or the first installation surface) is formed on the side of the nutrient solution inflow area 2401 in the longer side direction of the nutrient solution tray 102. The second installation part 2202 (or the second installation surface) is formed on the side of the nutrient solution-outflow area 2403 in the longer side direction of the nutrient solution tray 102. The first installation surface is more distant from the bottom surface than the second installation surface.

Also, the first leg part 2104 (or the third installation surface) is formed on the side of the nutrient solution inflow area 2401 in the longer side direction of the nutrient solution tray. The second leg part 2105 (or the fourth installation surface) is formed on the side of the nutrient solution outflow area 2403 in the longer side direction of the nutrient solution tray. The fourth installation surface is more distant from the bottom surface than the third installation surface.

Figure 28:
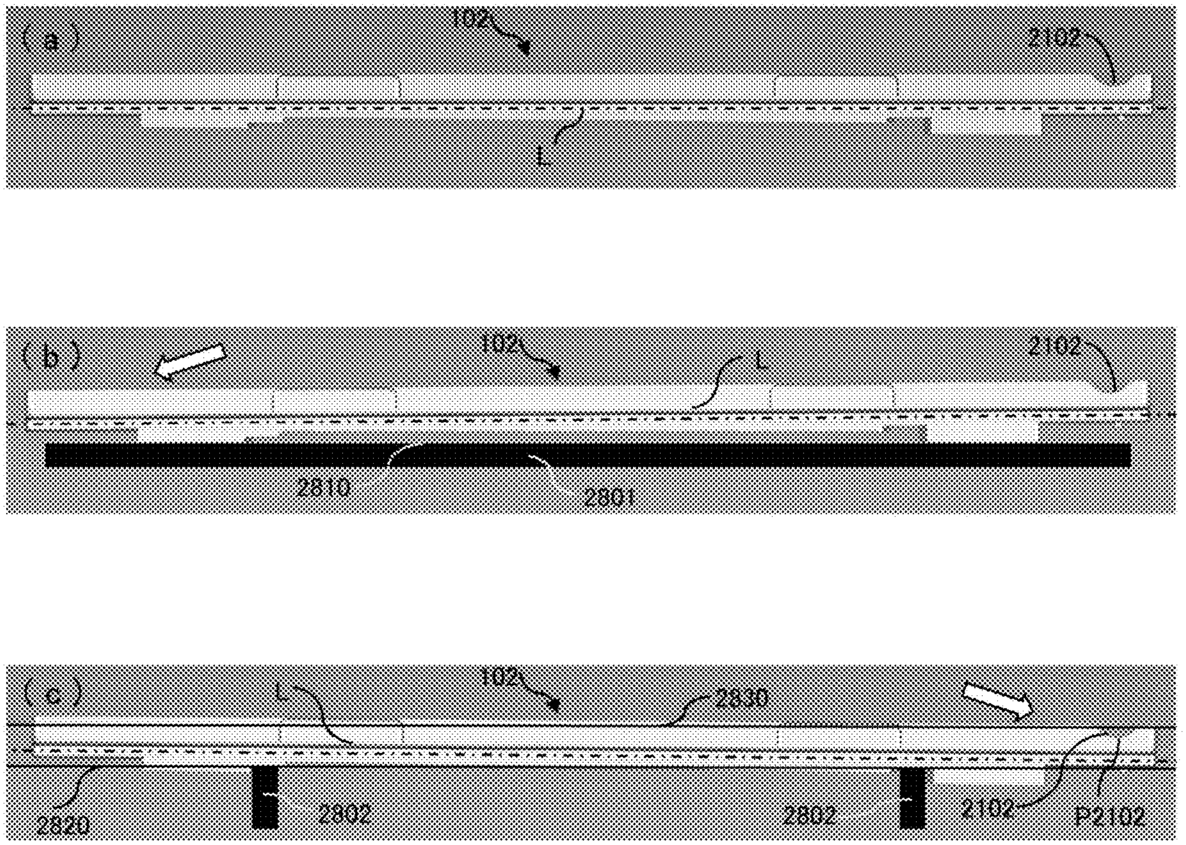
FIG. 28 depicts an example showing side views of the nutrient solution tray in different conditions.

FIG. 28 depicts an example showing side views of the nutrient solution tray in different conditions.

FIG. 28 (*a*) depicts an example showing a side view of the nutrient solution tray 102 in a condition where the reference line L of the nutrient solution tray 102 in FIG. 27 is brought to level.

FIG. 28 (*b*) depicts an example showing a side view of the nutrient solution tray 102 in a condition where it is placed on a flat worktable.

FIG. 28 (*c*) depicts an example showing a side view of the nutrient solution tray 102 in a condition where it is set to a support frame 2802 of a flat cultivation device.

The reference line L corresponds to a position on the bottom surface of the nutrient solution tray 102, but in the condition of FIG. 28 (*a*), the reference line L becomes horizontal. Accordingly, a liquid level of nutrient solution in the nutrient solution tray 102 is made to be parallel with the flat reference line L.

In the condition of FIG. 28 (*b*), the nutrient solution tray 102 is placed on the flat worktable 2801, and as shown by the arrow, it is inclined in a manner where the nutrient solution-inflow area 2401 of the nutrient solution tray 102 is lowered.

In other words, when the nutrient solution tray 102 in a condition where a nutrient solution is stored therein is removed from the cultivation device and is placed on the worktable 2801, or when the nutrient solution tray 102 which is placed on the worktable 2801 is supplied with a nutrient solution, then, it is brought to a condition in which the discharge slit 2111 is upper than the liquid level of the nutrient solution. Accordingly, it becomes possible to prevent (or reduce) the nutrient solution from leaking from the discharge slit 2111 of the nutrient solution tray 102.

In the condition of FIG. 28 (*c*), the nutrient solution tray 102 is placed on the support frame 2802 of the flat cultivation device. As shown by the arrow, it is inclined in a manner where the nutrient solution-outflow area 2403 of the nutrient solution tray 102 is lowered.

In the condition of FIG. 28 (*c*), the support frames 2802 become horizontal in a state right before the connecting of the two support frames 2802 of the cultivation device.

More specifically, the nutrient solution tray 102 is inclined so that the downstream side of a flow of nutrient solution is lowered in the cultivation device. In other words, it is inclined in a manner where the end part of the nutrient solution-outflow area 2403 of the nutrient solution tray 102 is lowered than the end part of the nutrient solution-inflow area 2401. Preferably, this inclination angle is about one degree.

As a result, in a condition in which the nutrient solution tray 102 is set in the cultivation device, a nutrient solution supplied to the nutrient solution-inflow area 2401 of the nutrient solution tray 102 can naturally flow toward the nutrient solution-outflow area 2403 of the nutrient solution tray 102 due to the slope of the nutrient solution tray 102.

FIG. 28 (*c*) further depicts a horizontal line 2830 which passes through the apex of the end wall part of the nutrient solution-outflow area 2403 of the nutrient solution tray 102. In the condition of FIG. 28 (*c*), the lowermost point P2102 of the concave cutout part 2102 which is recessed toward the bottom surface direction is lowered than the horizontal line 2830. Accordingly, when a nutrient solution is injected too much, unnecessary nutrient solution is allowed to flow out from the cutout part 2102.

Therefore, in a case where the nutrient solution tray is provided by using the first installation surface pair, a nutrient solution is made to flow from the nutrient solution-inflow area to the nutrient solution-outflow area so as to flow out from the discharge slit 2111 (nutrient solution-outflow port). On the other hand, in a case where the nutrient solution tray 102 is provided by using the second installation surface pair, the discharge slit 2111 (nutrient solution-outflow port) is made to be upper than the liquid level of the nutrient solution.

Example 2

A spacing set according to the present example is consisting of a cultivation plate, a cultivation plate spacer, and a nutrient solution tray, and is configured to be used, similar to the case of the planting pot of the Example 1, with a nutrient solution tray, for example, in a plant factory that depends on artificial lighting. The spacing set is configured to be used preferably in a plant factory having a large production scale, while managing the cultivation environment is considered as difficult in the conventional type.

Figure 34:
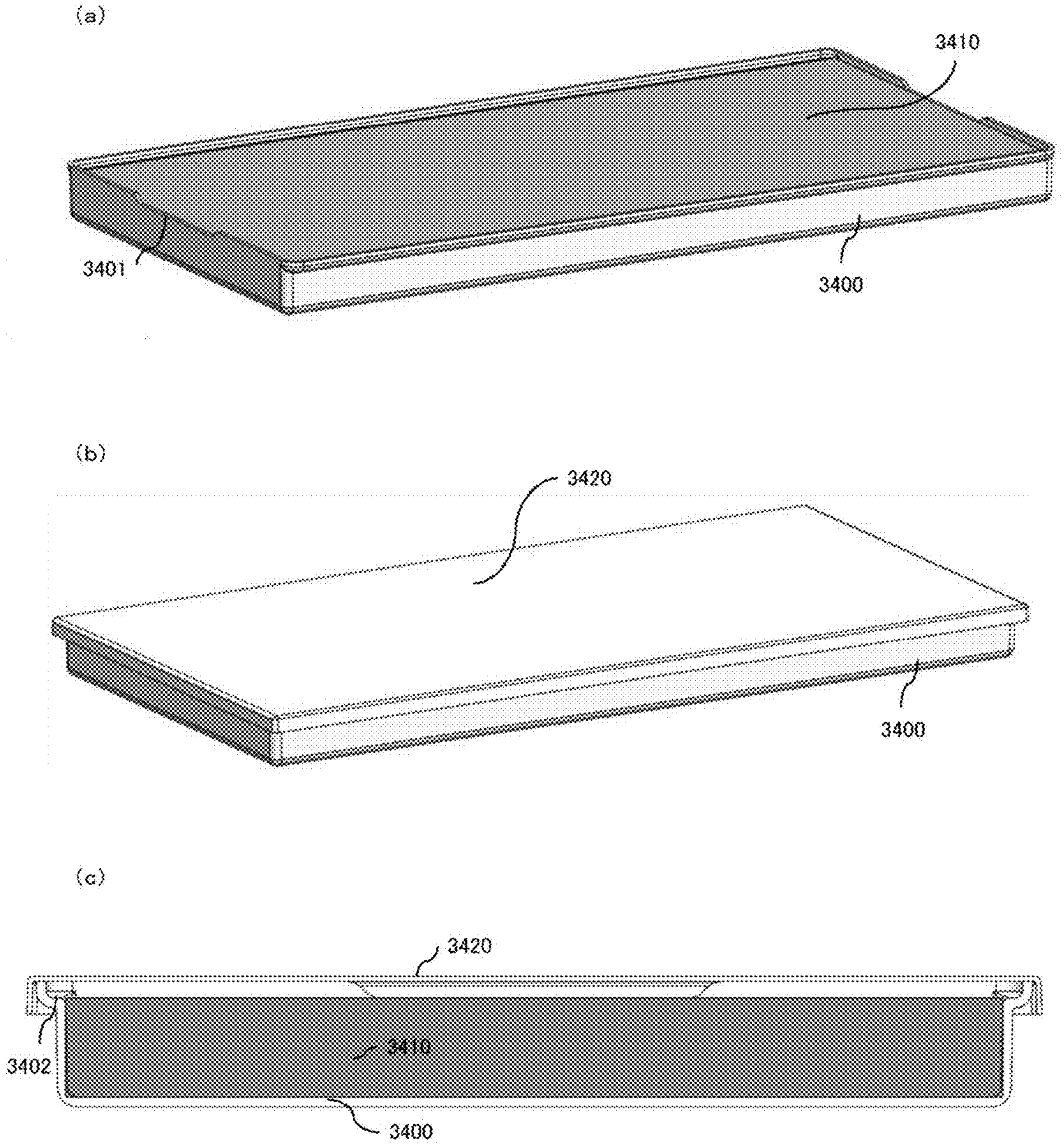
FIG. 34 depicts an example giving an explanation of a seeding tray.

FIG. 34 depicts an example giving an explanation of the seeding tray.

FIG. 34 (*a*) depicts an example showing a perspective view of a seeding tray 3400 housing a sponge culture medium (or, a culture medium made of sponge) 3410.

FIG. 34 (*b*) depicts an example showing a perspective view of the seeding tray 3400 which is covered with a lid 3420.

FIG. 34 (*c*) depicts an example showing a sectional view of the seeding tray 3400 illustrated in FIG. 34 (*b*).

The seeding tray 3400 is capable of housing or housing the sponge culture medium 3410 therein. The sponge culture medium 3410 may be made of, for example, a urethane foam, but the culture medium 3410 may be made of other synthetic materials. In addition, it is possible to use a rock wool (or culture mat) instead of the sponge culture medium 3410.

The sponge culture medium 3410 is configured to have a plurality of slits (for example, H-shaped slits) for allowing to put or contain a plant seed or the like therein.

Further, the seeding tray 3400 is capable of storing a nutrient solution therein. A seed or the like planted in the sponge culture medium 3410 is allowed to absorb a nutrient solution through the sponge culture medium 3410 to be grown.

The seeding tray 3400 is provided with a cutout part 3401 and a step part 3402.

The step part 3402 may be aligned with a height position of the sponge culture medium 3410.

Likewise, a lower edge of the cutout part 3401 may be aligned with the height position of the sponge culture medium 3410.

In this constitution, the seeding tray 3400 is capable of being easily immersed in a water and/or a nutrient solution, integrated with the sponge culture medium 3410. The amount of the water and/or the nutrient solution stored in the seeding tray 3400 may be easily adjusted to appropriate amount, by lifting up the immersed seeding tray 3400.

Also, the water and/or the nutrient solution may be discharged from the cutout part 3401 without tilting the seeding tray 3400.

By increasing the height of the edge of the seeding tray 3400, the water and/or the nutrient solution stored in the seeding tray 3400 may be prevented from deviating and leaking in a case where the seeding tray 3400 is transported, in a case where the automatic transportation is carried out for the seeding tray 3400, or in a case where different treatment is performed, and accordingly, the acceleration, the deceleration and/or the impact is generated to the seeding tray 3400.

In a constitution in which the seeding tray 3400 is transported using an automatic transportation system, it is preferable that the cutout part 3401 is provided on a wall surface which is not positioned in the transfer direction of the automatic transportation system, in order to prevent the overflow of the water and/or the nutrient solution from the seeding tray 3400.

The step part 3402 may also be used as a guide for the depth direction.

The seeding tray 3400 is configured to be able to be covered with a lid 3420. Accordingly, an evaporation of the water and/or the nutrient solution from the seeding tray 3400 may be moderately suppressed, immediately after the seeding.

Figure 35:
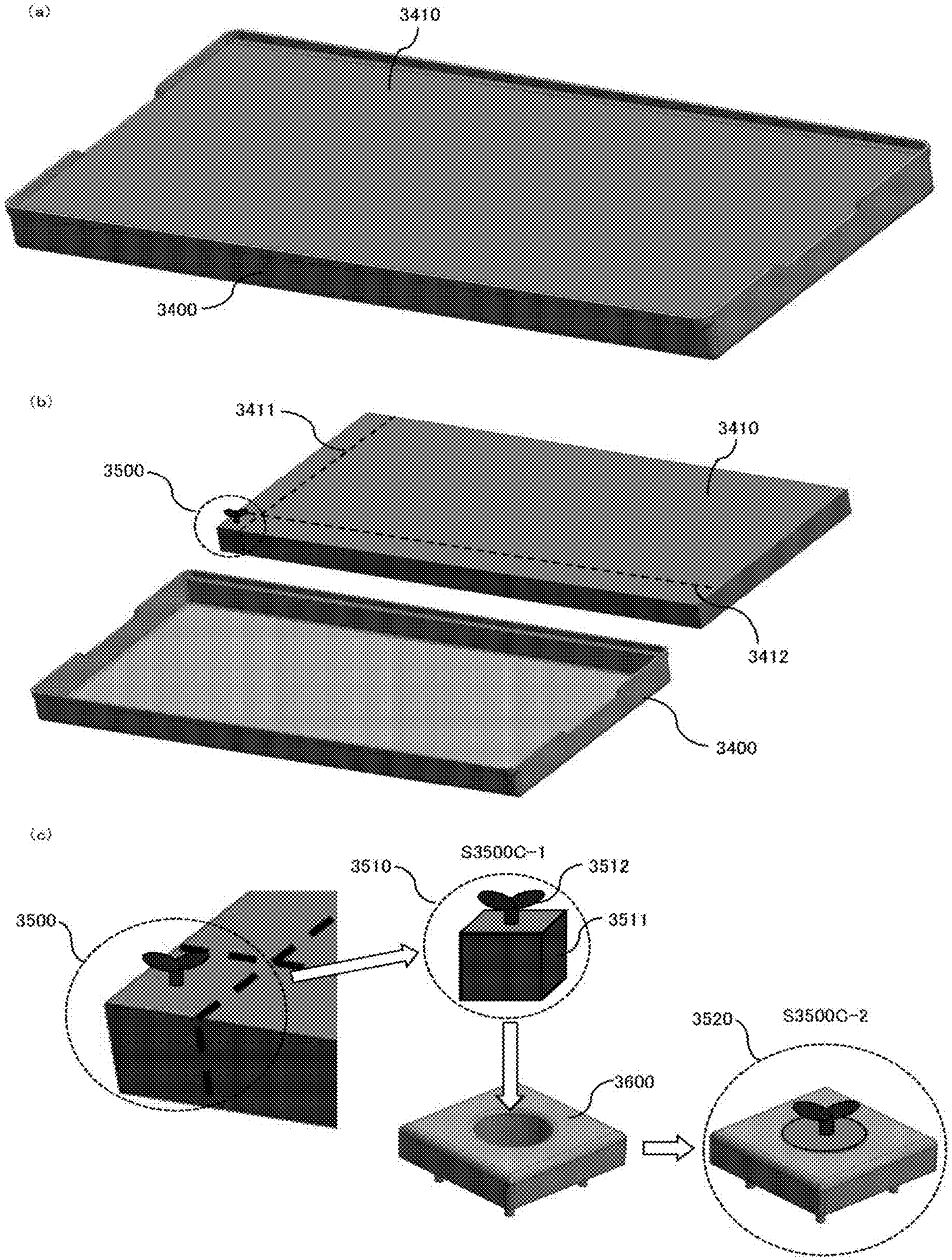
FIG. 35 depicts an example giving another explanation of the seeding tray

FIG. 35 depicts an example giving another explanation of the seeding tray.

FIG. 35 (*a*) depicts an example showing another perspective view of the seeding tray 3400 in a state in which the sponge culture medium 3410 is housed.

FIG. 35 (*b*) depicts an example giving an explanation of a state in which the sponge culture medium 3410 containing a germinating plant is taken out from the seeding tray 3400.

FIG. 35 (*c*) depicts an example giving an explanation of processes of housing the germinating plant at the sponge culture medium 3410 into the cultivation plate 3600.

It is intended that a plant is cultivated in the seeding tray 3400 containing the sponge culture medium 3410 for a period of time until the plant is sufficiently germinated, after having been germinated.

A part of the sponge culture medium 3511 containing a germinated plant(s) 3512 is torn off as a medium 3510 to be transplanted, for example, along predetermined break lines 3411, 3412 (such as perforation lines) formed in the sponge culture medium 3410 (S3500C-1).

A set 3500 of the part of the sponge culture medium 3511 and the germinated plant 3512 is placed in a cultivation hole 3610 of the cultivation plate 3600 (S3500C-2). As a result, a cultivation plate 3520 having the germinated plant 3512 is prepared.

In FIG. 35 (*b*), only one germinated plant 3512 is illustrated. However, in practice, several tens to hundreds of the sets 3500 of the parts of the sponge culture medium 3511 and germinated plants 3512 may be obtained from one sponge culture medium 3410.

Figure 36:
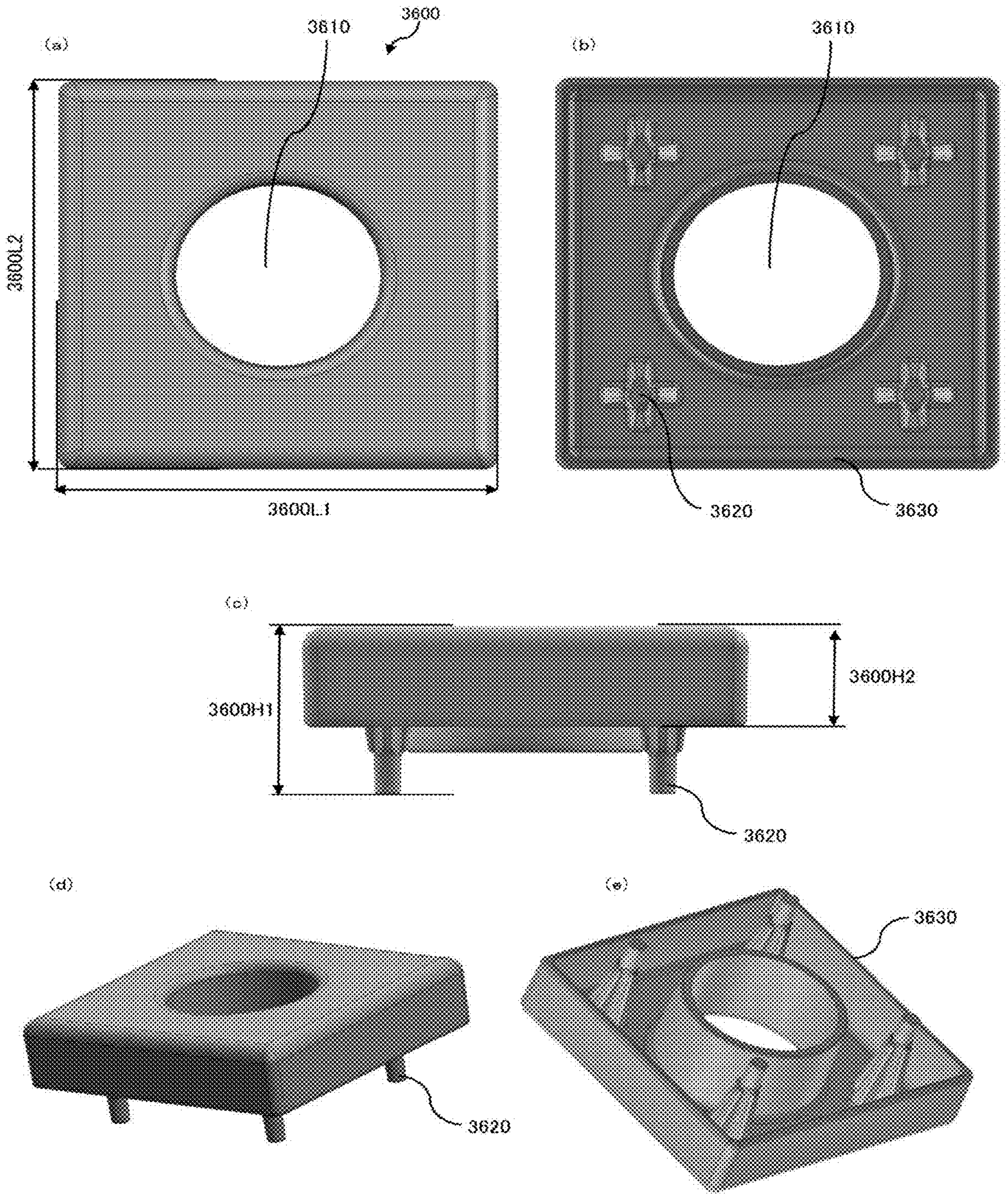
FIG. 36 depicts an example giving an explanation of a cultivation plate.

FIG. 36 depicts an example giving an explanation of the cultivation plate.

FIG. 36 (*a*) depicts an example showing a top view of the cultivation plate 3600.

FIG. 36 (*b*) depicts an example showing a lower view of the cultivation plate 3600.

FIG. 36 (*c*) depicts an example showing a side view of the cultivation plate 3600.

FIG. 36 (*d*) depicts an example showing an upward perspective view of the cultivation plate 3600.

FIG. 36 (*e*) depicts an example showing a downward perspective view of the cultivation plate 3600.

The cultivation plate 3600 is configured to have a cultivation hole 3610 at the center thereof for housing and holding a germinated plant 3512 integrated with a part of the sponge culture medium 3511.

The functions of the cultivation hole 3610 have the similar configurations and functions of the pot hole 110 of the Example 1, and thus the detailed descriptions thereof are omitted.

The cultivation plate 3600 has a length 3600L1 in a first direction in FIG. 36 (*a*) and a second length 3600L2 in a second direction in FIG. 36 (*a*). In particular, the cultivation plate 3600 may have a square shape in which the length 3600L1 in the first direction and the length 3600L2 in the second direction are equal.

In the following descriptions, the left-right (lateral) direction in figures may be described as the first direction, and the up-down (vertical) direction in figures may be described as the second direction.

The cultivation plate 3600 has four leg parts 3620. The height from a tip of the leg part to an upper surface of the cultivation plate 3600 is made to be 3600H1.

The cultivation plate 3600 has an edge 3630. The height from the edge 3630 to the upper surface of the cultivation plate 3600 is made to be 3600H2.

Preferably, the height 3600H1 measured from the tip of the leg part to the upper surface of the cultivation plate 3600 is longer than the height 3600H2 measured from the edge 3630 to the upper surface of the cultivation plate 3600.

Figure 37:
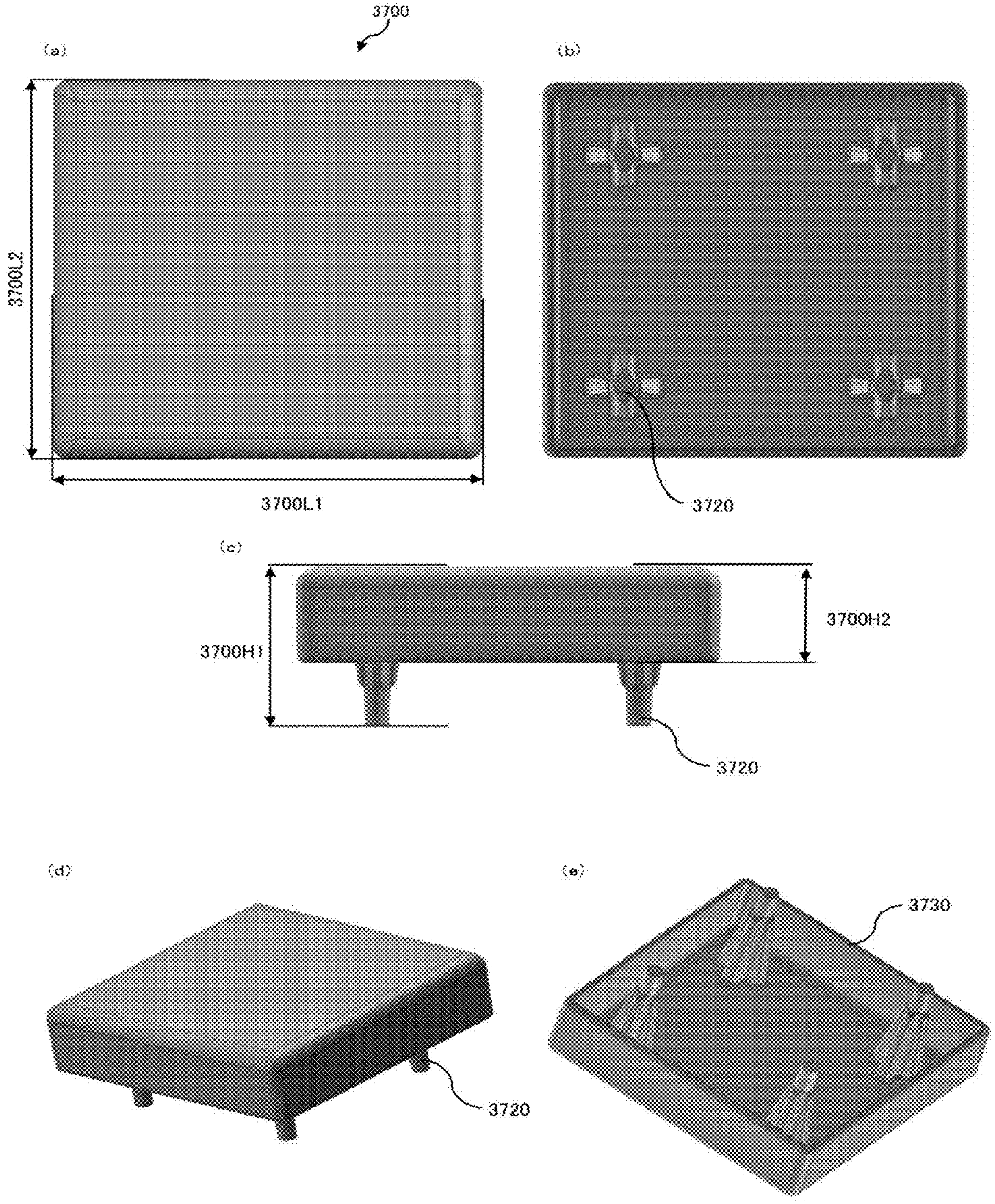
FIG. 37 depicts an example giving an explanation of a cultivation plate spacer.

FIG. 37 depicts an example giving an explanation of a cultivation plate spacer.

FIG. 37 (*a*) depicts an example showing a top view of the cultivation plate spacer 3700.

FIG. 37 (*b*) depicts an example showing a lower view of the cultivation plate spacer 3700.

FIG. 37 (*c*) depicts an example showing a side view of the cultivation plate spacer 3700.

FIG. 37 (*d*) depicts an example showing an upward perspective view of the cultivation plate spacer 3700.

FIG. 37 (*e*) depicts an example showing a downward perspective view of the cultivation plate spacer 3700.

The cultivation plate spacer 3700 has a length 3700L1 in the first direction in FIG. 37 (*a*) and a length 3700L2 in the second direction in FIG. 37 (*a*). In particular, the cultivation plate spacer 3700 may have a square shape in which the length 3700L1 in the first direction and the length 3700L2 in the second direction are equal.

The cultivation plate spacer 3700 has four leg parts 3720. The height from a tip of the leg part to an upper surface of the cultivation plate spacer 3700 is made to be 3700H1.

The cultivation plate spacer 3700 has an edge 3730. The height from the edge 3730 to the upper surface of the cultivation plate spacer 3700 is made to be 3700H2.

Preferably, the height 3700H1 measured from the tip of the leg part to the upper surface of the cultivation plate spacer 3700 is longer than the height 3700H2 measured from the edge 3730 to the upper surface of the cultivation plate spacer 3700.

Preferably, the sizes of the respective parts of the cultivation plate 3600 and the sizes of the respective parts of the cultivation plate spacer 3700 are equal. The explanation is given below on a case where the lengths of the respective sides of the cultivation plate 3600 and the lengths of the respective sides of the cultivation plate spacer 3700 are equal (3600L1=3600L2=3700L1=3700L2).

By combining the above-mentioned cultivation plate 3600 and cultivation plate spacer 3700, a very flexible and easy spacing can be realized, as described below.

In FIGS. 36 and 37, it is illustrated that both of the cultivation plate 3600 and the cultivation plate spacer 3700 have a general square shape. However, each of the cultivation plate 3600 and the cultivation plate spacer 3700 may be formed in another polygonal shape, such as a regularly hexagonal shape.

In such a constitution, a side wall part or the like of the nutrient solution tray 4200 may be formed to have a concave part (or recessed part) or convex part (or projecting part) which is corresponding or complementary thereto. In such a constitution, it becomes possible to effectively restrain a slipping, etc., of the cultivation plate 3600 and the cultivation plate spacer 3700 due to the transportation, etc., of the nutrient solution tray 4200, for example, by engaging the contours of the polygonal shapes of the cultivation plate 3600 and the cultivation plate spacer 3700 with the contour of the concave part or convex part on the side wall of the nutrient solution tray 4200.

Figure 38:
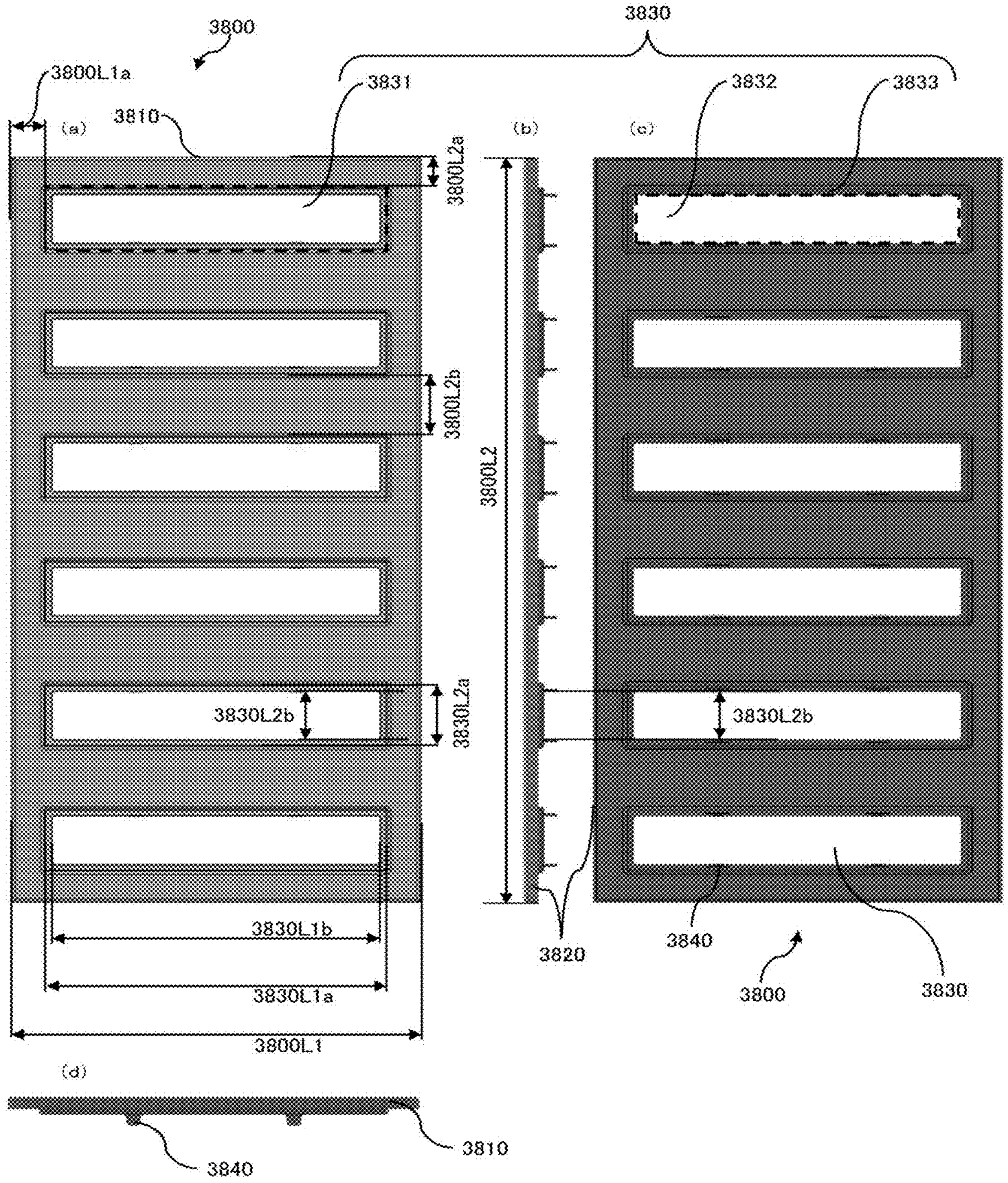
FIG. 38 depicts an example giving an explanation of a cultivation panel.

FIG. 38 depicts an example giving an explanation of a cultivation panel.

FIG. 38 (*a*) depicts an example showing a top view of the cultivation panel 3800.

FIG. 38 (*b*) depicts an example showing a side view of the cultivation panel 3800.

FIG. 38 (*c*) depicts an example showing a lower view of the cultivation panel 3800.

FIG. 38 (*d*) depicts an example showing a front view of the cultivation panel 3800.

The cultivation panel 3800 has a length 3800L1 in the first direction in FIG. 38 (*a*) and a length 3800L2 in the second direction in FIG. 38 (*a*).

Preferably, a third integer multiple of the length 3800L1 of the short side of the cultivation panel 3800 corresponds to the length of the shorter side direction of the receptacle area 4920 of the nutrient solution tray 4200.

For example, the length 3800L1 of the short side of the cultivation panel 3800 is in a range of from about 20 cm to about 40 cm.

The third integer multiple is, for example, one or two times.

Preferably, a fourth integer multiple of the length 3800L2 of the long side of the cultivation panel 3800 corresponds to the length of the longer side direction of the receptacle area 4920 of the nutrient solution tray 4200.

Preferably, a fourth integer multiple of the length 3800L2 of the long side of the cultivation panel 3800 corresponds to the length of the longer side direction of the receptacle area 4920 of the nutrient solution tray 4200.

For example, the length 3800L2 of the long side of the cultivation panel 3800 is in a range of from about 45 cm to about 90 cm.

The fourth integer multiple is, for example, from two to four times.

A plurality of openings 3830 are formed in the cultivation panel 3800. Each opening 3830 has an upper opening surface 3831 and a lower opening surface 3832, and the surface area of the upper opening surface 3831 is larger than the surface area of the lower opening surface 3832.

In the cultivation panel 3800 illustrated in FIG. 38, a plurality of openings 3830 are formed in the short side of the cultivation panel 3800. In another constitution, it is possible to form a plurality of openings 3830 in the long side of the cultivation panel 3800.

The upper opening surface 3831 of the opening 3830 has a length 3830L1*a* in the first direction in FIG. 38 (*a*), and a length 3830L2*a* in the second direction in FIG. 38 (*a*). The upper opening surface 3831 is an example of the first opening surface.

Preferably, the opening 3830 is formed so that a fifth integer multiple of a length of one side of the cultivation plate 3600 and the cultivation plate spacer 3700 corresponds to the length 3830L1*a* in the longer side direction of the upper opening surface 3831.

The fifth integer multiple is, for example, from four to eight times.

Preferably, the opening 3830 is formed so that a sixth integer multiple of a length of one side of the cultivation plate 3600 and the cultivation plate spacer 3700 corresponds to the length 3830L2*a* in the shorter side direction of the upper opening surface 3831.

The sixth integer multiple is, for example, one or two times. In a case where the he sixth integer multiple is two times, a beam member extending in the longer side direction of the opening 3830 may be formed at the lower opening surface 3832 of the opening 3830 to divide the lower opening surface 3832 into two.

The lower opening surface 3832 of the opening 3830 has a length 3830L1*b* in the first direction in FIG. 38 (*a*), and a length 3830L2*b* in the second direction in FIG. 38 (*a*). The lower opening surface 3832 is an example of the second opening surface.

A lower-opening-surface-peripheral edge (or circumferential edge of the lower opening surface) 3833 is formed around the lower opening surface 3832 of the opening 3830. The surface area of the upper opening surface 3831 is approximately equal to the sum of the surface area of the lower opening surface 3832 and that of the lower-opening-surface-peripheral edge 3833.

The length 3830L2*a* in the second direction of the upper opening surface 3831 of the opening 3830 is approximately equal to, but slightly larger than the lengths 3600L1, 3600L2 of the respective sides of the cultivation plate 3600 and the lengths 3700L1, 3700L2 of the respective sides of the cultivation plate spacer 3700.

Accordingly, it becomes possible to easily and stably accommodate the cultivation plate 3600 and the cultivation plate spacer 3700 into the opening 3830.

The length 3830L2*b* in the second direction of the lower opening surface 3832 of the opening 3830 is smaller than the lengths 3600L1, 3600L2 of the respective sides of the cultivation plate 3600 and the lengths 3700L1, 3700L2 of the respective sides of the cultivation plate spacer 3700.

Accordingly, it becomes possible to accommodate the cultivation plate 3600 and the cultivation plate spacer 3700 in the opening 3830 not to be dropped off from the lower opening surface 3832.

The opening 3830 is made to be separated from the long-side-outer peripheral edge (or outer peripheral edge along the long side) 3820 of the cultivation panel 3800, by a length 3800L1*a* in the lateral direction (or shorter side direction).

The length 3800L1*a* is approximately half the length 3600L1, 3600L2 of each side of the cultivation plate 3600, the length 3700L1, 3700L2 of each side of the cultivation plate spacer 3700, and the length 3830L2*a* in the second direction of the upper opening surface 3831 of the opening 3830.

Each of the opening 3830 formed at the both sides in the longer side direction of the cultivation panel 3800 is separated from the short-side-outer peripheral edge (or outer peripheral edge along the short side) 3810 of the cultivation panel 3800, by a length 3800L2*a* in the longitudinal direction (or longer side direction).

The length 3800L2*a* is approximately half the length 3600L1, 3600L2 of each side of the cultivation plate 3600, the length 3700L1, 3700L2 of each side of the cultivation plate spacer 3700, and the length 3830L2*a* in the second direction of the upper opening surface 3831 of the opening 3830.

In another example, it is preferable that the length 3800L1*a* and the length 3800L2*a* are made to correspond to the length 3600L1, 3600L2 of each side of the cultivation plate 3600 and the length 3700L1, 3700L2 of each side of the cultivation plate spacer 3700.

By using the above-mentioned cultivation panel 3800, it becomes possible to reproduce a comparable arrangement with regard to some arrangements using only the cultivation plate 3600 and the cultivation plate spacer 3700, for example, by using only the cultivation plate 3600 and the cultivation panel 3800, as described below.

The respective openings 3830 are separated with a prescribed interval of a length 3800L2*b* in the longer side direction in FIG. 38 (*a*). The length 3800L2*b* is approximately equal to the length 3600L1, 3600L2 of each side of the cultivation plate 3600, the length 3700L1, 3700L2 of each side of the cultivation plate spacer 3700, and the length 3830L2*a* in the second direction of the upper opening surface 3831 of the opening 3830.

The lower opening surface 3832 of each opening 3830 is provided with four leg parts 3840.

Preferably, the leg part 3840 is formed in the lower-opening-surface-peripheral edge 3833.

Figure 39:
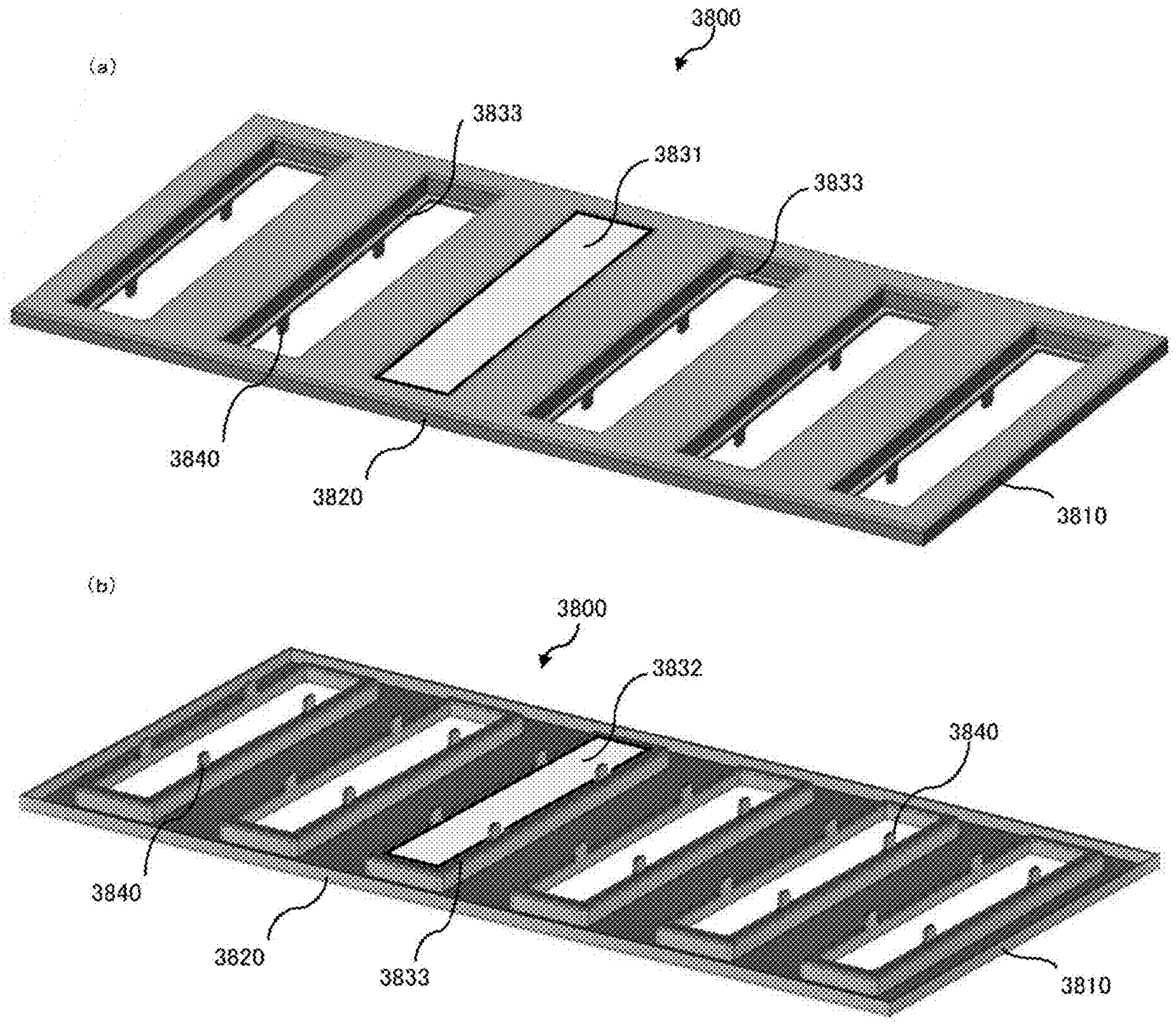
FIG. 39 depicts an example giving another explanation of the cultivated panel.

FIG. 39 depicts an example giving another explanation of the cultivated panel.

FIG. 39 (*a*) depicts an example showing an upward perspective view of the cultivation panel 3800.

FIG. 39 (*b*) depicts an example showing a downward perspective view of the cultivation panel 3800.

In FIG. 39 (*a*), one of the upper opening surfaces 3831 is illustrated as a virtual plane surrounded by a straight line, to be seen clearly.

In FIG. 39 (*b*), one of the lower opening surfaces 3832 is illustrated as a virtual plane surrounded by a straight, to be seen clearly.

From FIG. 39 (*b*), the configuration in which the leg parts 3840 are formed in the lower-opening-surface-peripheral edge 3833 is more clearly shown, as described above.

Figure 40:
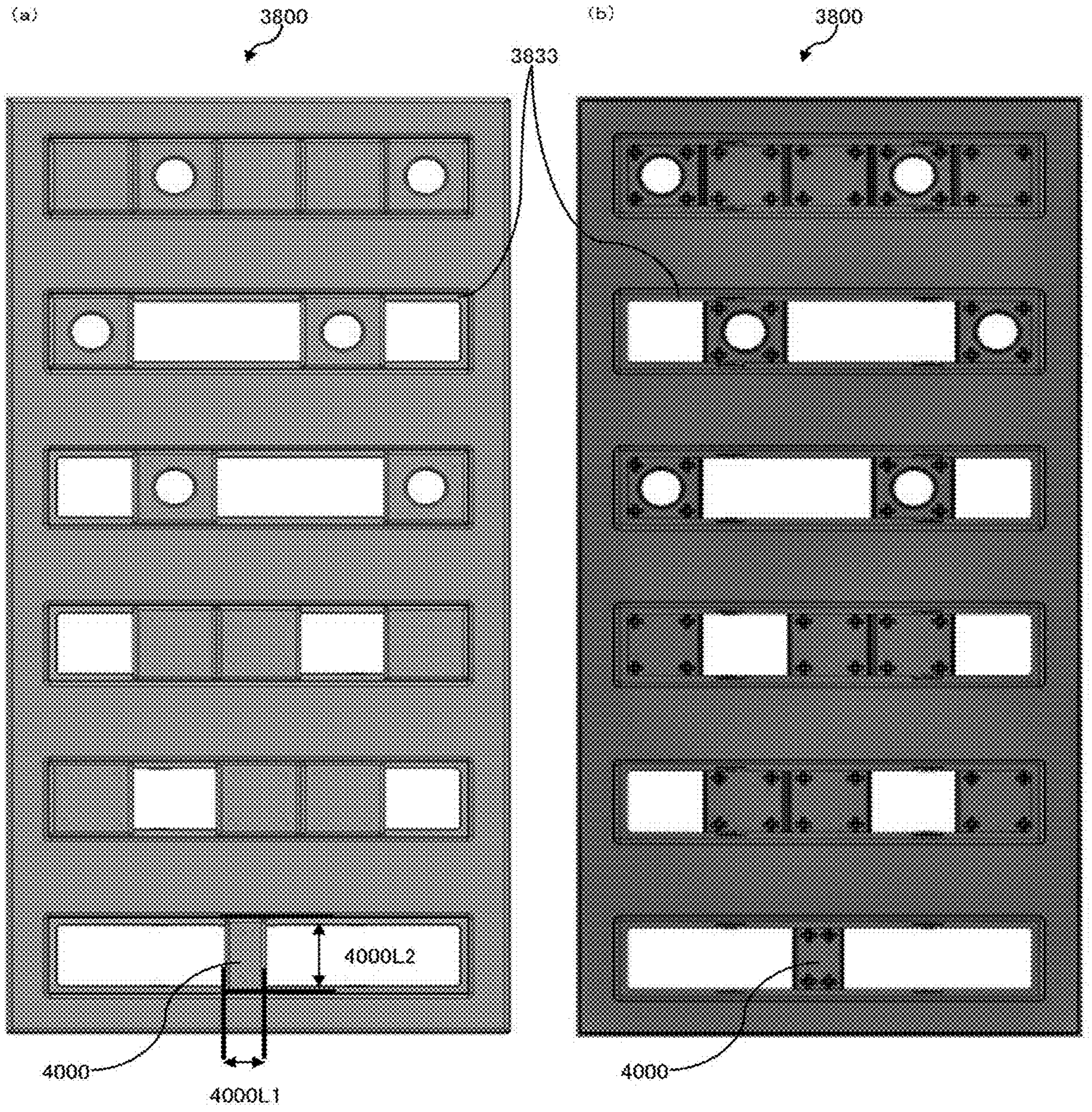
FIG. 40 depicts an example giving an explanation of the arrangement of the cultivation plate and the cultivation plate spacer in the cultivation panel.

FIG. 40 depicts an example giving an explanation of the arrangement of the cultivation plate and the cultivation plate spacer in the cultivation panel.

FIG. 40 (*a*) depicts an example showing a top view of the cultivation panel 3800 in which the cultivation plate 3600 and the cultivation plate spacer 3700 are arranged.

FIG. 40 (*b*) depicts an example showing a lower view of the cultivation panel 3800 in which the cultivation plate 3600 and the cultivation plate spacer 3700 are arranged.

In the embodiments illustrated in FIGS. 40 (*a*), 40 (*b*), a half cultivation plate spacer 4000 is arranged in addition to the cultivation plate 3600 and the cultivation plate spacer 3700 in the cultivation panel 3800.

The half cultivation plate spacer 4000 is formed to have a length 4000L1 in the first direction in FIG. 40 (*a*) and a length 4000L2 in the second direction in FIG. 40 (*a*).

The length 4000L1 in the first direction of the half cultivation plate spacer 4000 is approximately half the length 3600L1, 3600L2 of each side of the cultivation plate 3600, and the length 3700L1, 3700L2 of each side of the cultivation plate spacer 3700.

The length 4000L2 in the second direction of the half cultivation plate spacer 4000 is approximately equal to the length 3600L1, 3600L2 of each side of the cultivation plate 3600, the length 3700L1, 3700L2 of each side of the cultivation plate spacer 3700, and the length 3830L2*a* in the second direction of the upper opening surface 3831 of the opening 3830.

By using the half cultivation plate spacer 4000, it becomes possible to more flexibly adjust the spacing of the cultivation plate 3600 so that the spacing between the plants can be adjusted more flexibly and more appropriately according to the growth rate of the plants which are cultivated with the nutrient solution tray 4200.

Figure 41:
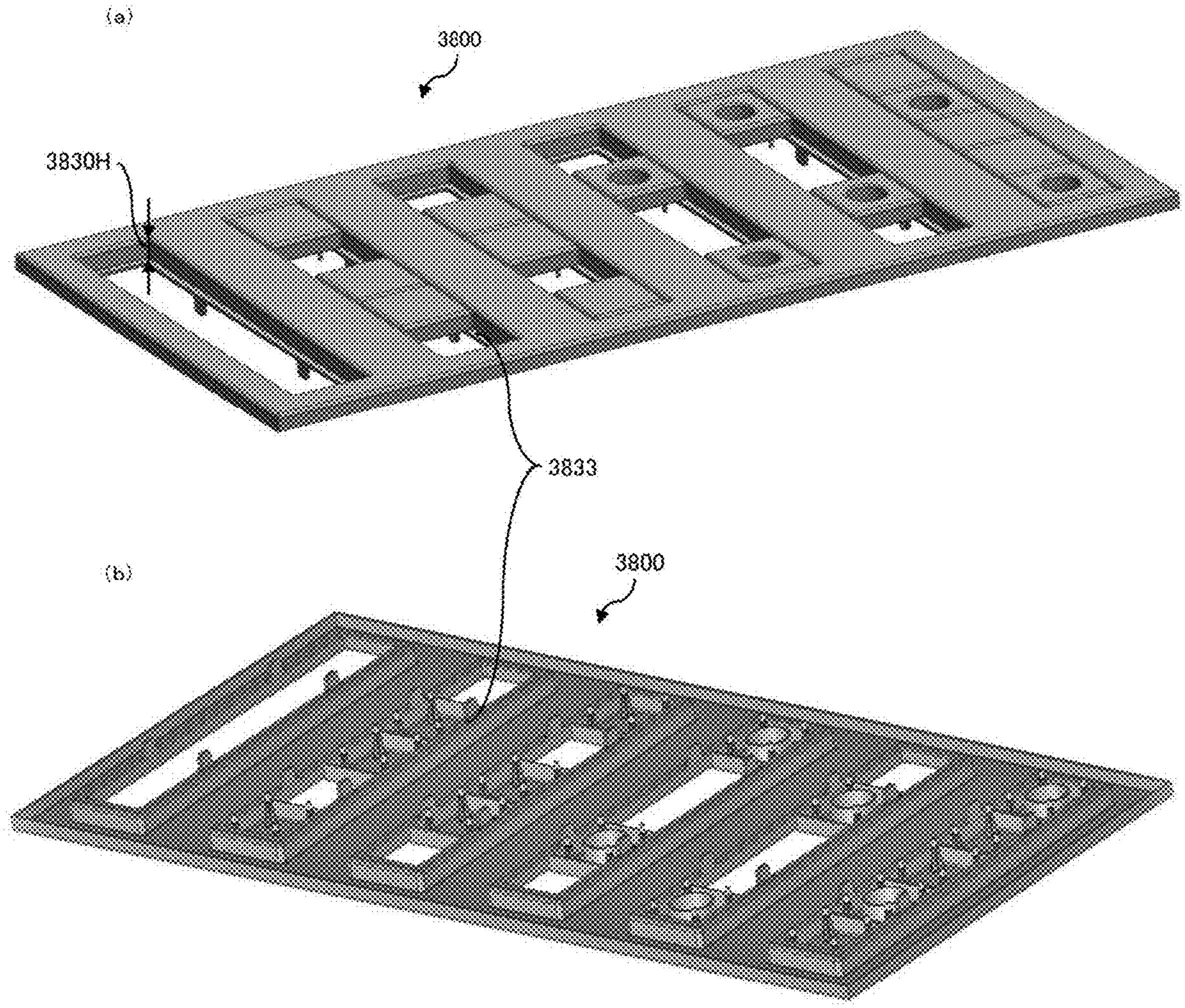
FIG. 41 depicts an example giving another explanation of the arrangement of the cultivation plate and the cultivation plate spacer in the cultivation panel.

FIG. 41 depicts an example giving another explanation of the arrangement of the cultivation plate and the cultivation plate spacer in the cultivation panel.

FIG. 41 (*a*) depicts an example showing an upward perspective view of the cultivation panel 3800 in which the cultivation plate 3600 and the cultivation plate spacer 3700 are arranged.

FIG. 41 (*b*) depicts an example showing a downward perspective view of the cultivation panel 3800 in which the cultivation plate 3600 and the cultivation plate spacer 3700 are arranged.

The height (or depth) of the opening 3830 illustrated in FIG. 41 (*a*) is approximately equal to the height 3600H2 measured from the edge 3630 of the cultivation plate 3600 to the upper surface of the cultivation plate 3600, and to the height 3700H2 measured from the edge 3730 of the cultivation plate spacer 3700 to the upper surface of the cultivation plate spacer 3700.

In FIGS. 41 (*a*), 41 (*b*), it is more clearly illustrated that the lower-opening-surface-peripheral edge 3833 can function as a stopper so that the cultivation plate 3600 and the cultivation plate spacer 3700 are maintained not to be dropped off from the opening 3830.

Figure 42:
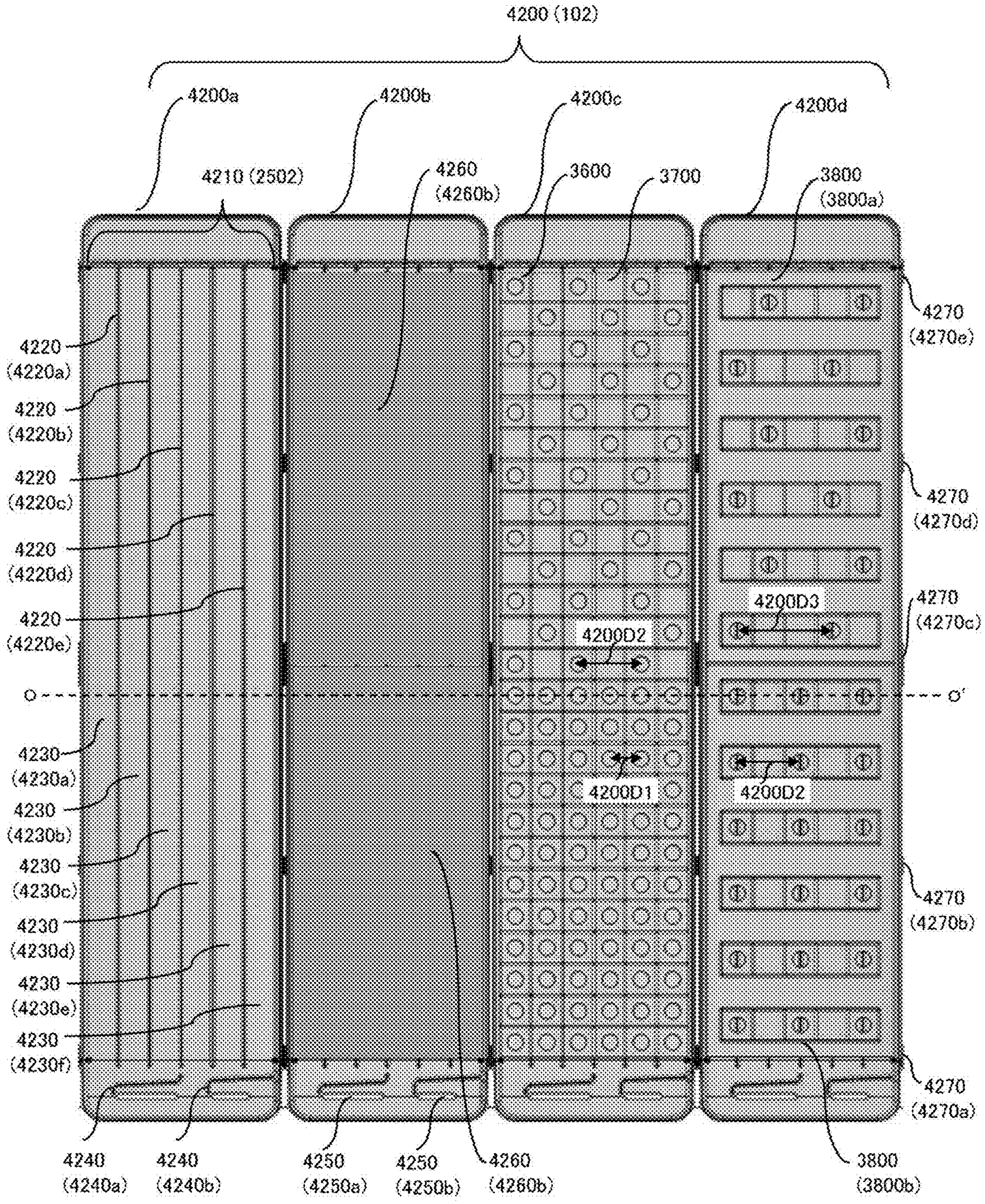
FIG. 42 depicts an example giving an explanation for comparing nutrient solution trays in different using states.

FIG. 42 depicts an example giving an explanation for comparing the nutrient solution trays in different using states.

The nutrient solution tray 4200 illustrated in FIG. 42 is capable of being used for the same purpose as the nutrient solution tray 102 explained in the Example 1. Thus, the explanation for the configuration of the nutrient solution tray 4200 in common to that of the nutrient solution tray 102 is omitted.

In addition, the configuration explained using the nutrient solution tray 4200 can be adopted in the nutrient solution tray 102 if structurally feasible.

On the left most side in FIG. 42, the nutrient solution tray 4200*a* is illustrated alone.

Figure 49:
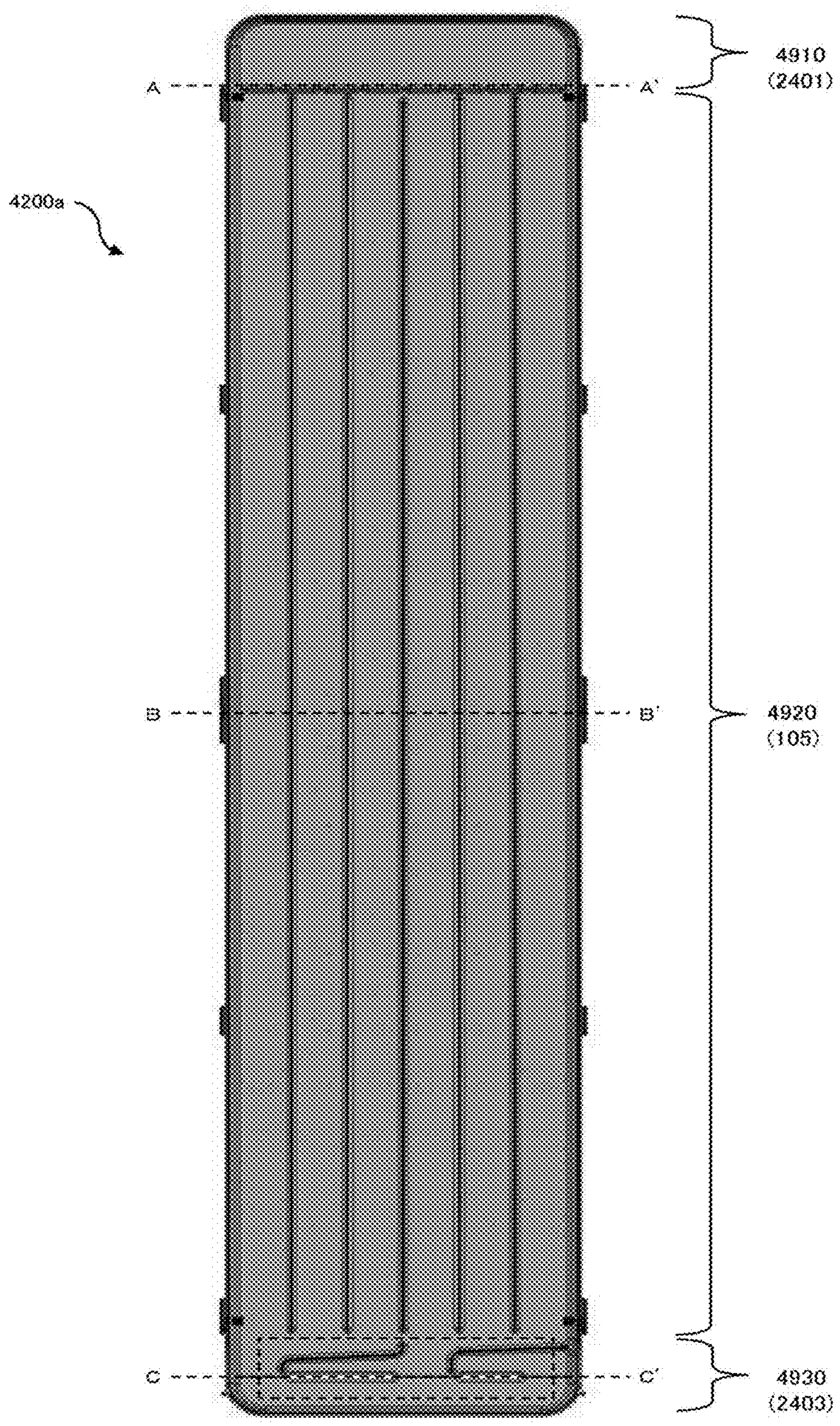
FIG. 49 depicts an example of a top view of the nutrient solution tray 4200*a* in FIG. 42.

According to the example of FIG. 42, the bottom surface of the nutrient solution tray 4200 is provided with a nutrient solution-inflow area 4910 (2401), a receptacle area 4920 (105), and a nutrient solution-outflow area 4930 (2403) similarly to the case of the nutrient solution tray 102 (see FIG. 49).

In the example of FIG. 42, it is illustrated that the cultivation plate 3600, the cultivation plate spacer 3700, and the cultivation panel 3800 are housed in the receptacle area. However, it is also possible to accommodate the planting pot 101 explained in the Example 1.

In the example of FIG. 42, the nutrient solution-outflow area is provided with two outlets 4250 (4250*a*, 4250*b*).

In addition, two root diverting walls 4240 (4240*a*, 4240*b*) are provided, respectively, to be connected to the outlets 4250 (4250*a*, 4250*b*) or to extend to the vicinity of the outlets 4250 (4250*a*, 4250*b*).

The root diverting walls 4240 (4240*a*, 4240*b*) are formed to correspond to the projecting structures so that a flow of nutrient solution in the nutrient solution tray 4200 is made to be branched, diverted and guided to the outlets 4250 (4250*a*, 4250*b*).

In the example of FIG. 42, a plurality of weirs 4210 are provided between the nutrient solution-inflow area and the receptacle area, and the weirs 4210 have functions and configurations similar to those of the gate pattern 2502 as described above.

The two root diverting walls 4240 (4240*a*, 4240*b*) are provided to divert and guide roots of plant(s) (which is planted to be cultivated) to the two outlets 4250 (4250*a*, 4250*b*). Accordingly, it becomes possible to reduce the possibility of closing the outlets 4250 (4250*a*, 4250*b*) due to the growing roots.

Compared with the nutrient solution tray 102 having one discharge slit 2111 and one wall part 2405 which is explained with referring to FIGS. 21 to 26, the nutrient solution tray 4200 having the two outlets 4250 (4250*a*, 4250*b*) and the two root diverting walls 4240 (4240*a*, 4240*b*) in the nutrient solution-outflow area 4930 (2403) is capable of branching a flow of nutrient solution so that it is possible to reduce a splashing, a spraying, or a leaking, etc., of the nutrient solution.

In the example of FIG. 42, a plurality of wall parts 4220 (from 4220*a* to 4220*e*) are formed to extend in parallel with the longer side direction of the nutrient solution tray 4200 in the receptacle area. A plurality of channels 4230 (from 4230*a* to 4220*f*) are formed by the wall parts 4220 in the receptacle area.

In a case where a liquid amount of the nutrient solution flowing into the nutrient solution-inflow area 4910 of the nutrient solution tray 4200 is small, especially, in a case where a liquid amount of the nutrient solution flowing into the nutrient solution-inflow area 4910 of the nutrient solution tray 4200 is not sufficient to cover the entirety of the bottom surface of the nutrient solution tray 4200 by the nutrient solution flowing through the receptacle area 4920, a plurality of wall parts 4220 (from 4220*a* to 4220*e*) are capable of branching or dividing the flow of the nutrient solution into a plurality of flows at the receptacle area 4920. Accordingly, a plurality of wall parts 4220 (from 4220*a* to 4220*e*) and a plurality of channels 4230 (from 4230*a* to 4230*f*) formed between the walls are capable of reducing the occurrence of an unequal flow of the nutrient solution at the receptacle area 4920.

In the second from the right in FIG. 42, a nutrient solution tray 4200*b* housing two sponge culture mediums 4260 (4260*a*, 4260*b*) is illustrated.

The nutrient solution tray 4200 is capable of being used as a substitute for the seeding tray which is explained using FIGS. 34, 35.

In a case where the nutrient solution tray 4200 is used as the seeding tray, it is possible to easily adjust the ratio, or the concentration, etc., of nutrient which is required until the germination, over a time, by circulating the nutrient solution in the tray.

In the third from the left in FIG. 42, a nutrient solution tray 4200*c* housing the cultivation plate 3600 in which a spacing is formed in two patterns by using the cultivation plate spacer 3700 is illustrated.

On the right most side in FIG. 42, the nutrient solution tray 4200*d* housing the cultivation plate 3600 in which a spacing is formed in two patterns by using the cultivation plate spacer 3700 and the cultivation panels 3800 (3800*a*, 3800*b*) is illustrated.

The nutrient solution trays 4200*c*, 4200*d* correspond to spacing sets consisting of the cultivation plate 3600, the cultivation plate spacer 3700, and the cultivation panel 3800 for housing spacing sets in four different configurations.

The four different configurations illustrated in FIG. 42 are examples of the configurations of the spacing set. Accordingly, the spacing set may be housed in the receptacle area 4920 of the nutrient solution tray 4200 even though the spacing set is structured to have a constitution different from the four configurations illustrated in FIG. 42.

The spacing set may be used by combining the cultivation plate 3600 and the cultivation plate spacer 3700, or by combining the cultivation plate 3600 and the cultivation panel 3800, or by combining the cultivation plate 3600, the cultivation plate spacer 3700 and the cultivation panel 3800. Especially, in each case, the number and the arrangement of the cultivation plate 3600, the cultivation plate spacer 3700 or the cultivation panel 3800 can be arbitrary.

Accordingly, the interval between the cultivation plates 3600 which are housed in the receptacle area 4920 of the nutrient solution tray 4200 can be arbitrary and flexibly changed.

In the solution tray 4200*c*, 4200*d* of FIG. 42, the cultivation plates 3600 are arranged regularly (or particularly, arranged at equal intervals at least partially) apart from one another. However, in another configuration, the cultivation plates 3600 can be housed in the receptacle area 4920 of the nutrient solution tray 4200 in different intervals.

The cultivation plate 3600 can be placed in the receptacle area 4920 of the nutrient solution tray 4200 by adjusting the interval from the neighboring cultivation plate 3600 differently, or particularly irregularly. The above-mentioned adjustment can be performed, for example, according to the growth rate of the plant placed in the cultivation hole 3610.

For example, the cultivation plate 3600 and the cultivation plate spacer 3700 may have a substantially square shape when seen in top view, as described with referring to FIG. 36. Preferably, the first integer multiple of the length 3600L1, the length 3600L2. the length 3700L1, or the length 3700L2 (3600L1=3600L2=3700L1=3700L2) of one side of the substantially square shape of the cultivation plate 3600 and the cultivation plate spacer 3700 illustrated in FIG. 36 corresponds to the length in the longer side direction of the receptacle area 4920 (105) of the nutrient solution tray 4200.

The first integer multiple is, for example, from about sixteen to about thirty two times.

Similarly, the second integer multiple of the length 3600L1, the length 3600L2. the length 3700L1, or the length 3700L2 (3600L1=3600L2=3700L1=3700L2) of one side of the substantially square shape of the cultivation plate 3600 and the cultivation plate spacer 3700 depicted in FIG. 36 preferably corresponds to the length in the shorter side direction of the receptacle area 4920 (105) of the nutrient solution tray 4200.

The second integer multiple is, for example, from about four to about eight times.

Accordingly, a user can place the cultivation plate 3600 and the cultivation plate spacer 3700 in the longer side direction and the shorter side direction of the nutrient solution tray 4200 so as to lay (or periodically arrange) the cultivation plate 3600 and the cultivation plate spacer 3700 in the receptacle area 4920 of the nutrient solution tray 4200.

The plurality of cultivation plates 3600 may be housed in the receptacle area 4920 of the nutrient solution tray 4200 at different intervals according to the total number and the arrangement of the cultivation plate spacers 3700 placed between the cultivation plates 3600, as described above.

In the lower half of the nutrient solution tray 4200*c*, only the plurality of cultivation plates 3600 are laid (or periodically arranged), and the adjacent cultivation plates 3600 are separated from each other by a first interval length (minimum interval length) 4200D1.

The above-mentioned configuration corresponds to the first configuration of the spacing set using only the cultivation plates 3600.

In the upper half of the nutrient solution tray 4200*c*, the cultivation plates 3600 and the cultivation plate spacers 3700 are laid alternately, and the adjacent cultivation plates 3600 are separated from each other by a second interval length 4200D2.

The above-mentioned configuration corresponds to the second configuration of the spacing set using the cultivation plates 3600 and the cultivation plate spacers 3700.

The second configuration is capable of variously and very flexibly changing the interval between the cultivation plates 3600 by changing the total number and the arrangement of the cultivation plates 3600 and the cultivation plate spacers 3700.

The cultivation plate spacer 3700 is used to adjust the interval between the cultivation plates 3600. The interval of the cultivation plates 3600 in the nutrient solution tray 4200 is not necessarily made equally or regularly. The interval of the cultivation plates 3600 may be arbitrarily adjusted according to the growth rate (or growth degree), etc., of the plant(s), by using the cultivation plate spacer 3700.

The nutrient solution tray 4200*d* accommodates two cultivation panels 3800 (3800*a*, 3800*b*) therein. The cultivation panel 3800*a* accommodates the cultivation plates 3600 and the cultivation plate spacers 3700, one by one alternately, in the openings 3830. The cultivation panel 3800*b* accommodates the cultivation plate spacers 3700 so as to place the two cultivation plate spacers 3700 between the two adjacent cultivation plates 3600 in the openings 3830.

The cultivation panel 3800 also has a function as a single large sized spacer.

It is possible to simply carry out the spacing of the cultivation plates 3600 in the longer side direction of the nutrient solution tray 4200, by using the cultivation panel 3800.

The size of the length 3800L2*b* between the adjacent openings 3830 in the longer side direction of the nutrient solution tray 4200 may be set to be larger. In that case, the length 3800L2*b* between the adjacent openings 3830 may be equal to an integral multiple of the length (3600L1, 3600L2) of each side of the cultivation plate 3600 and the length (3700L1, 3700L2) of each side of the cultivation plate spacer 3700 (for example, n times 3600L1 makes 3800L2*b*, where n is an integer).

Further, in another example, the length 3800L2*b* between the adjacent openings 3830 may be half the length (3600L1, 3600L2) of each side of the cultivation plate 3600, and the length (3700L1, 3700L2) of each side of the cultivation plate spacer 3700 (for example, 3800L2*b* is half the size of 3600L1).

In addition, the size of the cultivation panel 3800 may be determined so as to be housed in the nutrient solution tray 4200, in an integer number of the cultivation panel 3800.

In the example of FIG. 42, plants having the number of 75, 32.5, 18, and 12 are arranged for each nutrient solution tray 4200 according to the presence or absence of the cultivation plate spacer 3700, the arrangement of the cultivation plate spacer 3700, and the presence or absence of the cultivation panel 3800 and the like.

Figure 43:
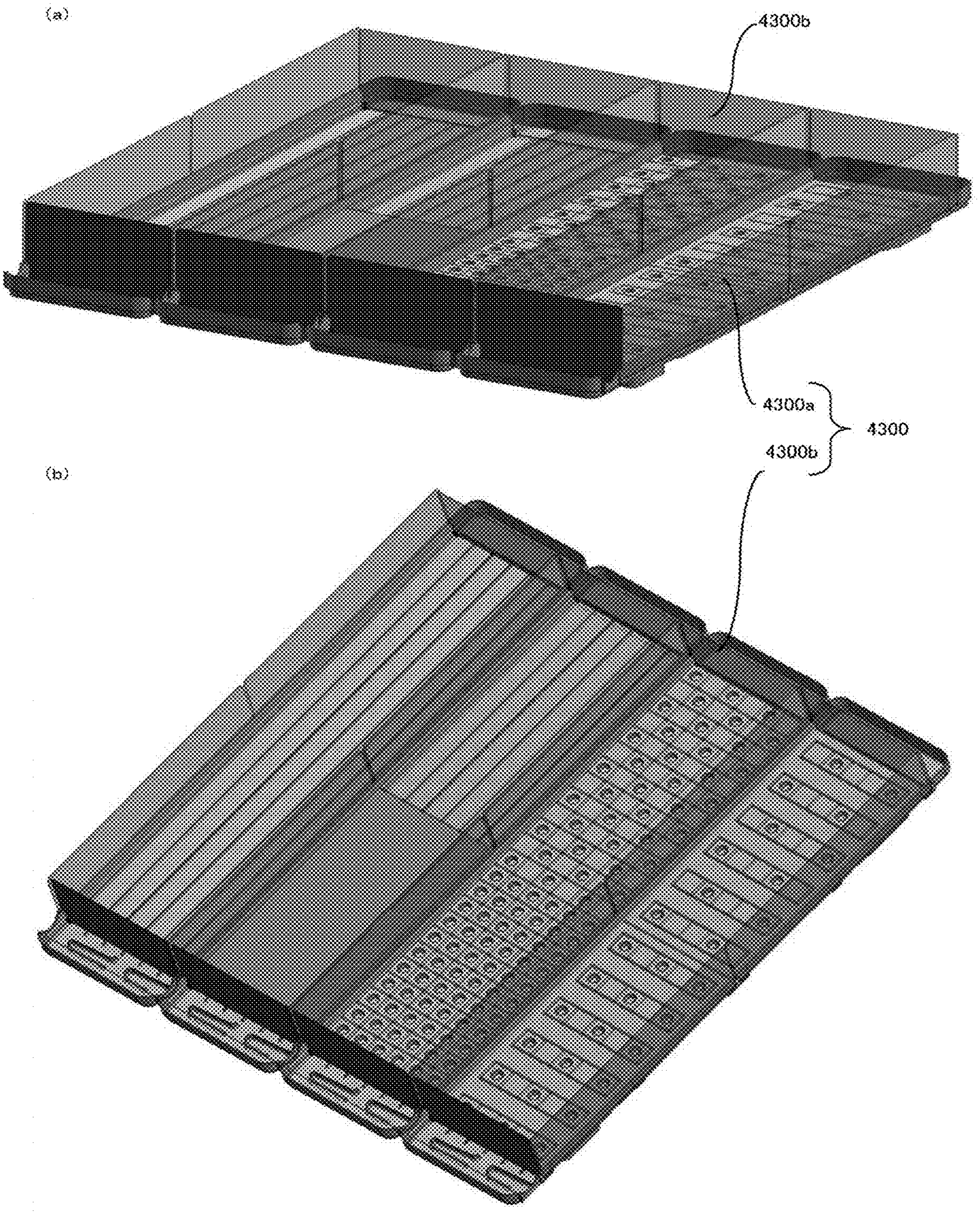
FIG. 43 depicts an example giving an explanation for comparing nutrient solution trays in different using states.

However, the number of plants for each nutrient solution tray 4200 may be flexibly changed depending on the presence or absence of the cultivation plate spacer 3700, the arrangement of the cultivation plate spacer 3700, and the configuration of the cultivation panel 3800, FIG. 43 depicts an example giving an explanation for comparing nutrient solution trays in different using states.

FIG. 43 (*a*) depicts an example showing a perspective view of the nutrient solution trays (from 4200*a* to 4200*d*) depicted in FIG. 42.

FIG. 43 (*b*) depicts an example showing another perspective view of the nutrient solution trays (from 4200*a* to 4200*d*) depicted in FIG. 42.

In the embodiment illustrated in FIG. 43, the sponge culture medium 4260 (*b*) of the nutrient solution tray 4200*b* is removed.

In the embodiment of FIG. 43, the receptacle area of each nutrient solution tray 4200 (from 4200*a* to 4200*d*) is surrounded by a leaf guard plates 4300 (4300*a*, 4300*b*).

By providing the leaf guard plates 4300, each plant placed in each nutrient solution tray 4200 is prevented from coming into contact with another plant placed in the neighboring nutrient solution tray 4200 and is prevented from coming into contact with the transportation device or a person when the nutrient solution tray 4200 is transported or moved, and accordingly, the impact, the acceleration, or the deceleration is generated thereto.

The leaf guard plate 4300*a* extending parallel to the nutrient solution tray 4200 in the longer side direction is attached to the nutrient solution tray 4200 by using mounting structures 4270 (from 4270*a* to 4270*e*) illustrated in FIG. 42.

Figure 48:
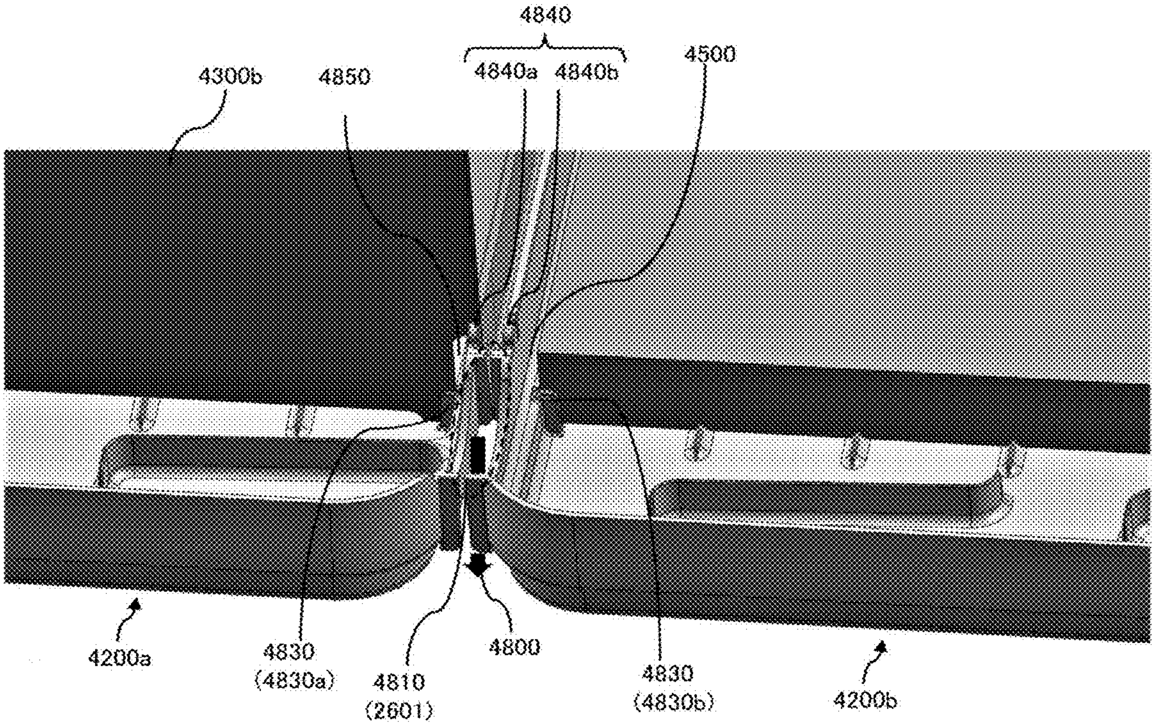
FIG. 48 depicts an example showing an enlarged view around the nutrient solution-outflow area of the nutrient solution tray in FIG. 42.
Figure 48:
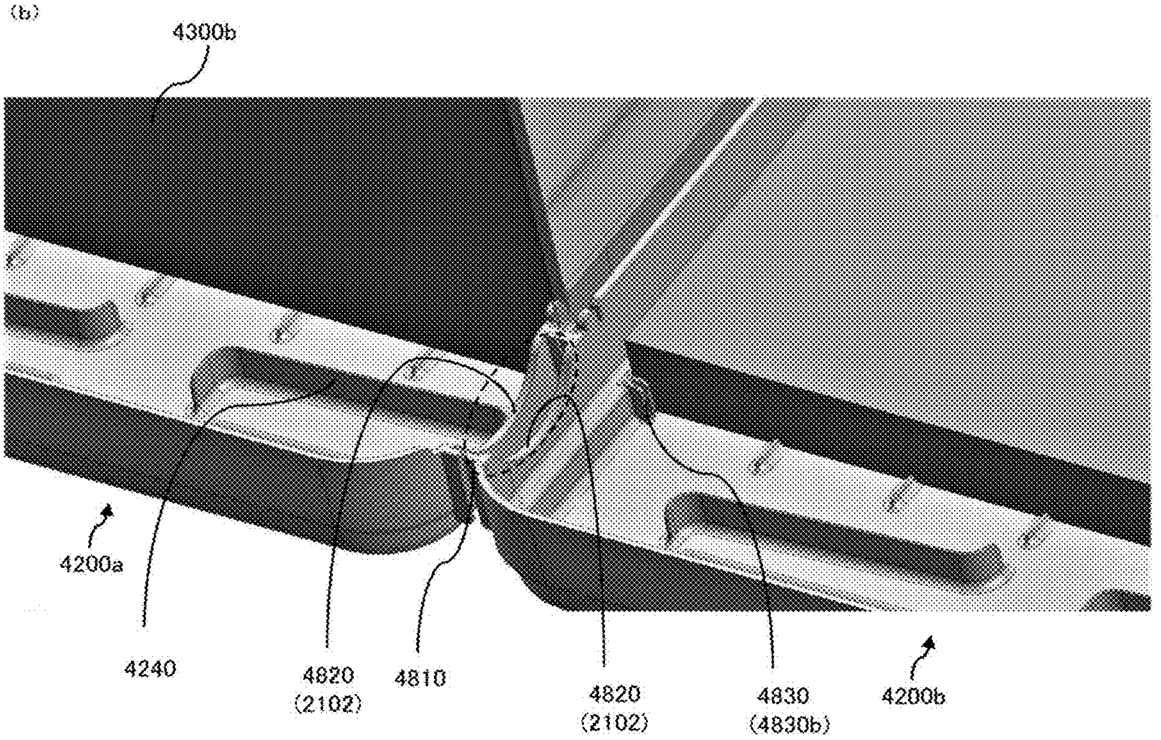

The leaf guard plate 4300*b* extending parallel to the nutrient solution tray 4200 in the shorter side direction is attached to the nutrient solution tray 4200 by using different mounting structures 4830 illustrated in FIG. 48.

In a case where the leaf guard plate 4300 is composed of a highly light-shielding material, a light environment which is individually adjusted for one nutrient solution tray 4200 can be easily prevented from exerting an influence on another light environment of one or two nutrient solution trays adjacent thereto, In a case where the leaf guard plate 4300 is composed of a material having high reflectivity, it becomes possible to throw more light on plants in the nutrient solution tray 4200 from more multiple directions.

Figure 44:
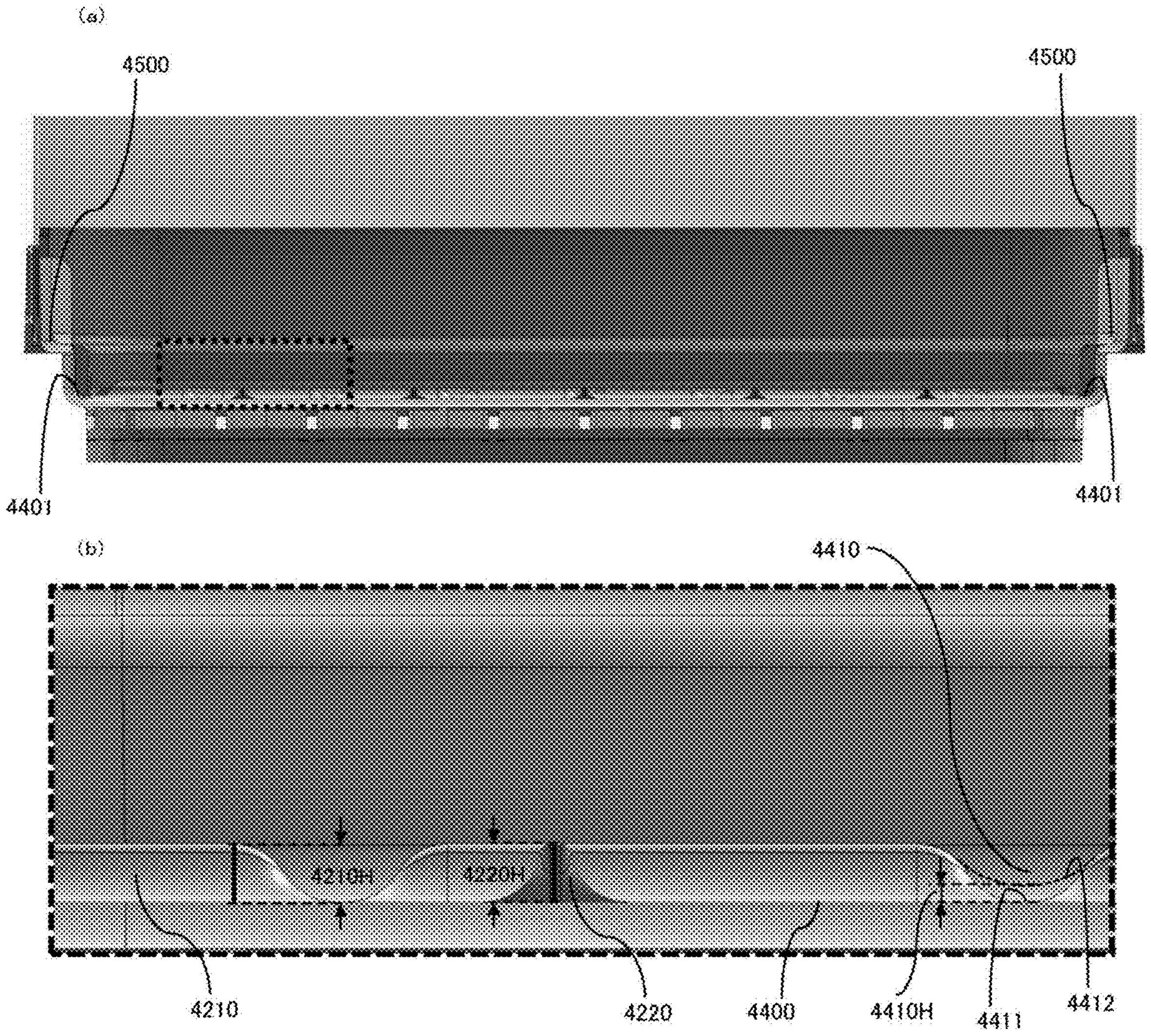
FIG. 44 depicts an example of the cross-sectional view of the nutrient solution tray 4200*a* along O-O' line in FIG. 42.

FIG. 44 depicts an example of the cross-sectional view of the nutrient solution tray 4200*a* along O-O' line in FIG. 42.

FIG. 44 (*a*) depicts an example showing the cross-sectional view of the overall constitution of the nutrient solution tray 4200*a* along O-O' line.

FIG. 44 (*b*) depicts an example showing the enlarged cross-sectional view of the partial constitution of the nutrient solution tray 4200*a* along O-O' line. FIG. 44 (*b*) depicts an area surrounded by a broken line in the cross-sectional view of the overall constitution of FIG. 44 (*a*).

The bottom surface 4400 of the nutrient solution tray 4200 is made to be risen up through a curved outer circumferential edge 4401 and connected to the outer circumferential wall part of the nutrient solution tray 4200.

In particular, the bottom surface 4400 of the nutrient solution tray 4200 is preferably connected to the outer circumferential wall part of the nutrient solution tray 4200 through a step part extending outward in the shorter side direction of the nutrient solution tray 4200. A nutrient solution channel(s) for overflow 4500 (4500*a*, 4500*b*) is formed by the step part, as described below.

In the example of FIG. 44 (*b*), the height 4210H of the weir 4210 and the height 4220H of the wall part 4220, measured from the bottom surface 4400, are approximately equal.

An empty part (or void) 4410 between the weirs 4210 corresponds to the gap (or gade) between the gate patterns 2502 of the Example 1.

By arranging the empty parts 4410 side by side in the shorter side direction of the nutrient solution tray 4200, a nutrient solution flowing into the nutrient solution-inflow area 4910 of the nutrient solution tray 4200 is distributed in the shorter side direction of the nutrient solution tray 4200 and is allowed to flow into the receptacle area 4920 of the nutrient solution tray 4200.

In a case where a liquid amount of the nutrient solution that flows into the nutrient solution-inflow area 4910 of the nutrient solution tray 4200 is small, especially in a case where a nutrient solution that flows into the nutrient solution-inflow area 4910 of the nutrient solution tray 4200 is not sufficient for covering the entire area of the bottom surface of the receptacle area 4920 by the nutrient solution flowing at the receptacle area 4920, the configuration of a plurality of empty parts 4410 which are arranged (for example, side by side) in the shorter side direction is advantageous for reducing the occurrence of unequal flow of the nutrient solution in the receptacle area 4920.

Especially, in a case of a configuration where at least one empty part 4410 between the weirs 4210 is connected with the above-mentioned flow channel(s) 4230 (from 4230*a* to 4230*f*) which is explained with referring to FIG. 42, it is possible to more reduce the occurrence of unequal flow of the nutrient solution in the receptacle area 4920.

In the embodiment of FIG. 44 (*b*), the empty part 4410 is formed deep enough to be connected with the bottom surface 4400. In another example, an edge (or rim) 4412 may be provided at a higher position than the actual edge 4411 of the empty part 4410 in the embodiment of FIG. 44 (*b*).

In FIG. 44 (*b*), such a hypothetical edge 4412 is represented by a dashed line.

The nadir of the hypothetical edge 4412 is higher than the bottom surface 4400 by the height 4410H.

In a configuration where the empty part 4410 is provided with the edge 4412 having a nadir at a position higher than the bottom surface 4400, a nutrient solution is allowed to be stored in the nutrient solution-inflow area 4910 of the nutrient solution tray 4200*a* until the nutrient solution reaches at the height 4410H.

When the height of the nutrient solution stored in the nutrient solution-inflow area 4910 exceeds the height 4410H, the nutrient solution flows from the plurality of empty parts 4410 which are arranged side by side, to the respective channels 4230 (from 4230*a* to 4230*f*) evenly or distributedly, at approximately the same time. At the time, the surface tension of the nutrient solution is not taken into consideration.

Figure 45:
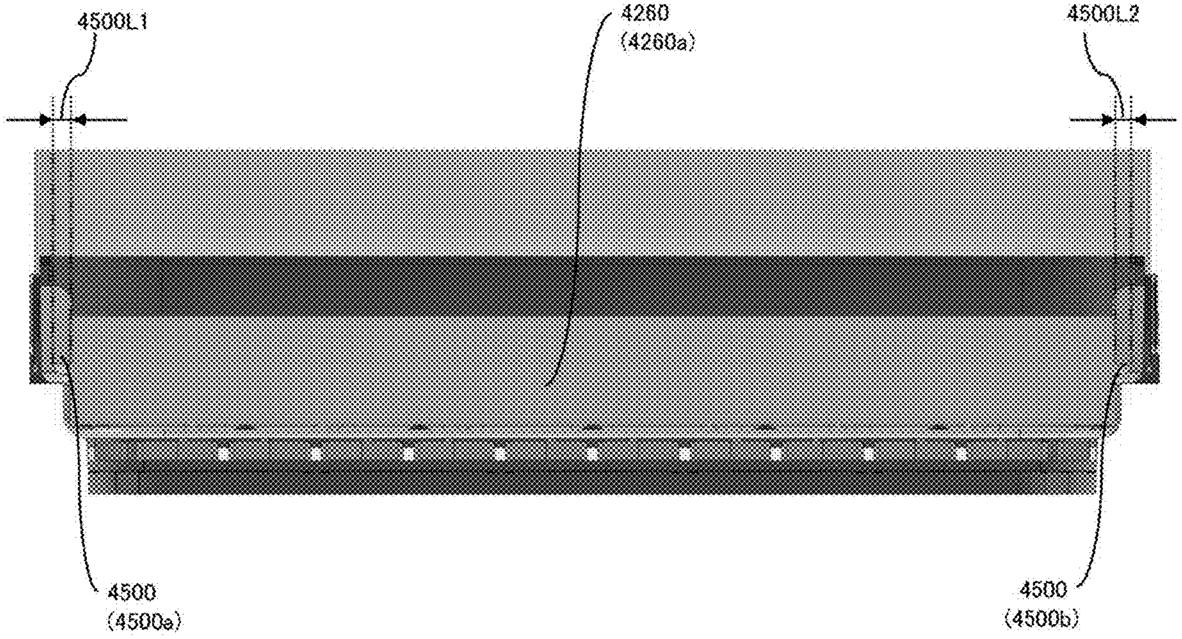
FIG. 45 depicts an example of the cross-sectional view of the nutrient solution tray 4200*b* along O-O' line in FIG. 42.

FIG. 45 depicts an example of the cross-sectional view of the nutrient solution tray 4200*a* along O-O' line in FIG. 42.

In the example of FIG. 45, the nutrient solution tray 4200*b* is provided with nutrient solution channels for overflow 4500 (4500*a*, 4500*b*) on both sides of the sponge culture medium 4260 (4260*a*) which is housed therein.

The nutrient solution channels for overflow 4500*a*, 4500*b* have widths 4500L1, 4500L2, respectively.

When the sponge culture medium 4260 (4260*a*) is housed in the nutrient solution tray, the sponge culture medium 4260 (4260*a*) is held in a state in which a gap is formed from the tray bottom surface 4400 due to the wall part 4220 in the longer side direction of the nutrient solution tray. At this time, a nutrient solution is allowed to pass through the above-mentioned gap and the sponge culture medium 4260 (4260*a*). However, because of the soft sponge of the sponge culture medium 4260 (4260*a*), the amount of the gap tends to become unstable. When the above-mentioned gap becomes small, there will not be enough gap to allow the nutrient solution to flow therethrough. Also, when the volume of the nutrient solution in the nutrient solution tray 4200 is increased, the nutrient solution will flow through the nutrient solution channels for overflows 4500 (4500*a*, 4500*b*) at the sides of the sponge culture medium 4260 to reach the predetermined overflow position 4810 (as described below) so as to be discharged from the cutout part(s) 4820 which is formed therein.

The cutout part 4820 corresponds to the concave cutout part 2102 of the Example 1.

Preferably, with regard to the nutrient solution channels for overflow 4500 (4500*a*, 4500*b*), the nutrient solution tray 4200 is provided at a height such that the nutrient solution is discharged at the intended position at the occurrence of overflow, even when the sponge culture medium is housed, or even when the culture plate 3600, the culture plate spacer 3700, and the culture panel 3800 are housed.

Figure 46:
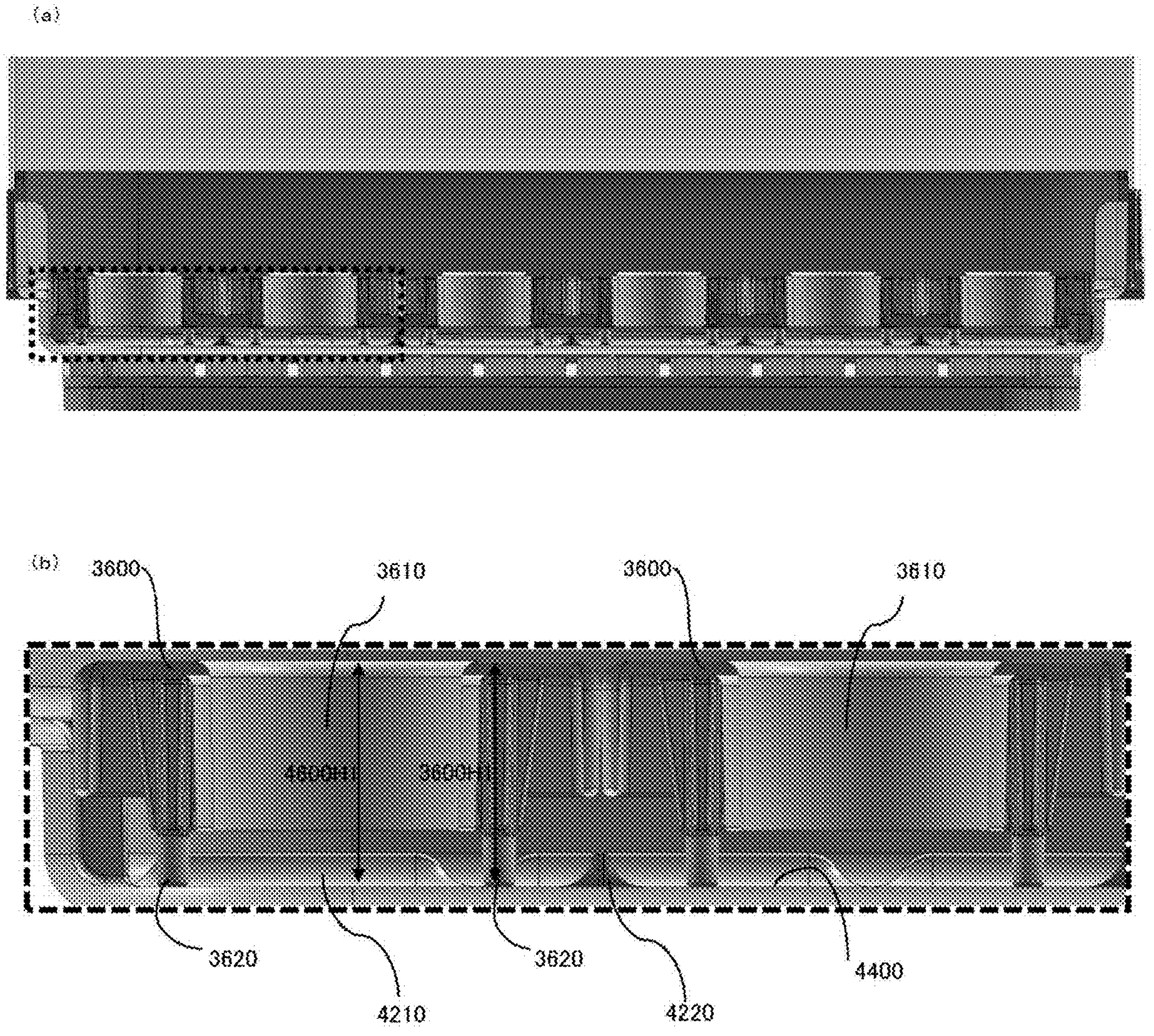
FIG. 46 depicts an example of the cross-sectional view of the nutrient solution tray 4200*c* along O-O' line in FIG. 42.

FIG. 46 depicts an example of the cross-sectional view of the nutrient solution tray 4200*c* along O-O' line in FIG. 42.

FIG. 46 (*a*) depicts an example showing the cross-sectional view of the overall constitution of the nutrient solution tray 4200*c* along O-O' line.

FIG. 46 (*b*) depicts an example showing the enlarged cross-sectional view of the partial constitution of the nutrient solution tray 4200*c* along O-O' line. FIG. 46 (*b*) depicts an area surrounded by a broken line in the cross-sectional view of the overall constitution of FIG. 46 (*a*).

In FIG. 46 (*b*), the leg parts 3620 of the cultivation plate 3600 are made to be contacted with the bottom surface 4400 of the nutrient solution tray 4200*c* so that the cultivation plate 3600 stands up in the nutrient solution tray 4200*c*. As a result, the height 3600H1 which is measured from the tip of the leg part to the upper surface of the cultivation plate 3600 and the height 4600H1 of the upper surface of the cultivation plate 3600 in the nutrient solution tray 4200*c* are equal with each other.

Figure 47:
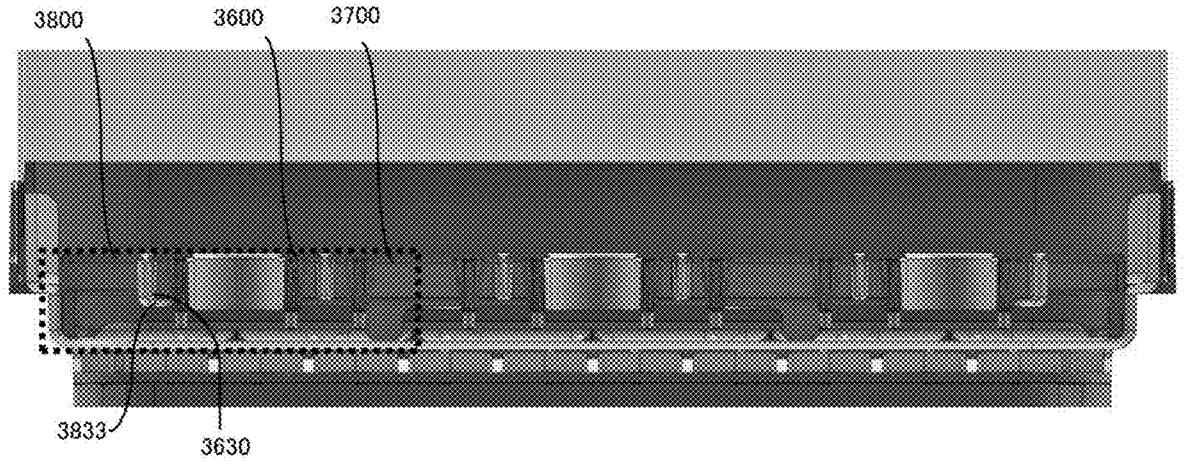
FIG. 47 depicts an example of the cross-sectional view of the nutrient solution tray 4200*d* along O-O' line in FIG. 42.
Figure 47:
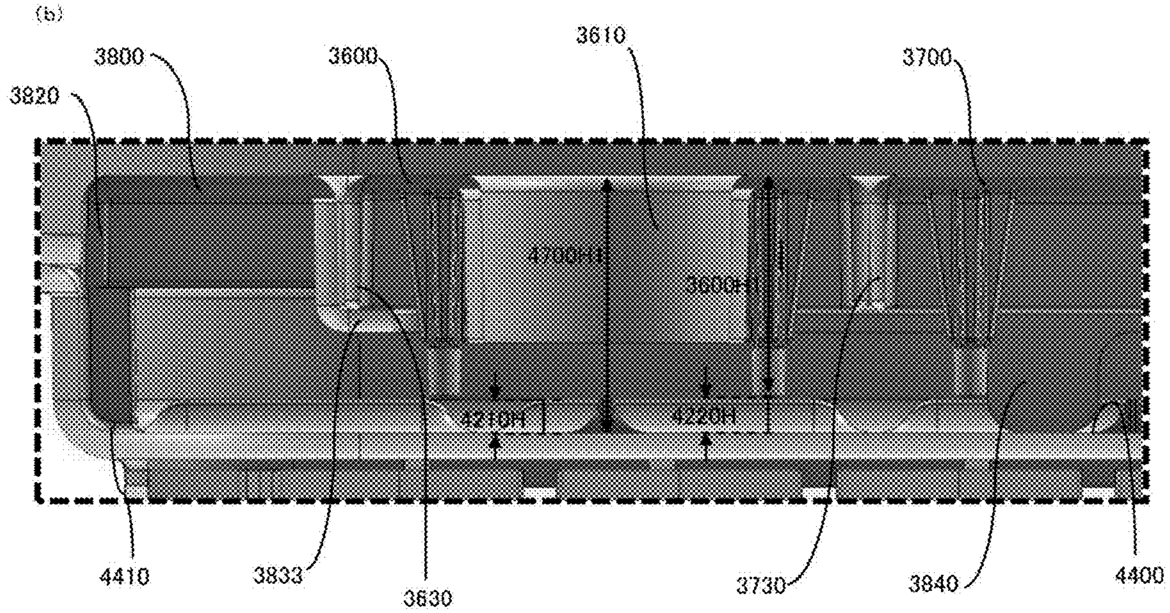

FIG. 47 depicts an example of the cross-sectional view of the nutrient solution tray 4200*d* along O-O' line in FIG. 42.

FIG. 47 (*a*) depicts an example showing the cross-sectional view of the overall constitution of the nutrient solution tray 4200*d* along O-O' line.

FIG. 47 (*b*) depicts an example showing the enlarged cross-sectional of the partial constitution of nutrient solution tray 4200*d* along O-O' line. FIG. 47 (*b*) depicts an area surrounded by a broken line in the cross-sectional view of the overall constitution of FIG. 47 (*a*).

In FIG. 47 (*b*), the leg parts 3620 of the cultivation plate 3600 are not in contact with the bottom surface 4400 of the nutrient solution tray 4200*d*. Specifically, distal ends of the leg parts 3620 of the cultivation plate 3600 are separated from the bottom surface 4400 of the nutrient solution tray 4200*d* by the height 4220H In the embodiment of FIG. 47 (*b*), the height 4220H is slightly larger than the height 4210H of the weir 4210.

In the embodiment of FIG. 47 (*b*), the leg parts 3840 of the cultivation panel 3800 are made to be contacted with the bottom surface 4400 of the nutrient solution tray 4200*d* so that the cultivation panel 3800 stands up in the nutrient solution tray 4200*d*.

The cultivation plate 3600 is housed in the opening 3830 of the cultivation panel 3800, and the edge (or rim) 3630 of the cultivation plate 3600 is in contact with the lower-opening-surface-peripheral edge 3833 of the opening 3830 of the cultivation panel 3800. The cultivation panel 3800 lifts up the cultivation plate 3600 to a predetermined height at which the leg parts 3620 of the cultivation plate 3600 are not in contact with the bottom surface 4400 of the nutrient solution tray 4200*d*.

In the embodiment of FIG. 47 (*b*), the height 4700H1 of the upper surface of the cultivation plate 3600 in the nutrient solution tray 4200*d* is equal to the sum of the height 3600H1 which is measured from the tip of the leg part to the upper surface of the cultivation plate 3600 and the height 4220H which is lifted up in the predetermined size by the cultivation panel 3800.

It is possible to use the cultivation panel(s) 3800 having different predetermined height 4220H according to the types of plants to be cultivated and the growing phases of plants to be cultivated, FIG. 48 depicts an example showing an enlarged view around the nutrient solution-outflow area of the nutrient solution tray in FIG. 42.

FIG. 48 (*a*) depicts an example showing an enlarged view around the nutrient solution-outflow area giving an explanation of a flow of a nutrient solution overflowing from the nutrient solution tray 4200*a* and the nutrient solution tray 4200*b*.

FIG. 48 (*b*) depicts an example showing an enlarged view around the nutrient solution-outflow area giving an explanation of a part at which a nutrient solution overflows from the nutrient solution tray 4200*a* and the nutrient solution tray 4200*b*.

In a case where the liquid amount of the nutrient solution is increased in the nutrient solution tray 4200 due to a clogging of the outlets 4250 (4250*a*, 4250*b*), the nutrient solution will reach the predetermined cutout part 4820 (2102), as described below, to be discharged between the two adjacent nutrient solution trays 4200 (4200*a*, 4200*b*) at the predetermined overflow position 4810 (2601), as indicated by the arrow 4800.

The specific configurations of the cutout part 4820 (2102) and the predetermined overflow position 4810 (2601) have been explained with referring to FIGS. 26, 28, etc.

In FIG. 48, the mounting structures 4830*a*, 4840*a* in a state where the leaf guard plate 4300*b* extending in the shorter side direction of the nutrient solution tray 4200 is attached and the mounting structures 4830*b*, 4840*b* in a state where the leaf guard plate extending in the shorter side direction of the nutrient solution tray 4200 is removed are illustrated.

Preferably, the leaf guard plate 4300 (4300*b*) extending in the shorter side direction of the nutrient solution tray 4200 is provided with a concave part 4850 not to interfere with a flow of a nutrient solution flowing through the nutrient solution channel 4500 for overflow.

FIG. 49 depicts an example of a top view of the nutrient solution tray 4200*a* in FIG. 42.

As described with referring to FIG. 42, the nutrient solution tray 4200 (4200*a*) includes the nutrient solution-inflow area 4910 (2401), the receptacle area 4920 (105), and a nutrient solution-outflow area 4930 (2403).

Figure 50:
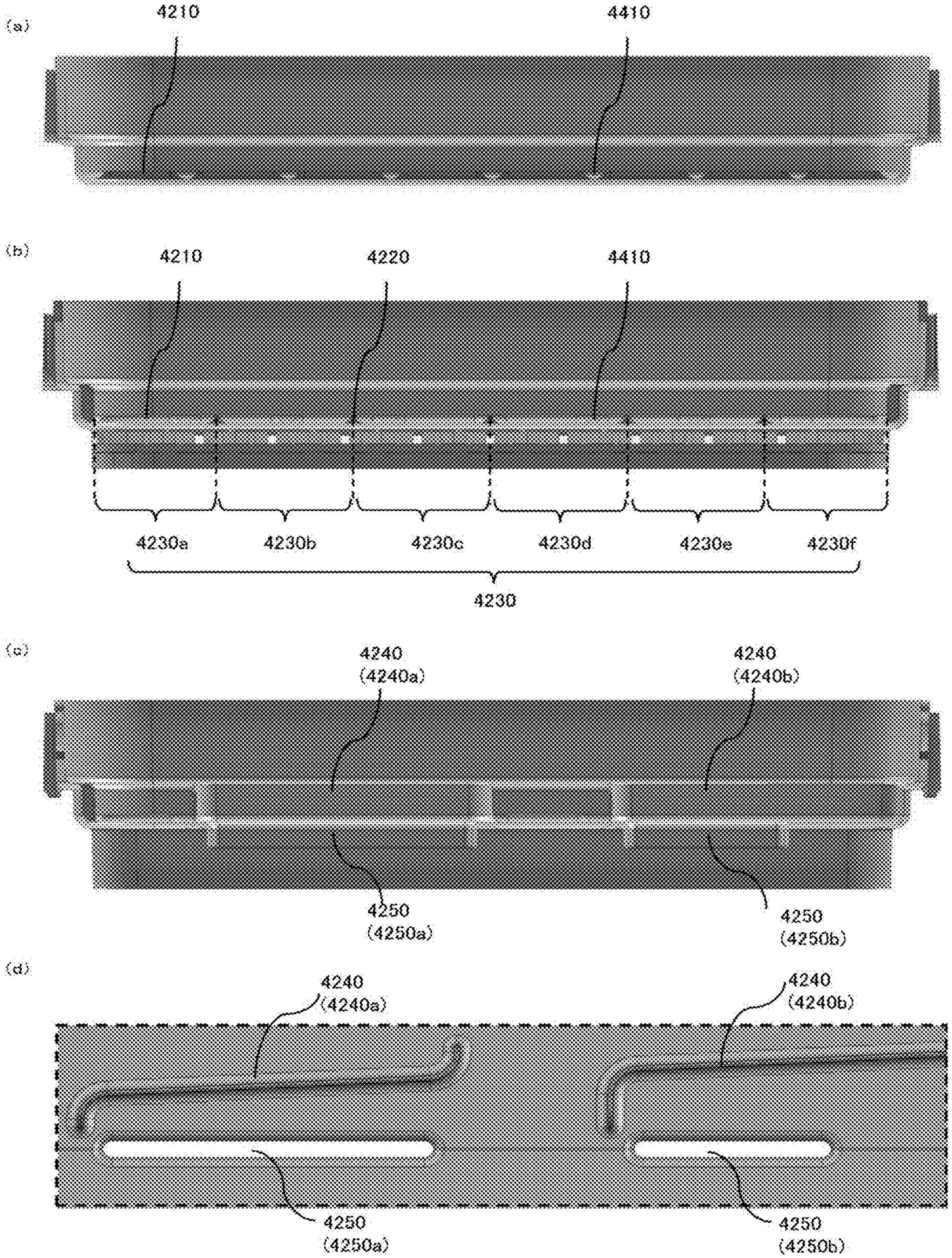
FIG. 50 depicts an example giving an explanation of the nutrient solution tray 4200*a* in FIG. 42.

FIG. 50 depicts an example giving an explanation of the nutrient solution tray 4200*a* in FIG. 42.

FIG. 50 (*a*) depicts an example showing the cross-sectional view along A-A' line in FIG. 49.

FIG. 50 (*b*) depicts an example showing the cross-sectional view along B-B' line in FIG. 49.

FIG. 50 (*c*) depicts an example showing the cross-sectional view along C-C' line in FIG. 49.

FIG. 50 (*d*) depicts an example showing the partially enlarged view of FIG. 49.

In FIG. 50 (*a*), a configuration in which the plurality of weirs 4210 and the empty parts 4410 are arranged side by side in the shorter side direction of the nutrient solution tray 4200*a* is illustrated.

In FIG. 50 (*b*), a configuration in which the plurality of channels 4230 (from 4230*a* to 4230*f*) separated by the plurality of wall parts 4220 (from 4220*a* to 4220*e*) are arranged side by side in the shorter side direction of the nutrient solution tray 4200*a* is illustrated.

In FIG. 50 (*c*), a configuration in which two outlet 4250 (4250*a*, 4250*b*) and two root diverting walls 4240 (4240*a*, 4240*b*) are arranged side by side in the shorter side direction of the nutrient solution tray 4200*a* is illustrated.

In FIG. 50 (*d*), an area surrounded by a dashed line in FIG. 49 is illustrated. In the embodiment of FIG. 50 (*d*), the first outlet 4250*a* is formed to be longer than the second outlet 4250*b*. However, the lengths of the two outlets 4250 (4250*a*, 4250*b*) can be properly set according to a planned discharged amount or discharge ratio of the nutrient solution flowing out of the respective outlets 4250 (4250*a*, 4250*b*).

In FIGS. 50 (*c*), 50 (*d*), a configuration in which each of the two outlets 4250 (4250*a*, 4250*b*) is formed to have a funnel-shaped narrow part, as a step, extending downward toward the nutrient solution tray 4200 is illustrated.

Preferably, a toy for receiving the discharged nutrient solution is provided below the outlets 4250 (4250*a*, 4250*b*). This makes it easier to prevent a scattering of the nutrient solution which is discharged from the outlets 4250 (4250*a*, 4250*b*).

Figure 51:
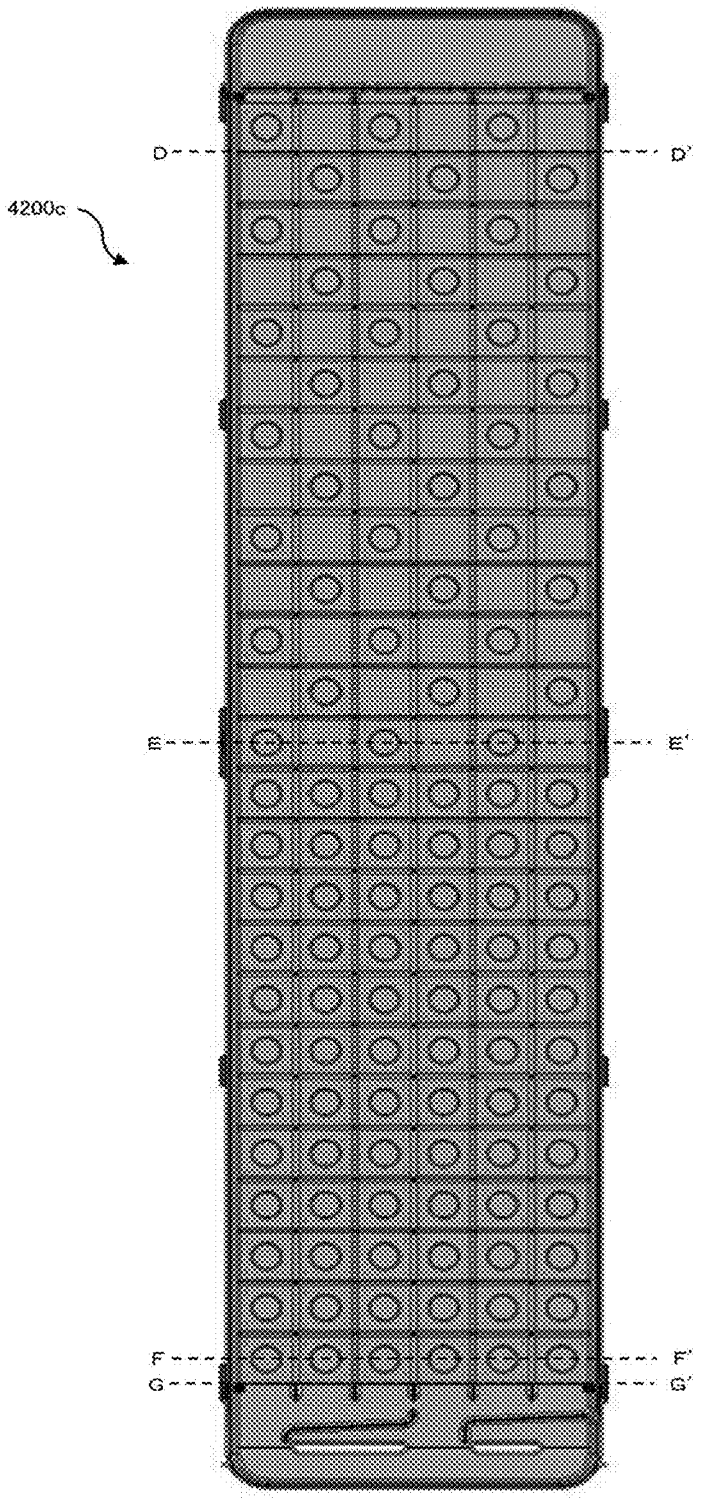
FIG. 51 depicts an example of a top view of the nutrient solution tray 4200*c* in FIG. 42.

FIG. 51 depicts an example of a top view of the nutrient solution tray 4200*c* in FIG. 42.

As explained with referring to FIG. 42, the cultivation plates 3600 are laid in the lower half of the nutrient solution tray 4200*c*, and the adjacent cultivation plates 3600 are mutually separated and regularly arranged at equal intervals. In addition, the cultivation plates 3600 and the cultivation plate spacers 3700 are alternately laid in the upper half of the nutrient solution tray 4200*c*, and the adjacent cultivation plates 3600 are separated at the interval which is larger than that of the cultivation plates 3600 arranged in the lower half of the nutrient solution tray 4200*c*.

Figure 52:
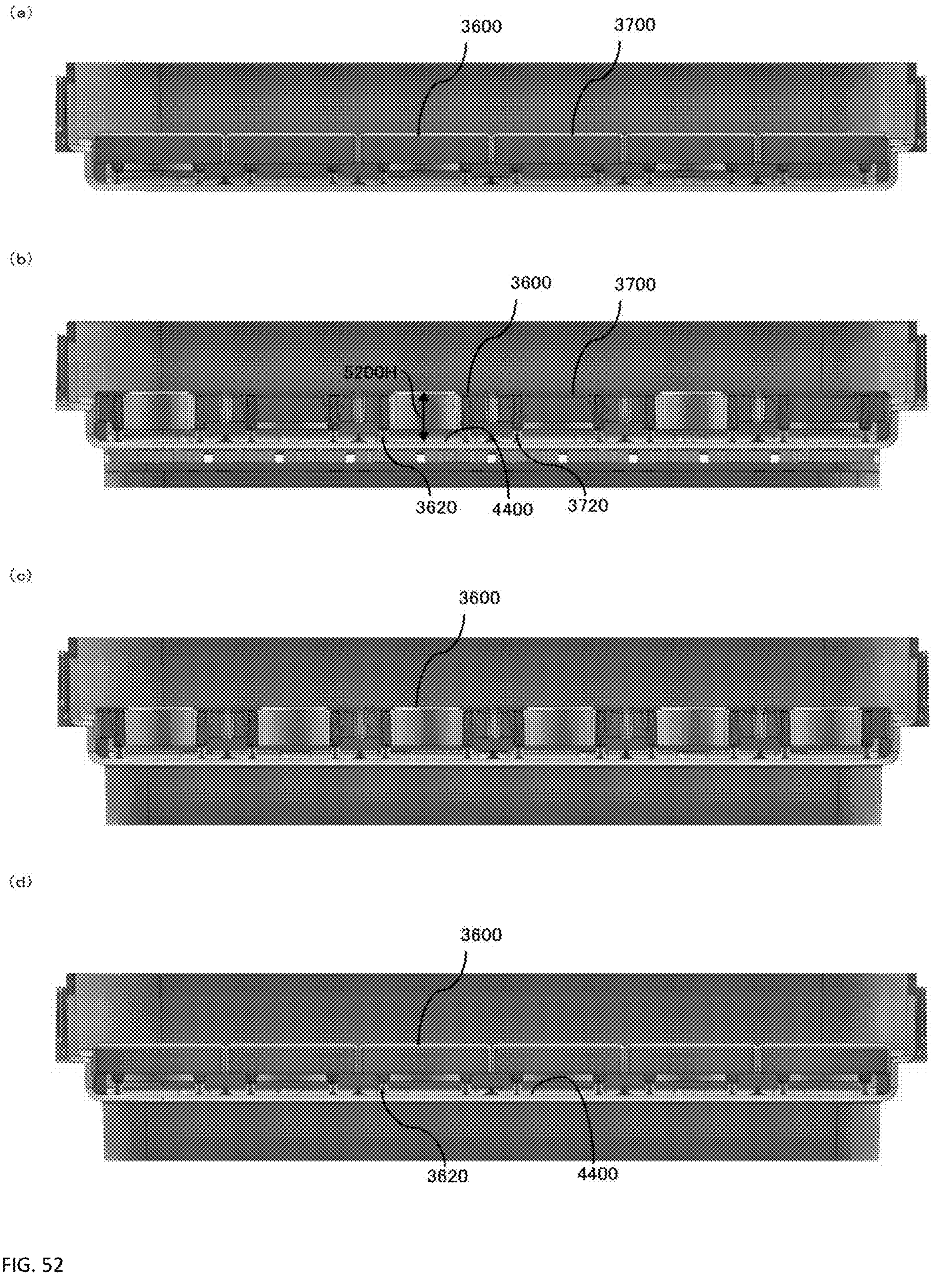
FIG. 52 depicts an example giving an explanation of the cross-sectional view of the nutrient solution tray 4200*c* in FIG. 42.

FIG. 52 depicts an example giving an explanation of the cross-sectional view of the nutrient solution tray 4200*c* in FIG. 42.

FIG. 52 (*a*) depicts an example showing the cross-sectional view along D-D' line in FIG. 51.

FIG. 52 (*b*) depicts an example showing the cross-sectional view along E-E' line in FIG. 51.

FIG. 52 (*c*) depicts an example showing the cross-sectional view along F-F' line in FIG. 51.

FIG. 52 (*d*) depicts an example showing the cross-sectional view along G-G' line in FIG. 51.

In FIGS. 52 (*a*), 52 (*b*), a configuration in which the cultivation plates 3600 and the cultivation plate spacers 3700 are alternately arranged in the shorter side direction of the nutrient solution tray 4200*c* is illustrated.

The cultivation plates 3600 and the cultivation plate spacers 3700 which are alternatively arranged in the shorter side direction of the nutrient solution tray 4200*c* are in contact with the bottom surface 4400 of the nutrient solution tray 4200*c* at the leg parts 3620 and the leg parts 3720, respectively.

In FIGS. 52 (*c*), 52 (*f*), a configuration in which the cultivation plates 3600 are arranged side by side in the shorter side direction of the nutrient solution tray 4200*c* is illustrated.

The cultivation plates 3600 which are arranged side by side in the shorter side direction of the nutrient solution tray 4200*c* are in contact with the bottom surface 4400 of the nutrient solution tray 4200*c* at the leg parts 3620.

Figure 53:
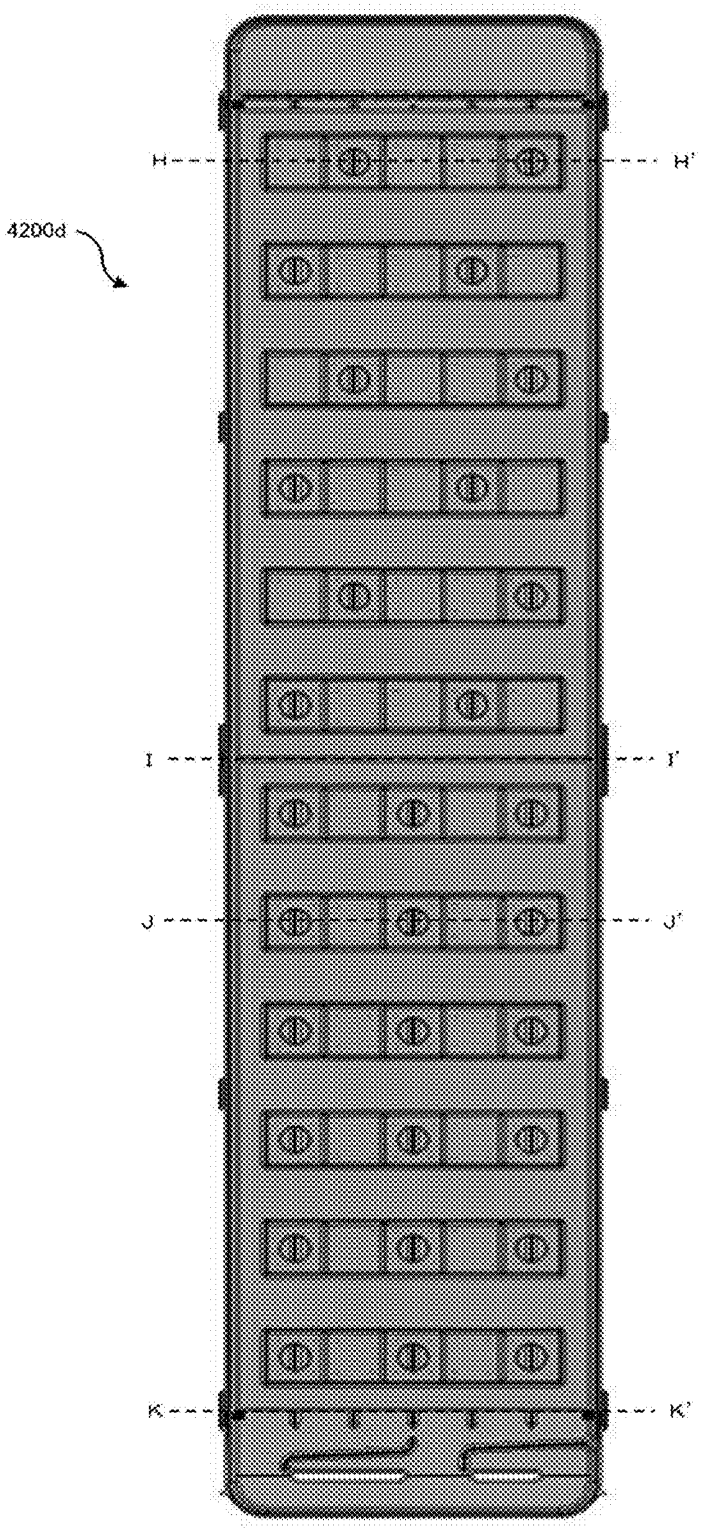
FIG. 53 depicts an example of a top view of the nutrient solution tray 4200*d* in FIG. 42.

FIG. 53 depicts an example of a top view of the nutrient solution tray 4200*d* in FIG. 42. As explained with referring to FIG. 42, at the nutrient solution tray 4200*d*, a spacing is made in two patterns by using the cultivation plate spacer 3700 and the cultivation panels 3800 (3800*a*, 3800*b*) in the cultivation plates 3600.

Figure 54:
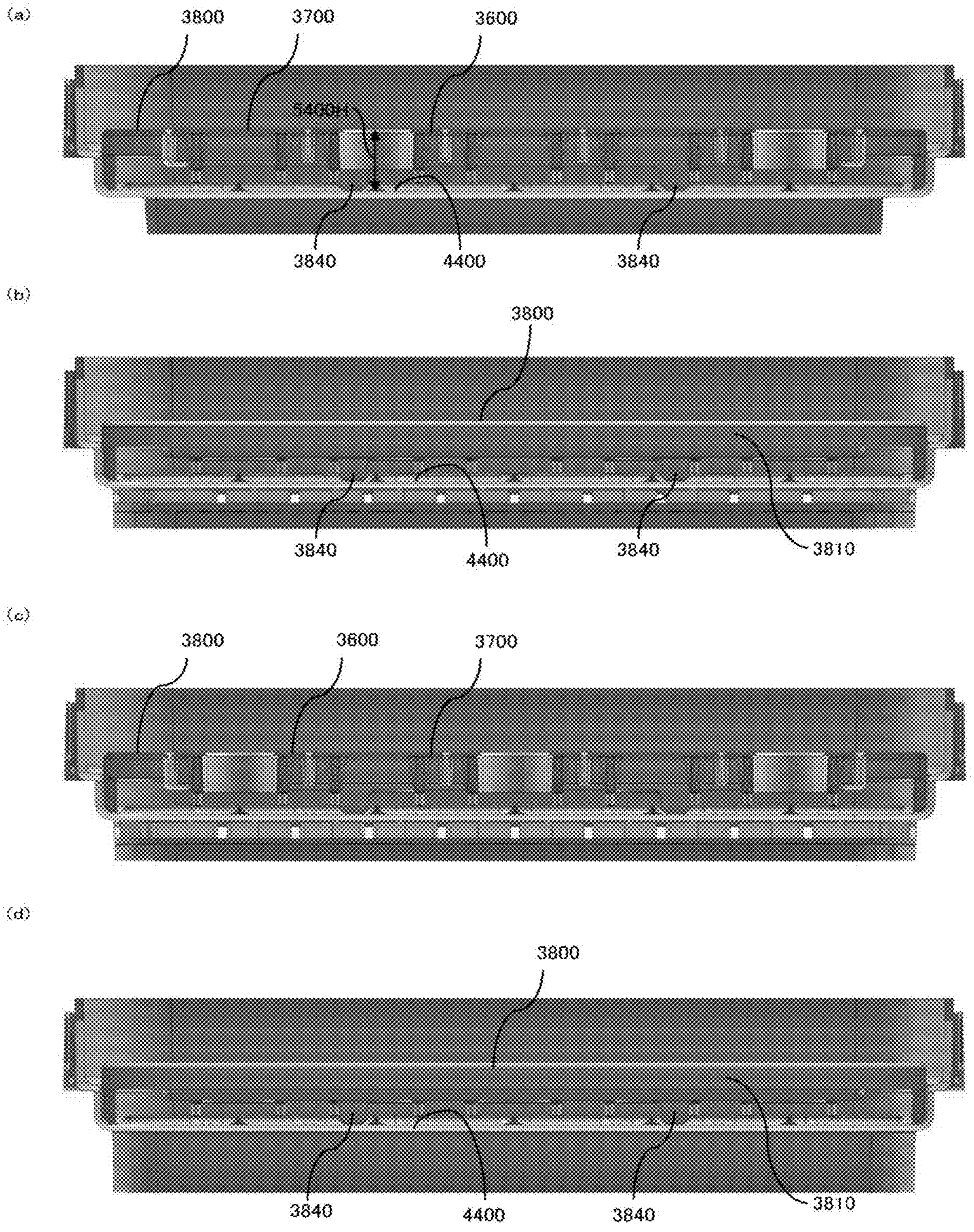
FIG. 54 depicts an example giving an explanation of the cross-sectional view of the nutrient solution tray 4200*d* depicted in FIG. 42.

FIG. 54 depicts an example giving an explanation of the cross-sectional view of the nutrient solution tray 4200*d* in FIG. 42.

FIG. 54 (*a*) depicts an example showing the cross-sectional view along H-H' line in FIG. 53.

FIG. 54 (*b*) depicts an example showing the cross-sectional view along I-I' line in FIG. 53.

FIG. 54 (*c*) depicts an example showing the cross-sectional view along J-J' line in FIG. 53.

FIG. 54 (*d*) depicts an example showing the cross-sectional view along K-K' line in FIG. 53.

In FIG. 54 (*a*), a configuration in which the cultivation plates 3600 and the cultivation plate spacers 3700 are arranged side by side in the shorter side direction of the nutrient solution tray 4200*d* in a state of being housed in the opening 3830 of the cultivation panel 3800 is illustrated.

Two cultivation plate spacers 3700 are arranged between the two cultivation plates 3600.

The leg part 3620 of the cultivation plate 3600 and the leg part 3620 of the cultivation plate spacer 3700 are not in contact with the bottom surface 4400 of the nutrient solution tray 4200*d*.

In the embodiment of FIG. 54 (*a*), the height 5400H which is measured from the bottom surface 4400 to the top surface of the cultivation plate 3600 and the top surface of the cultivation plate spacer 3700 is equal to the height 4700H1 which is explained with referring to FIG. 47 (*b*).

In FIG. 54 (*c*), a configuration in which the cultivation plates 3600 and the cultivation plate spacers 3700 are arranged side by side in the shorter side direction of the nutrient solution tray 4200*d* in a state of being housed in the opening 3830 of the cultivation panel 3800 is illustrated.

One cultivation plate spacer 3700 is arranged between the two cultivation plates 3600.

In FIGS. 54 (*b*), 54 (*d*), the short-side-outer peripheral edge 3810 of the cultivation panel 3800 (which is illustrated in FIGS. 54 (*a*), 54 (*c*)) is illustrated. By using the above-mentioned cultivation panel 3800, it becomes possible to remove the cultivation plate(s) 3600 and cultivation plate spacer(s) 3700 (which are housed in the cultivation panel 3800) collectively from the nutrient solution tray 4200*d*, easily, in a short time, by lifting up the cultivation panel 3800 from the nutrient solution tray 4200*d*.

Figure 55:
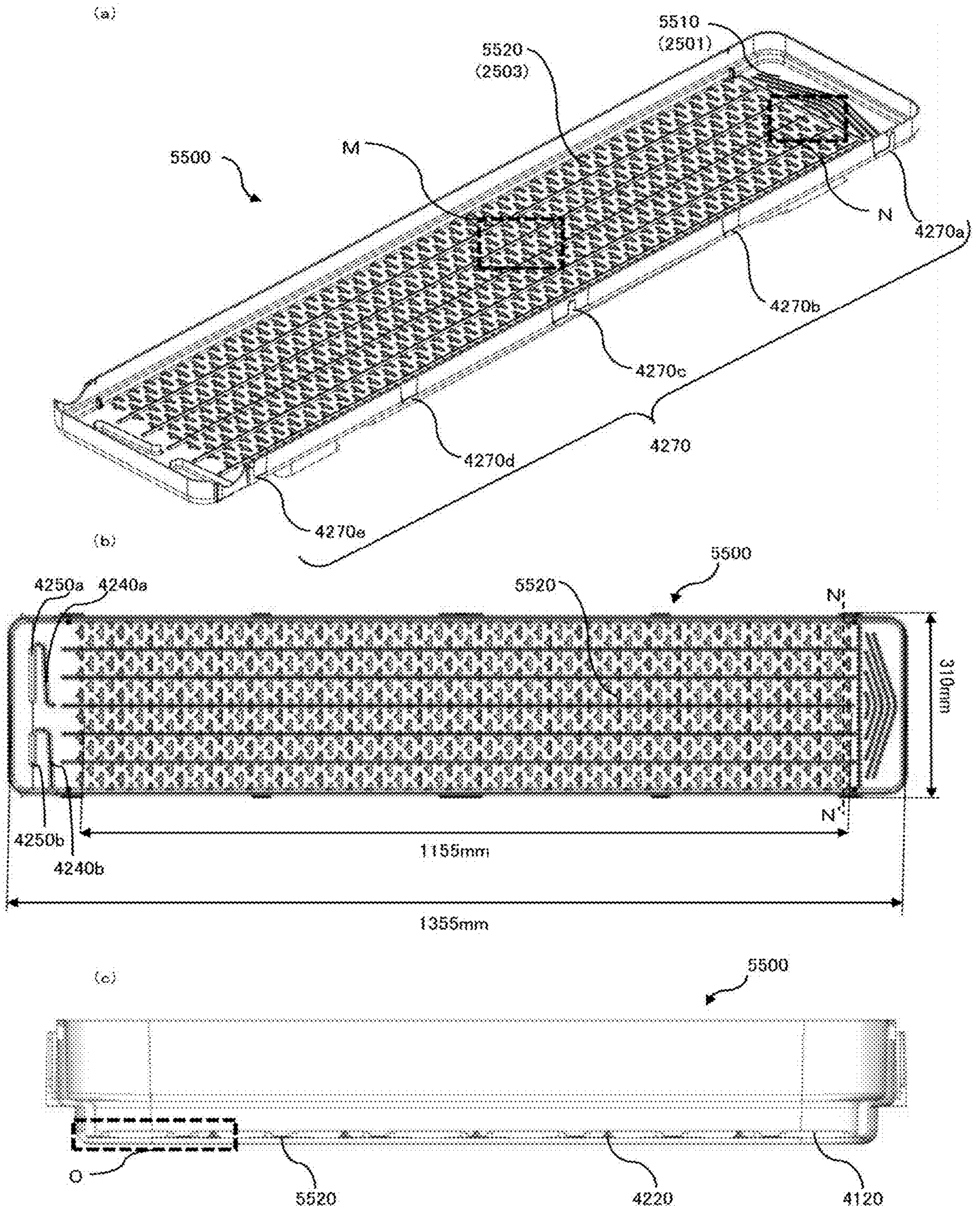
FIG. 55 depicts an example giving an explanation of the different nutrient solution tray.

FIG. 55 depicts an example giving an explanation of the different nutrient solution tray.

In FIGS. 55 (*a*) to 55 (*c*), a nutrient solution tray 5500 different from the nutrient solution tray 4200 illustrated in FIGS. 42 to 54 is illustrated.

The different nutrient solution tray 5500 is provided with a guide pattern 5510 and a dispersion pattern 5520 which are similar to the pattern structure described using FIG. 25 (the guide pattern 2501 and the dispersion pattern 2503).

The guide pattern 5510 and the dispersion pattern 5520 are given as one example of the pattern structure, which is designed in a shape that is capable of diverting or dispersing a flow of nutrient solution in the shorter side direction of the nutrient solution tray.

Similar to the pattern structure described using FIG. 25, the guide pattern 5510 and the dispersion pattern 5520 are capable of promoting to spread a nutrient solution uniformly on the entire bottom surface.

FIG. 55 (*a*) depicts an example of a perspective view of the different nutrient solution tray 5500.

FIG. 55 (*b*) depicts an example showing a top view of the different nutrient solution tray 5500.

FIG. 55 (*c*) depicts an example giving an explanation of the cross-sectional view along N-N' line in FIG. 55 (*b*).

The mounting structure 4270 (from 4270*a* to 4270*e*) depicted in FIG. 55 (*a*) is provided for attaching the leaf guard plate 4300 (4300*a*) to the different nutrient solution tray 5500, similarly to the case of the nutrient solution tray 4200.

The areas M and N surrounded by broken lines in FIG. 55 (*a*) will be described in detail with referring to FIG. 56.

FIG. 55 (*b*) depicts an example giving sizes of the different nutrient solution tray 5500.

The length in the longer side direction of the different nutrient solution tray 5500 is 1355 mm, and the length in the shorter side direction thereof is 310 mm.

The length in the longer side direction of the receptacle area 4920 (105) of the different nutrient solution tray 5500 is 1155 mm.

The above-mentioned sizes can be adopted in the same way in the nutrient solution tray 4200.

In FIG. 55 (*c*), a configuration in which the height (or thickness) of the dispersion pattern 5520 is lower than the height of the weir 4120 and that of the wall part 4220 is illustrated.

The area O surrounded by a broken line in FIG. 55 (*c*) will be described in detail with referring to FIG. 56.

Figure 56:
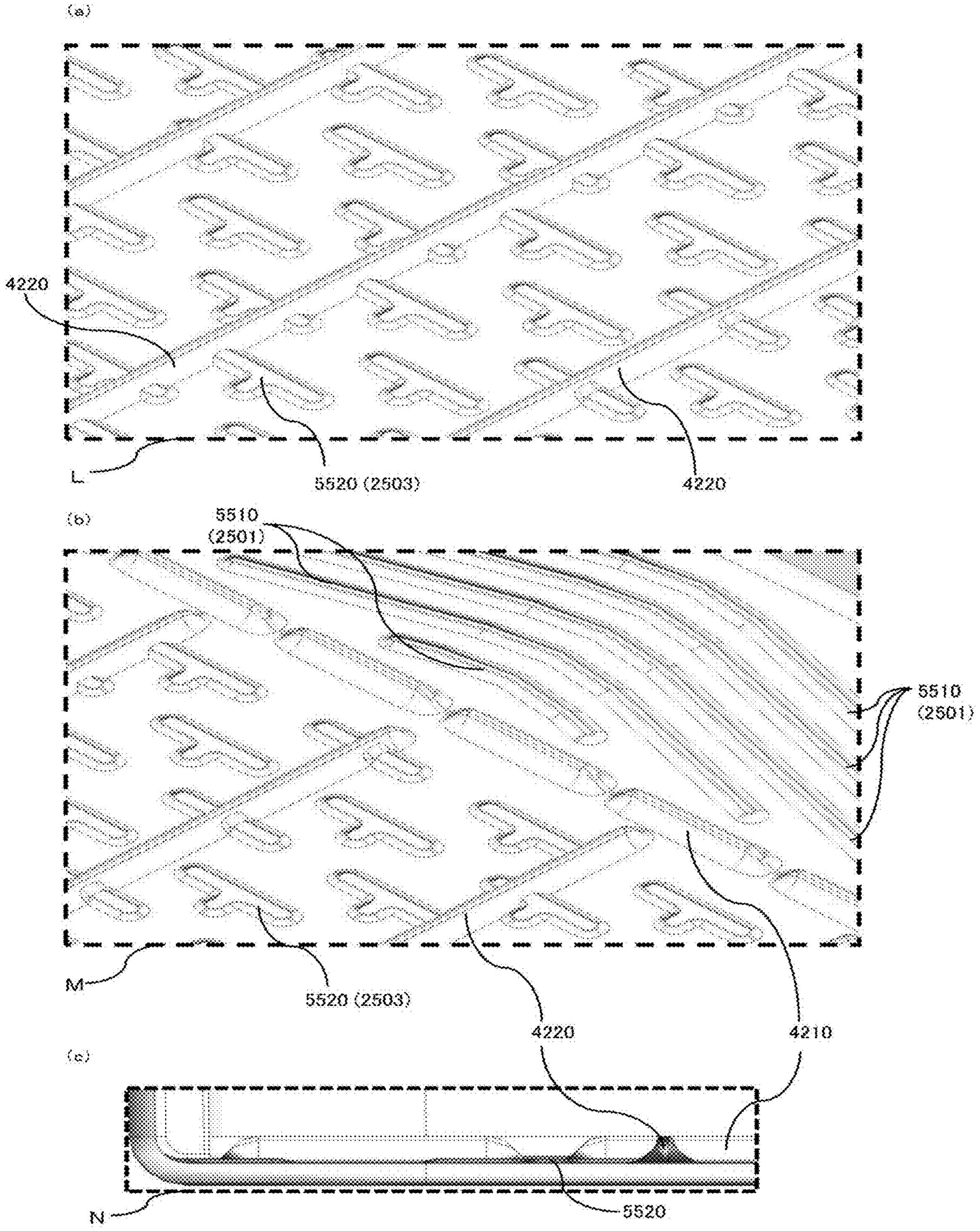
FIG. 56 depicts an example giving an explanation of the partially enlarged view of the nutrient solution tray depicted in FIG. 55.

FIG. 56 depicts an example giving an explanation of the partially enlarged view of the nutrient solution tray in FIG. 55.

From FIGS. 56 (*a*) to 56 (*c*), a configuration in which the height (or thickness) of the dispersion pattern 5520 is lower than the height of the weir 4120 and that of the wall part 4220 is illustrated in details.

For example, the height of the weir 4120 and that of the wall part 4220 are in a range of from about 2 mm to about 3 mm, and the height of the dispersion pattern 5520 is about 0.5 mm.

The dispersion pattern 5520 serves to reduce an uneven flow of the nutrient solution in the respective channels by making use of the slight slope of the different nutrient solution tray 5500.

Figure 57:
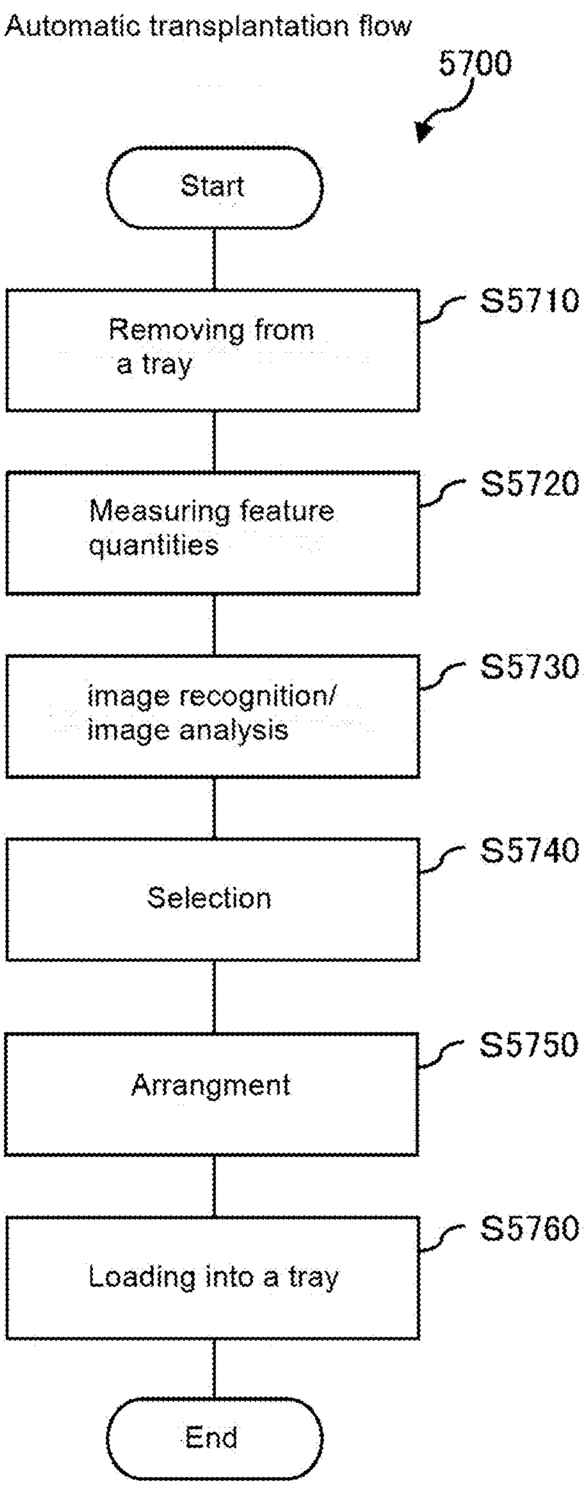
FIG. 57 depicts an example giving an explanation of automatic transplantation flow.

FIG. 57 depicts an example giving an explanation of automatic transplantation flow.

Steps for removing the cultivation plate 3600 integrally with plants from the nutrient solution tray 4200 containing growing plants, and for transplanting it to a different nutrient solution tray 4200 in an appropriately spaced condition can be mechanized and automatically performed.

The specific steps will be described with referring to FIG. 58.

Figure 58:
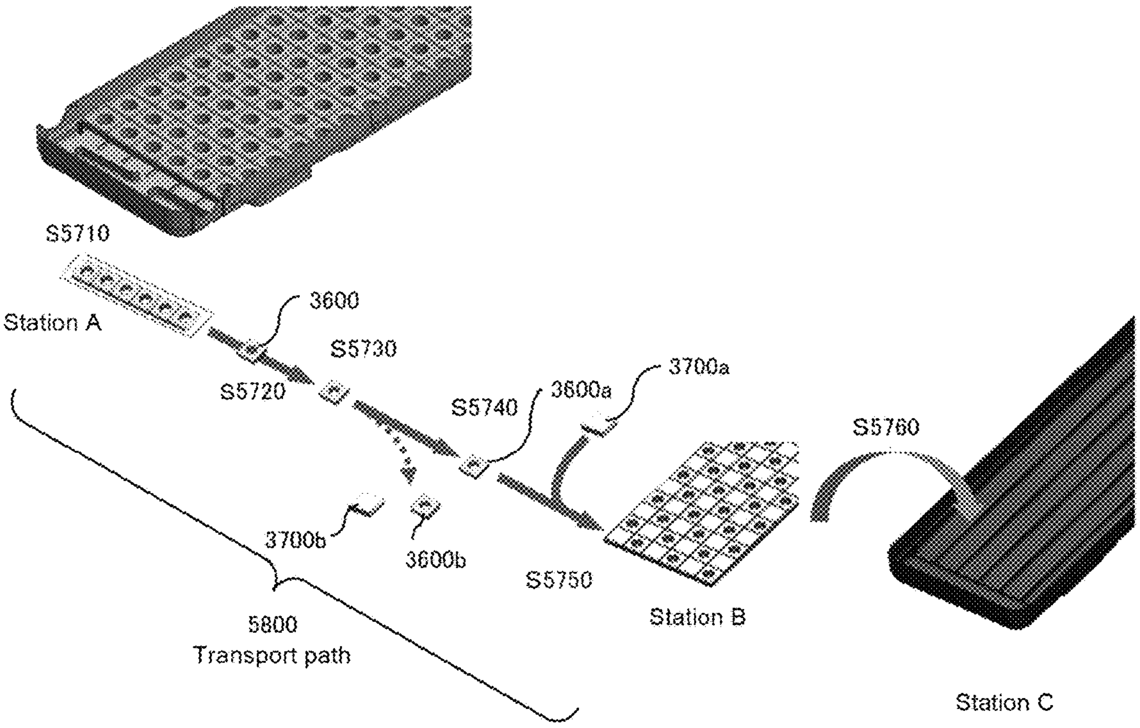
FIG. 58 depicts an example giving an explanation of a schematic diagram of the automatic transplanting.

FIG. 58 depicts an example giving an explanation of a schematic diagram of the automatic transplantation.

For example, the automatic transplanting process of plants may be performed according to the automatic transplantation flow 5700 depicted in FIG. 57.

Hereinafter, explanation is given to the automatic transplanting steps for removing a plant(s) from the nutrient solution tray 4200 containing growing plants, and for arranging it to a new nutrient solution tray 4200 in a different spaced condition.

The nutrient solution tray 4200 containing growing plants is intended to be transferred to a station A where the removing of the cultivation plate 3600 is conducted, and then to a station C where it is housed into a new nutrient solution tray 4200 in a scheduled spacing condition.

The automatic transplantation is carried out by using an automatic transplanting mechanism which is controlled by an automatic transplanting control device.

At the station A, with regard to the plants contained in the cultivation tray, as the object of the transplanting work, for example, the below-mentioned pick-up mechanism (or taking-out part) 5900 collectively picks up the cultivation plates 3600 in one row in the nutrient solution tray 4200 to remove them therefrom (S5710).

The removed cultivation plate 3600 is transported individually by passing through the transport path 5800.

During the transportation, feature quantities of a plant contained in the individual cultivation plate 3600 are measured by a sensor device (S5720). For example, the weight is measured together with the cultivation plates 3600 by a weight scale which is provided in the transport path 5800.

During the transportation, images (for example, moving images and/or still images) of a plant contained in the individual cultivation plate 3600 are captured or photographed with a photographing device, and then the image recognition and/or the image analysis of the captured plant is performed by the automatic transplanting control device, based on the captured image data (S5730).

During the course of the step S5730 of performing the image recognition and/or the image analysis, for example, the presence or absence of a disease or a sign of a disease, a growth rate (for example, sizes of leaves, heights of plant), are recognized and analyzed.

Please notice that the step S5720 of measuring the feature quantities and the step S5720 of performing the image recognition and/or the image analysis may be performed by changing the order. Also, these two steps may be performed simultaneously or in the same section of the transport path 5800.

The automatic transplantation control device is capable of discriminating the growing conditions and the health conditions of the plant, based on at least either one of the measured feature quantities and the result of the image recognition and/or the image analysis.

The automatic transplantation control device is capable of sorting the cultivation plate 3600*b* including a plant that is excessively growing rapidly, a plant that is excessively growing slowly, and a plant having a symptom of a disease, etc., and/or the cultivation plate spacer 3700*b* requiring the replacement or cleaning thereof, by using a sorter, and of selecting the cultivation plate 3600*a* which is suitable for the scheduled spacing condition at the station C (S5740).

The selected cultivation plate 3600 is transported to the station B to be arranged in the scheduled spacing condition (S5750). During the course of the arranging step S5750, a cultivation plate spacer 3700*a* and/or a cultivation panel 3800 can be added according to the arrangement of the scheduled spacing condition.

The cultivation panel 3800 to be added during the course of the arranging step S5750 is, for example, a cultivation plate 3520*a* including a plant that is growing slowly or a cultivation plate 3520*b* including a plant that is growing rapidly, etc., among plants which are cultivated in the different nutrient solution trays 4200, which will be described later with referring to FIGS. 61, 62.

At the station C, the cultivation plate 3600 arranged in the scheduled spacing condition is loaded into a new nutrient solution tray 4200 by using a loading mechanism (S5760).

Figure 59:
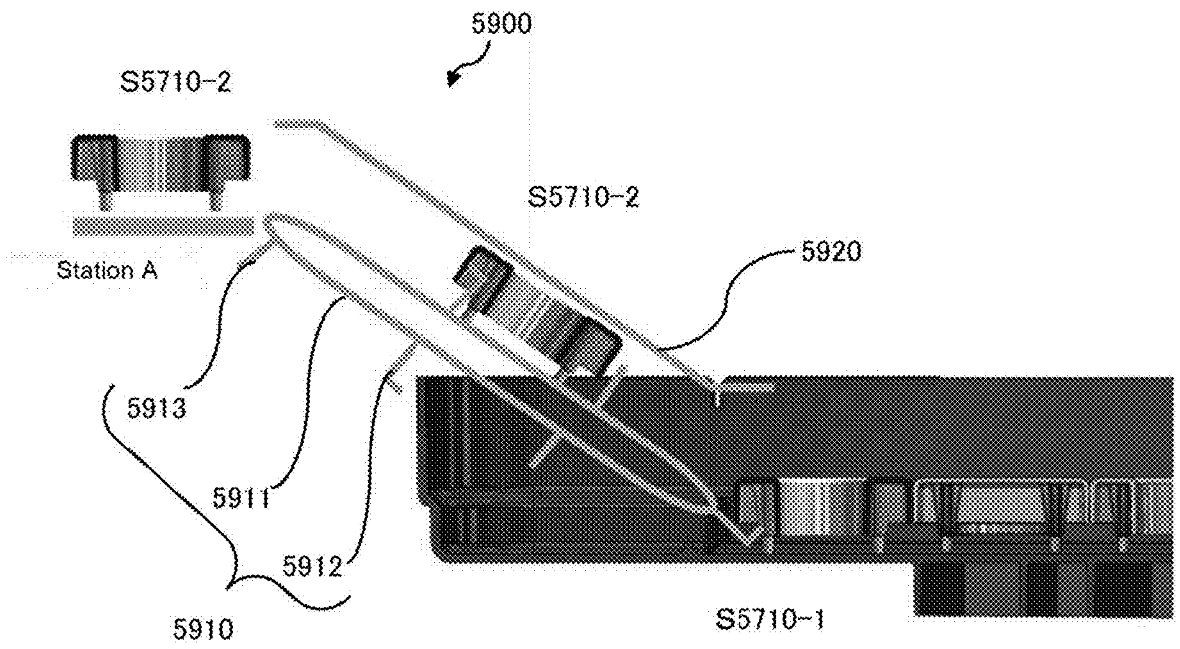
FIG. 59 depicts an example of a schematic view giving an explanation of the pick-out process S5710 from a tray of FIG. 57.

FIG. 59 depicts an example of a schematic view giving an explanation of the step S5710 of picking up from the tray of FIG. 57.

In FIG. 59, a pick-up mechanism 5800 for carrying out the pick-out step S5710 at the station A is illustrated.

For example, the pick-up mechanism (or taking-out part) 5900 is configured to include a driving unit (or conveyor) 5910 and a suppression unit 5920.

The driving unit 5910 is provided for transporting a row of the cultivation plates 3600 from the nutrient solution tray 4200 to the station A, and the suppressing unit 5920 is provided for preventing the falling down of the cultivation plate 3600 and/or separating of the cultivation plate 3600 from the driving unit 5910 during the course of the transportation.

For example, the driving unit 5910 is configured to include a drive rail 5911, a hook 5912, and a fall prevention member 5913.

During the course of the pick-up step S5710, the hook 5912 attached to the drive rail 5911 which is driven to be encircled picks up the cultivation plate 3600 from the nutrient solution tray 4200 (S5710-1). Subsequently, the drive rail 5911 transports the picked-up cultivation plate 3600 to the station A (S5710-2). Subsequently, the transported cultivation plate 3600 is received by the station A (S5710-3).

Figure 60:
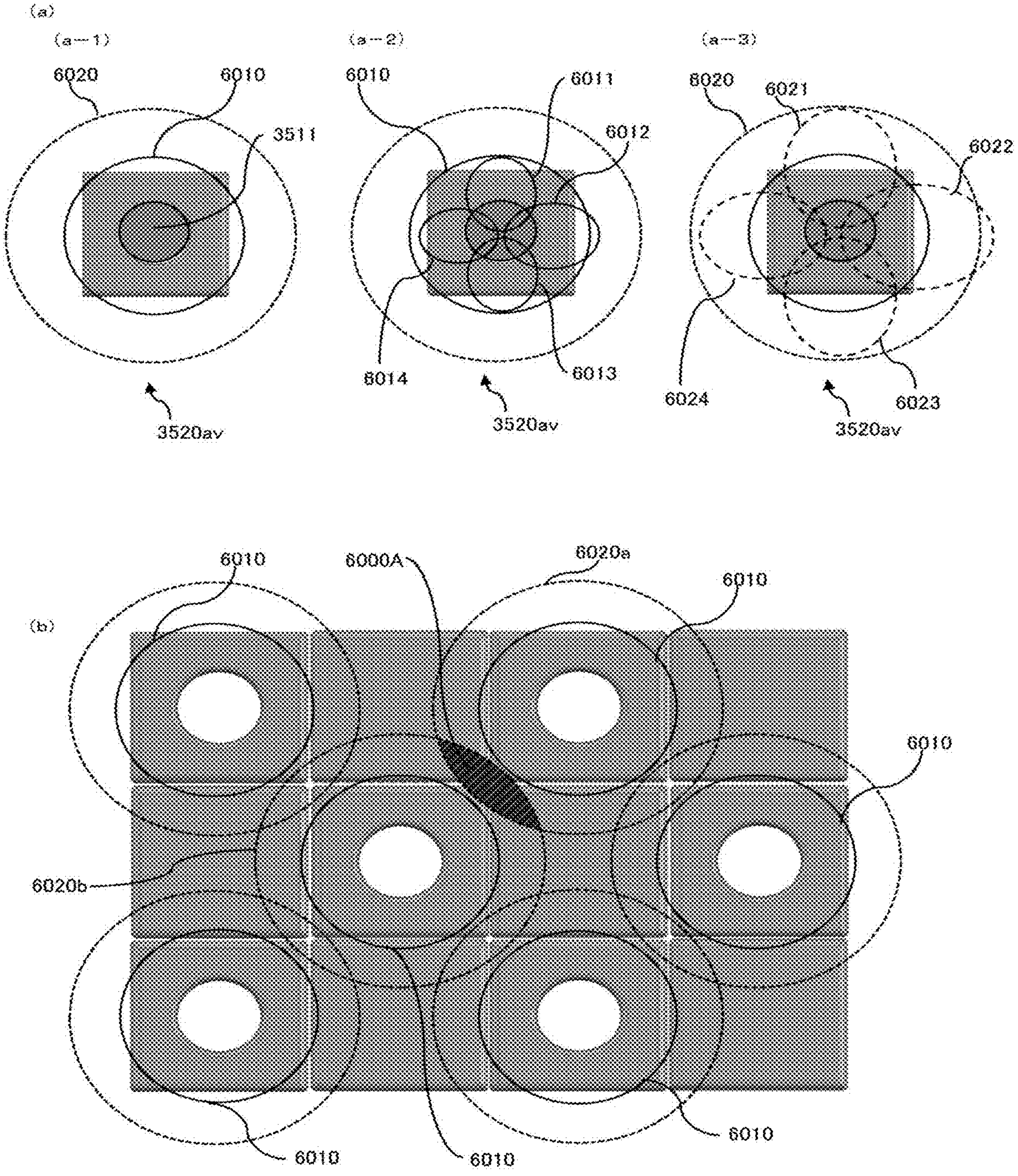
FIG. 60 depicts an example giving an explanation of an actual growing range and a predicted growing range.

FIG. 60 depicts an example giving an explanation of an actual growing range and a predicted growing range.

In FIG. 60 (*a*), an actual growing area of a plant growing isotropically and a predicted growing area are depicted by using FIGS. 60 (*a*-1) to 60 (*a*-3).

FIG. 60 (*b*) is an example of an explanation of a spacing state of the cultivation plate 3600 including plants in the condition of FIG. 60 (*a*).

FIG. 60 (*a*-1) depicts an example giving an explanation of an actual growing area and a predicted growing area by using two circles.

FIG. 60 (*a*-2) depicts an example in which an actual leaf of a plant which grows actually is added to FIG. 60 (*a*-1).

FIG. 60 (*a*-3) depicts an example in which a hypothetical leaf of a plant of which growth is predicted is added to FIG. 60 (*a*-1).

In FIG. 60*a*, a circle drawn by a solid line indicates an actual growing area 6010, and a circle drawn by a broken line indicates a predicted growing area 6020. At the time, only a part of the sponge culture medium 3511 of the transplantation medium 3510 contained in the cultivation plate 3600 is illustrated. However, in the figures below, a part of the sponge culture medium 3511 will be omitted.

For example, it is possible to define the actual growing area 6010 by a circle, an ellipse, or the like to which at least one of actual leaves of actual plant is inscribed (or, at least one leaf is in contact with the circle or the like from its inner side). Here, the meaning of "at least one of actual leaves of actual plant" indicates, for example, a leaf forming the outermost contour of actual plant in the photographed image of the plant.

FIG. 60 (*a*-1) depicts the cultivated plate 3520*av* in which a plant having an average growing area is included.

In FIG. 60 (*a*-2), it is illustrated that a leaf 6011 and a leaf 6013 (among four leaves 6011 to 6014 positioned at the outmost side of the plant) are inscribed with a circle indicating the actual growing area 6010. Further, the leaf 6012 exists in the outside of the circle indicating the actual growing area 6010, and the leaf 6014 exists in the inside of the circle indicating the actual growing area 6010.

In FIG. 60 (*a*-3), the predicted growing area 6020 is indicated by a circle of a dashed line, with regard to the leaves 6011 to 6014 of the actual plant of FIG. 60 (*a*-2). Preferably, the predicted growing area 6020 is a growing area which is predicted at a timing of performing the subsequent spacing.

In the predicted growing area 6020, the predicted leaves 6021 and 6023 are inscribed with the circle indicating the predicted growing area 6020. Further, the predicted leaf 6022 exists in the outside of the circle indicating the predicted growing area 6020, and the predicted leaf 6024 exists in the inside of the circle indicating the predicted growing area 6020.

FIG. 60 (*b*) depicts an example showing a spacing condition of the cultivation plate 3600 including plants that have grown at almost the same level.

In FIG. 60 (*b*), an overlapping area does not exist between the actual growing areas 6010 of plants included in the respective cultivation plates 3600.

In FIG. 60 (*b*), a plurality of overlapping areas exist between the predicted growing areas 6020 of plants included in the respective cultivation plates 3600. In FIG. 60 (*b*), it is exemplified that the area 6000A which is overlapped between the predicted growing areas 6020*a*, 6020*b* is highlighted with oblique lines.

For example, with regard to an area of the predicted growing area 6020 of a plant included in one cultivation plate 3600, when an area overlapping with the predicted growing areas 6020 (for example, on the subsequent spacing scheduled day) of a plant included in the nearby cultivation plate 3600 exceeds a certain predetermined rate, a wider spacing pattern is preferably selected.

In this case, for example, the meaning of the "certain predetermined rate" may be defined as a range of from about 0% to about 5% with regard to a plant immediately after germination, or as a range of from about 30% to about 40% with regard to a plant which grows considerably. Please notice that the above-mentioned numerical ranges may be modified with time, for example, based on the kind of the plant to be cultivated, the growth phase of the plant (the number of days from germination), and the like.

The above-mentioned numerical ranges and different numerical ranges specified in the following descriptions may have an effect of stimulating plants to be cultivated in the nutrient solution trays 4200 to more sufficiently grow.

For example, the even or regular spacing patterns as illustrated in FIGS. 51, 53, etc., are particularly advantageous when the plants to be cultivated in the nutrient solution tray 4200 grow at almost the same level.

For example, the meaning of the "plants grow at almost the same level" may be defined as a range of from about-20% to about +20% with regard to the average value of weights of plants cultivated in the same nutrient solution tray 4200. The above-mentioned numerical ranges may be modified with time, for example, based on the kind of the plant to be cultivated, the growth phase of the plant (the number of days from germination), and the like.

In order to determine the growth rate (or growth degree) of a plant, it is possible to use the determination results and/or analysis results of the ratio of the plant occupied in the captured image of the cultivated plants in addition to or substitution to the measured value of weight. In such a constitution, it is also possible to determine the isotropic manner of the growth of the plant based on the results of the image recognition and/or the image determination. For example, the isotropic manner of the growth of the plant may be determined by judging a size of misalignment of a center of a circle indicating the actual growing area 6010 from a center of the cultivation hole 3610 of the cultivation plate 3600.

Figure 61:
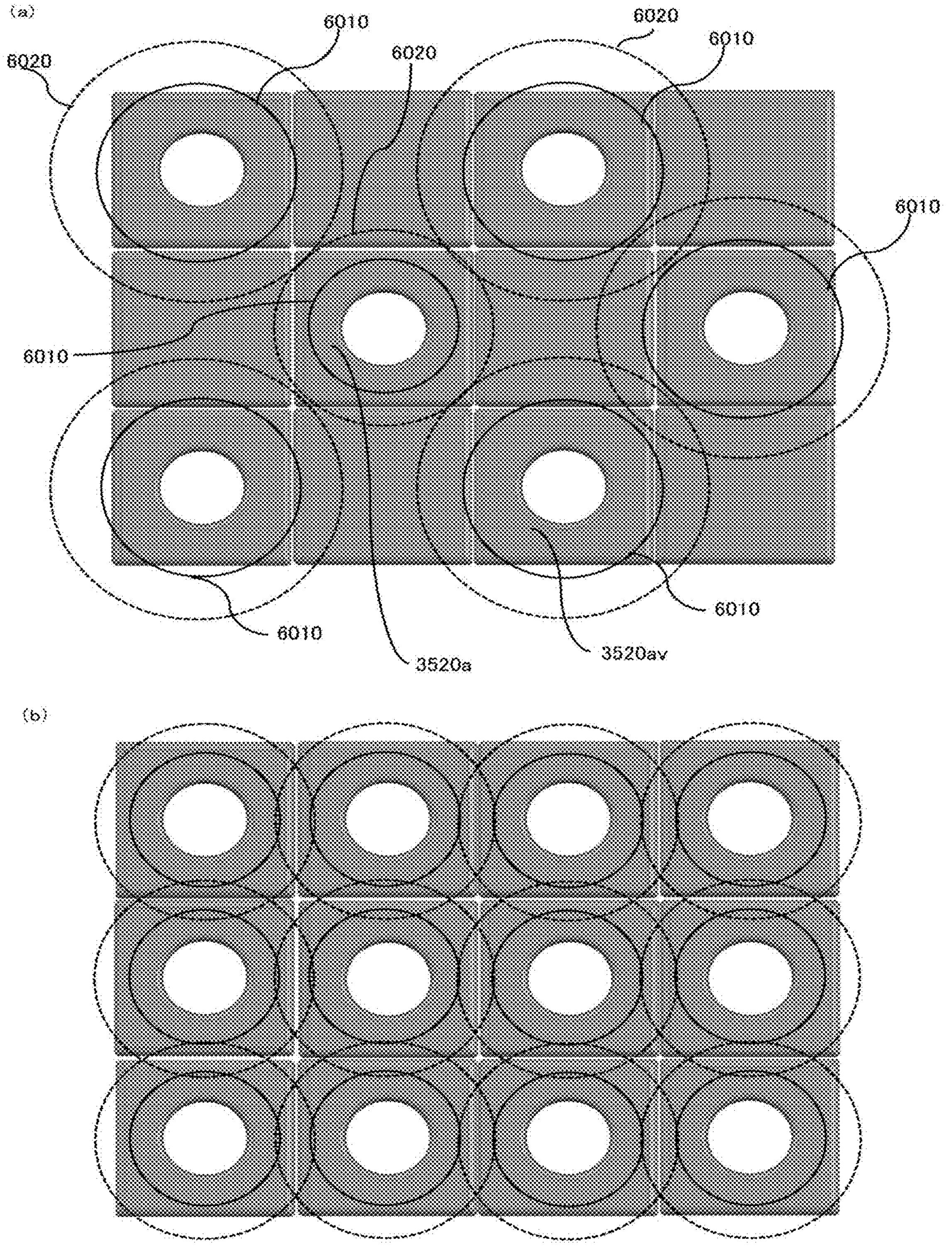
FIG. 61 depicts an example giving an explanation of a spacing of the cultivated plate having plants which grow slowly.

FIG. 61 depicts an example giving an explanation of a spacing of the cultivated plate including plants which grow slowly.

FIG. 61 (*a*) depicts an example giving an explanation of a spacing condition including the cultivated plate including plants which grow slowly.

FIG. 61 (*b*) depicts an example giving an explanation of another spacing condition which is suitable for arranging the cultivation plate including plants which grow slower than the rate of the spacing condition of FIG. 61 (*a*).

For example, when it is determined that the cultivation plate 3520*a* including a plant which grows slowly is in the transplanting process, at the step S5720 of measuring the feature quantities or at the step S5730 of performing the image recognition and/or the image analysis, as explained in FIGS. 57, 58, then, during the course of the selecting step S5740, the automatic transplanting control device separates the cultivation plate 3520*a* including a plant which grows slowly from the transport path 5800 heading for the station B from the station A.

The automatic transplanting control device is capable of introducing the separated cultivation plate 3520*a* including a plant which grow slowly compared to the neighboring plants, to a different transport path heading for a station for carrying out the automatic transplantation to the nutrient solution tray 4200 having a more proper spacing condition, such as depicted in FIG. 61 (*b*).

Accordingly, in a case where the arrangement subsequent to the spacing is in a condition as depicted in FIG. 61 (*a*), then, during the course of the above-mentioned selecting step S5740, the cultivation plate 3520*a* including a plant which grows slowly compared to the neighboring plants is not transported to the scheduled station B, station C, but is transported to a different station for carrying out the re-arranging in the spacing condition as depicted in FIG. 61 (*b*).

For example, the meaning of "a plant which grows slowly compared to the neighboring plants" may be defined by a condition in which the weight value of the plant is lower than the average value of a plurality of plants cultivated in the same nutrient solution tray 4200 by a prescribed rate.

In another example, the meaning of "a plant which grows slowly compared to the neighboring plants" may be defined by a condition in which an area of the actual growing area 6010 is smaller than the average value of areas of the actual growing areas 6010 of a plurality of plants cultivated in the same nutrient solution tray 4200 by a prescribed rate.

Furthermore, the meaning of "a plant which grows slowly compared to the neighboring plants" may be defined by a condition in which an area of the predicted growing area 6020 is smaller than the average value of areas of the predicted growing areas 6020 of a plurality of plants which are cultivated in the same nutrient solution tray 4200 by a prescribed rate.

For example, the term of "predetermined rate" may be defined as in a range of from about 10% to about 20% for a plant immediately after germination, or in a range of from about 20% to about 30% for a plant which grows considerably. Please notice that the above-mentioned numerical ranges for defining the "predetermined rate" may be modified with time, for example, based on the kind of the plant to be cultivated, the growth phase of the plant (the number of days from germination), and the like.

Also, a length from a center of the cultivation hole 3610 of the cultivation plate 3600 to the distal end of the outermost leaf of a plant cultivated in the cultivation hole 3610 may be used as a reference for comparing the growth rate of each plant, in place of the above-mentioned weight or area.

Figure 62:
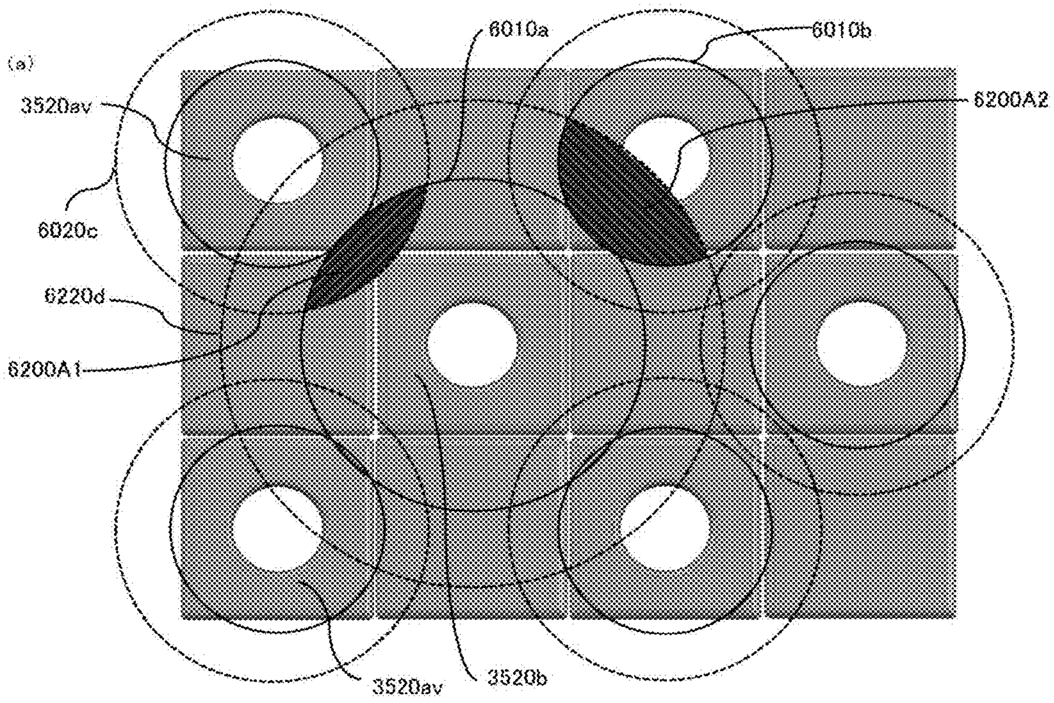
FIG. 62 depicts an example giving an explanation of a spacing of the cultivated plate having plants which grow rapidly.
Figure 62:
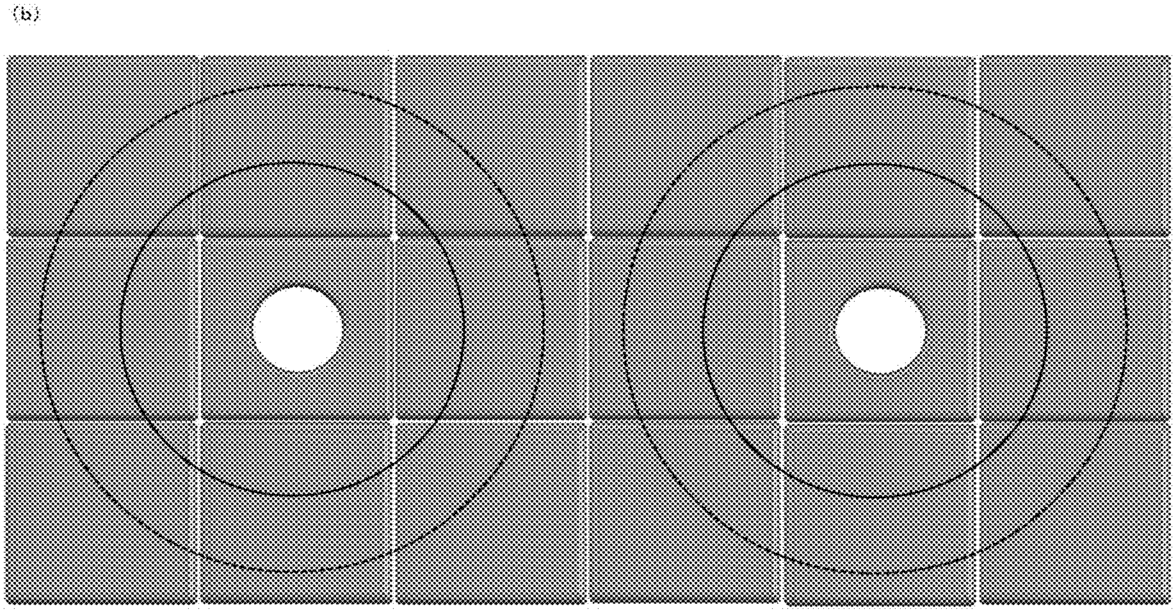

FIG. 62 depicts an example giving an explanation of a spacing of the cultivated plate including plants which grow rapidly.

FIG. 62 (*a*) depicts an example giving an explanation of a spacing condition including the cultivated plate having plants which grow rapidly.

FIG. 62 (*b*) depicts an example giving an explanation of a different spacing condition which is more suitable for arranging the cultivation plates having plants which grow rapidly in comparison to the spacing condition depicted in FIG. 62 (*a*).

For example, when it is determined that the cultivation plate 3520*b* including a plant which grows rapidly is in the transplanting process, at the step S5720 of measuring the feature quantities or at the step S5730 of performing the image recognition and/or the image analysis, then, during the course of the selecting step S5740, the automatic transplanting control device separates the cultivation plate 3520*b* including a plant which grows rapidly from the transport path 5800 heading for the station B from the station A.

The automatic transplanting control device is capable of introducing the separated cultivation plate 3520*b* including a plant which grows rapidly compared to the neighboring plants, to a different transport path heading for a station for carrying out the automatic transplantation to the nutrient solution tray 4200 having a more proper spacing condition, such as depicted in FIG. 62 (*b*).

Accordingly, in a case where the arrangement subsequent to the spacing is in a condition as depicted in FIG. 62 (*a*), then, the cultivated plate 3520*b* including a plant which grows rapidly compared to the neighboring plants is not transported to the scheduled station B, station C, but is transported to a different station for carrying out the re-arranging at the spacing condition as depicted in FIG. 62 (*b*).

In FIG. 62 (*a*), a first area 6200A1 in which an actual growing area 2610*a* of a plant which grows rapidly and a predicted growing area 6220*c* of a plant which grows at an average rate are overlapped with each other is depicted and emphasized by broken lines.

In addition, a second area 6200A2 in which an actual growing area 2610*b* of a plant which grow at an average rate and a predicted growing area 6220*d* of a plant which grows rapidly are overlapped with each other is depicted and emphasized by broken lines.

For example, the meaning of "a plant which grows rapidly compared to the neighboring plants" may be defined by a condition in which the weight value of the plant is higher than the average value of a plurality of plants cultivated in the same nutrient solution tray 4200 by a prescribed rate.

In another example, the meaning of "a plant which grows rapidly compared to the neighboring plants" may be defined by a condition in which an area of the actual growing area 6010 is larger than the average value of areas of the actual growing areas 6010 of a plurality of plants cultivated in the same nutrient solution tray 4200 by a prescribed rate, or is larger than the average value of areas of the predicted growing areas 6020 of a plurality of plants cultivated in the same nutrient solution tray 4200 by a prescribed rate.

Furthermore, the meaning of "a plant which grows rapidly compared to the neighboring plants" may be defined by a condition in which an area of the first area 6200A1 is about 10 percent larger than the area of the actual growing area 6010*a* of a plant which grows rapidly. Also, it may be defined by a condition in which an area of the second area

6200A2 is about 30 percent larger than the area of the actual growing area 6010*b* of a plant which grows at the average rate, or the like.

Also, it is possible to use a length from a center of the cultivation hole 3610 of the cultivation plate 3600 to the distal end of the outermost leaf of a plant cultivated in the cultivation hole 3610 as a reference for comparing the growth rate of the individual plant, in place of the above-mentioned weight or area.

According to the configurations which have been explained with referring to FIGS. 61, 62, it is preferable that the transplanting steps to a plurality of different spacing conditions are performed, in one cultivation device or cultivation plant, at the same time. Thereby, it becomes possible to carry out more flexible and more appropriate spacing for the respective plants in the cultivation device or cultivation plant, as a whole.

Individual plants are housed in the respective cultivation plates 3600, and their conditions or features can be obtained individually. Accordingly, in the configurations as explained in FIGS. 58 to 62, it is possible to carry out more appropriate spacings on the respective plants which are cultivated in one nutrient solution tray 4200.

Figure 63:
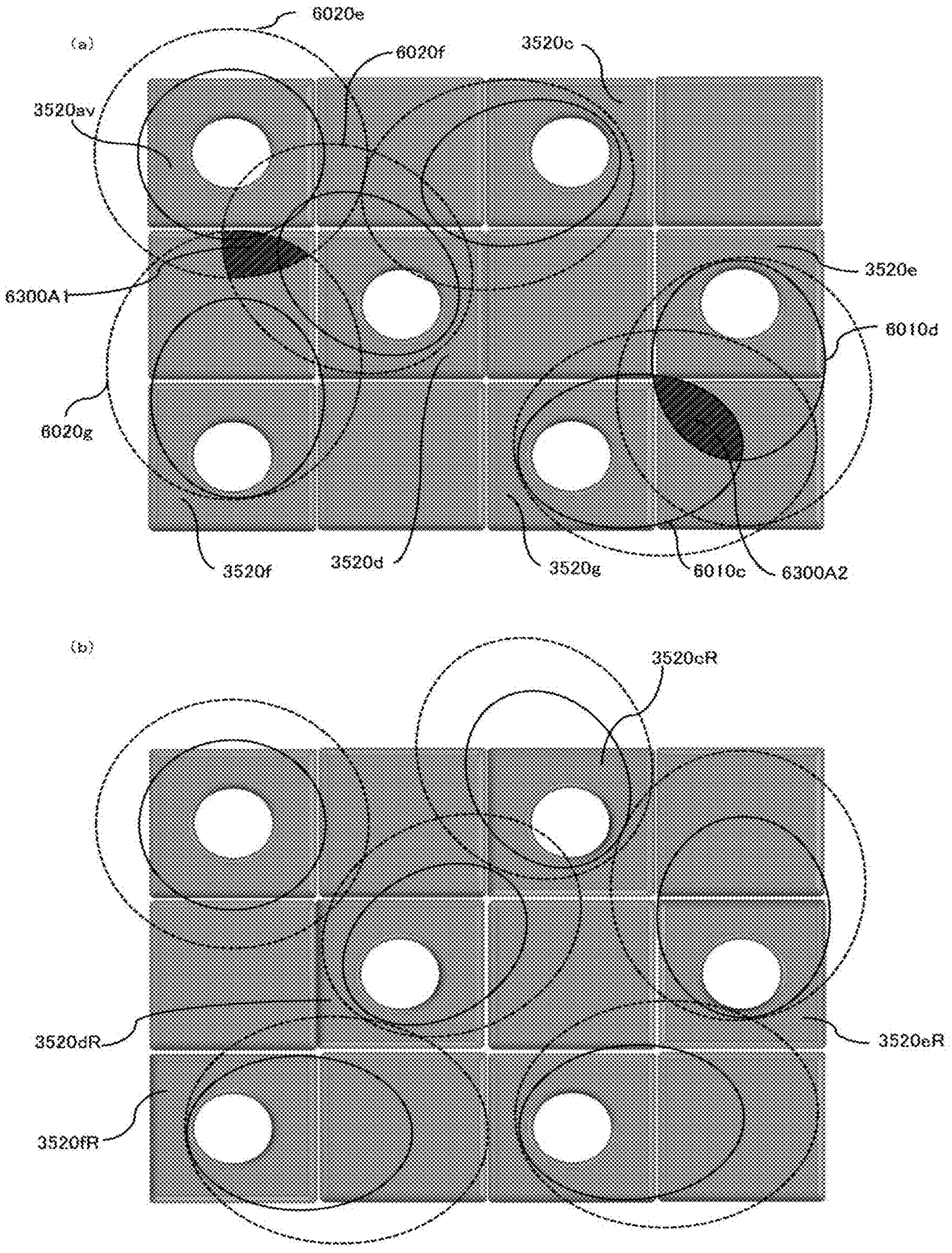
FIG. 63 depicts an example giving an explanation of a spacing of the cultivation plate having plants with a biased growing area.

FIG. 63 depicts an example giving another explanation of a spacing of the cultivation plate including plants having biased (or uneven) growing areas.

FIG. 63 (*a*) depicts an example giving an explanation of overlapping areas of plants having biased growing areas.

FIG. 63 (*b*) depicts an example giving an explanation of a different spacing condition in which some of the cultivation plates are rotated and arranged from the spacing condition in FIG. 63 (*a*).

In FIG. 63 (*a*), the cultivation plate 3520*av* including a plant having a growing area at the average rate, and the cultivation plates 3520*c*, 3520*d*, 3520*e*, 3520*f*, 3520*g* including plants having biased growing areas are illustrated.

In addition, in FIG. 63 (*a*), a third area 6300A1 at which predicted growing areas 6020 (6020*e*, 6020*f*, 6020*g*) of three plants are overlapped with each other, and a fourth area 6300A2 at which actual growing areas 6010 (6010*a*, 6010*b*) of two plants are overlapped with each other are illustrated.

For example, the transplanting step described in FIGS. 57, 58 preferably includes an additional step of rotating the cultivation plate 3600 to be performed between the step S5730 for performing the image recognition and/or the image analysis and the arranging step S750.

In such a configuration, by rotating and arranging some of the cultivation plates 3520*c*, 3520*d*, 3520*e*, 3520*f*, 3520*g* including plants having biased growing areas, it becomes possible to reduce the occurrence of the third area 6300A1 and the fourth area 6300A2 at the spacing condition after the rearrangement.

In FIG. 63 (*b*), the cultivation plates 3520*c*R, 3520*d*R, 3520*f*R which are rotated at an angle of 90 degrees and arranged from the states of the cultivation plates 3520*c*, 3520*d*, 3520*f*, and the cultivation plate 3520*e*R which is rotated at an angle of 180 degrees and arranged from the state of the cultivation plate 3520*e* are illustrated.

In FIG. 63 (*b*), by rotating the cultivation plate 3520, the occurrence of the third area 6300A1 and the fourth area 6300A2 is prevented.

Figure 64:
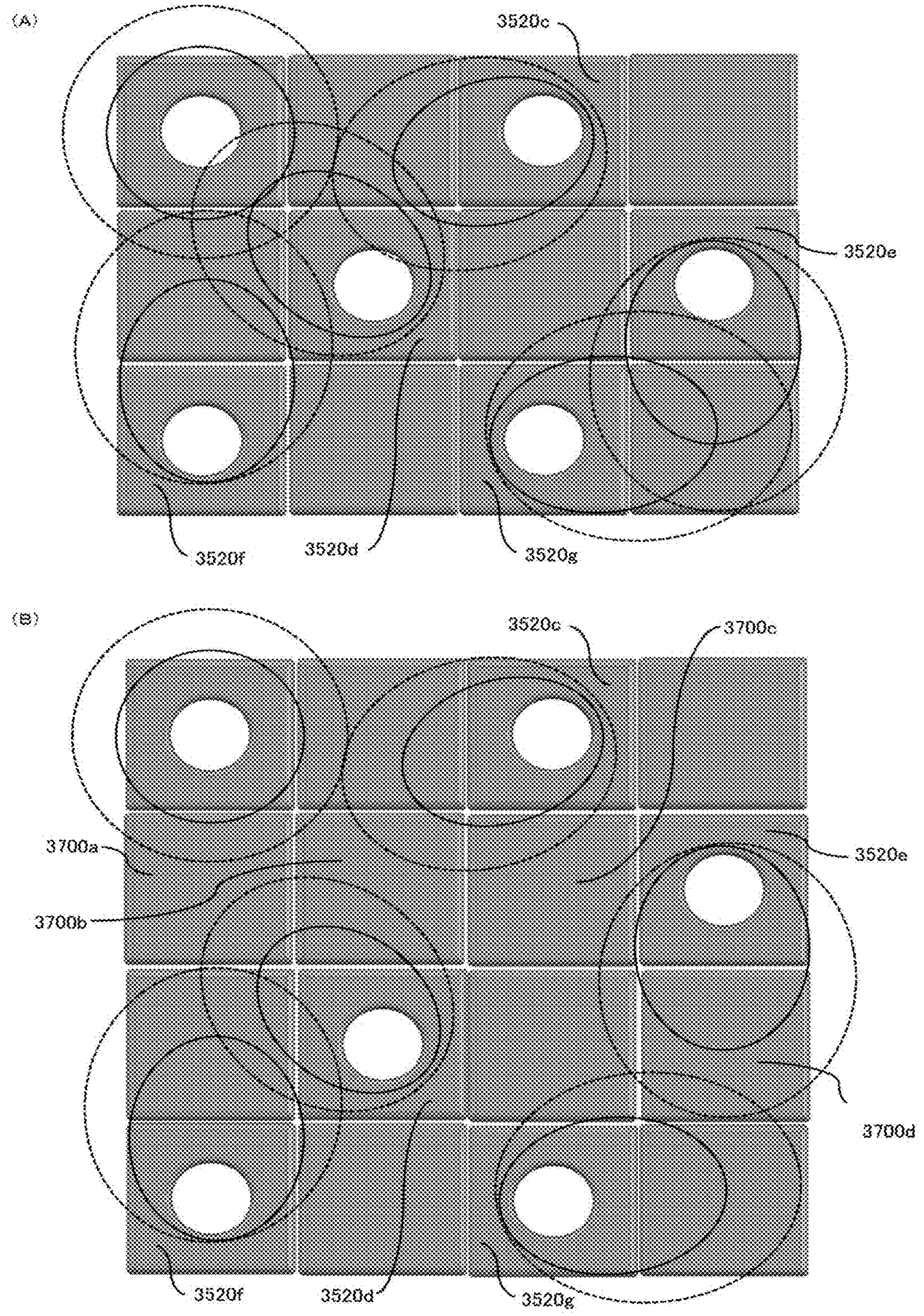
FIG. 64 depicts an example giving an explanation of the spacing of the cultivation plate including plants having biased growing areas.

FIG. 64 depicts an example giving an explanation of the spacing of the cultivation plate including plants having biased growing areas.

FIG. 64 (*a*) depicts an example giving an explanation of the overlapping of the growing areas of plants having biased growing areas, similarly to the case of FIG. 63 (*a*). FIG. 64 (*a*) depicts a spacing condition similarly to the case of FIG. 63 (*a*). For details, please refer to the descriptions of FIG. 63 (*a*) FIG. 64 (*b*) depicts an example giving an explanation of a different spacing condition in which the cultivation plate spacer 3700 is added into the spacing condition of FIG. 63 (*a*).

During the course of the step S5730 of performing the image recognition and/or the image analysis, the automatic transplanting control device determines the presence or absence of the occurrence of the third area 6300A1 and the fourth area 6300A2. Subsequently, during the course of the arranging step S5750, the automatic transplanting control device can add a cultivation plate spacer 3700 to the scheduled spacing condition based on the above-mentioned determination in order to reduce the occurrence of the third area 6300A1 and the fourth area 6300A2.

In such a configuration, by adding the cultivation plate spacers 3700*a*, 3700*b*, 3700*c*, 3700*d* around the cultivation plates 3520*c*, 3520*d*, 3520*e*, 3520*f*, 3520*g* including plants having the biased growing areas, with regard to the scheduled spacing condition in FIG. 64 (*a*), it becomes possible to reduce the occurrence of the third area 6300A1 and the fourth area 6300A2 in the rearranged spacing condition.

At least the following are described in the Example 1.

(1)

A planting pot including:

a plurality of potpieces, is provided, and each of the potpieces has a pot hole for accumulating a plant therein, and an interval between the pot holes of the plurality of potpieces is changeable.

(2)

According to the planting pot, further, the plurality of potpieces consist of a first-end potpiece, an intermediate potpiece, and a second-end potpiece, and the interval between the pot holes is changed by moving the first-end potpiece, the intermediate potpiece, and the second-end potpiece in the longer side direction of the planting pot.

(3)

According to the planting pot, further, the first-end potpiece has a receptacle area for inserting an insertion area of the intermediate potpiece, the intermediate potpiece has a receptacle area for inserting an insertion area of the second-end potpiece, and the interval between the pot holes is changed by at least, either one of moving the insertion area of the intermediate potpiece within the receptacle area of the first-end potpiece, and moving the insertion area of the second-end potpiece within the receptacle area of the intermediate potpiece.

(4)

According to the planting pot, further, a width of the receptacle area of the first-end potpiece and a width of the receptacle area of the intermediate potpiece are equal, a width of the insertion area of the intermediate potpiece and a width of the insertion area of the second-end potpiece are equal, and in a state in which the interval between the pot holes is shortest, the receptacle area of the first-end pot piece and the receptacle area of the intermediate pot piece are arranged on a flat surface.

(5)

According to the planting pot, further, the first-end potpiece has a first connecting part on the opposite side to the receptacle area, the second-end potpiece has a second connecting part on the opposite side to the insertion area, and the first connecting part and the second connecting part are formed complementarily such that the two planting pots are connected in the longer side direction.

(6)

According to the planting pot, further, each of an upper surface part forming the receptacle area of the first-end potpiece, an upper surface part forming the receptacle area of the intermediate pot piece, an upper surface part forming the insertion area of the intermediate pot piece, and an upper surface part forming the insertion area of the second-end pot piece is provided with an arc shaped cutout, and in a state in which the interval between the pot holes is shortest, the arc shaped cutout is in contact with at least a part of a wall part of the pot hole.

(7)

According to the planting pot, further, each of a side wall part forming the receptacle area of the first-end pot piece, and a side wall part forming the receptacle area of the intermediate pot piece is provided with a protrusion, each of a side wall part forming the insertion area of the intermediate potpiece, and a side wall part forming the insertion area of the second-end potpiece is provided with a slit-shaped opening, the protrusion is capable of being moved within the slit-shaped opening, in an elongating direction or contracting direction of the planting pot, and in a state in which the interval between the pot holes is shortest, the protrusion is in contact with an end part in the longer side direction of the slit-shaped opening, within the slit-shaped opening.

(8)

According to the planting pot, further, it is capable of being housed in a planting-pot-receptacle part of the planting tray, a length of a longest elongating length of the planting pot corresponds to a length of a first side of the planting-pot-receptacle part, an integer multiple of a length of a shortest contracting length of the planting pot corresponds to a length of a second side of the planting-pot-receptacle part, and an integer multiple of a length of a width of the planting pot corresponds to the length of the second side of the planting-pot-receptacle part.

(9)

According to the planting pot, further, the first-end potpiece, the intermediate potpiece, and the second-end potpiece are provided with leg parts which are capable of being in contact with a bottom part of the planting-pot-receptacle part.

(10)

According to the planting pot, further, in a state in which the interval between the pot holes is shortest, the leg parts of different potpieces overlap with each other.

(11)

According to the planting pot, further, the leg part of the potpiece is arranged in a position where it does not overlap with the pot hole, seen from the side surface of the potpiece.

At least the following are described in the Example 2.

(1)

A nutrient solution tray, including:

a receptacle part for housing a plant, a nutrient solution-inflow area for allowing inflow of water or nutrient solution, and a nutrient solution-outflow area having at least one nutrient solution-outflow port for allowing the water or the nutrient solution to flow out, is provided, and at least the receptacle part, the nutrient solution-inflow area, and the nutrient solution-outflow area form a bottom surface of the nutrient solution tray, the nutrient solution tray includes a first installation surface pair comprising a first installation surface and a second installation surface, the first installation surface is formed in a side of the nutrient solution-inflow area in a longer side direction of the nutrient solution tray, the second installation surface is formed in a side of the nutrient solution-outflow area in the longer side direction of the nutrient solution tray, and the first installation surface is farther away from the bottom surface than the second installation surface.

(2)

According to the nutrient solution tray, further, the nutrient solution tray includes a second installation surface pair comprising a third installation surface and a fourth installation surface, the third installation surface is formed in a side of the nutrient solution-inflow area in the longer side direction of the nutrient solution tray, the fourth installation surface is formed in a side of the nutrient solution-outflow area in the longer side direction of the nutrient solution tray, and the fourth installation surface is farther away from the bottom surface than the third installation surface.

(3)

According to the nutrient solution tray, further, the nutrient solution-outflow area includes at least one projecting structure formed to project from the bottom surface of the nutrient solution-outflow area, and the projecting structure necessitates a detour of a flow of the water or the nutrient solution flowing toward the nutrient solution-outflow area.

(4)

According to the nutrient solution tray, further, the at least one projecting structure comprises a plurality of projecting structures, and the at least one nutrient solution-outflow port comprises a plurality of nutrient solution-outflow ports, and the plurality of projecting structures divide and guide the flow toward the plurality of nutrient solution-outflow ports.

(5)

According to the nutrient solution tray, further, each of side wall parts extending in the longer side direction of the nutrient solution tray is provided with a connecting structure, and the connecting structure connects two nutrient solution trays which are arranged side by side in a shorter side direction of the nutrient solution tray.

(6)

According to the nutrient solution tray, further, one of the side wall parts includes a convex-shaped connecting structure, and the other one of the side wall parts includes a concave-shaped connecting structure, and the convex-shaped connecting structure of the one of the two nutrient solution trays which are arranged side by side, and the concave-shaped connecting structure of the other of the two nutrient solution trays which are arranged side by side are to be connected with each other.

(7)

According to the nutrient solution tray, further, a plurality of shorter-side wall parts extending in the shorter side direction of the nutrient solution tray are provided in the nutrient solution-inflow area or between the receptacle part and the nutrient solution-inflow area, and a gap is provided between two of the shorter-side wall parts.

(8)

According to the nutrient solution tray, further, a plurality of longer-side wall parts extending in the longer side direction of the nutrient solution tray are provided in the receptacle part, and a flow channel for the water or the nutrient solution is provided between two of the longer-side wall parts.

(9)

According to the nutrient solution tray, further, a plurality of shorter-side wall parts extending in the shorter side direction of the nutrient solution tray are provided in the nutrient solution-inflow area or between the receptacle part and the nutrient solution-inflow area, a gap is provided between two of the shorter-side wall parts, a plurality of longer-side wall parts extending in the longer side direction of the nutrient solution tray are provided in the receptacle part, a flow channel for the water or the nutrient solution is provided between two of the longer-side wall parts, and at least one of the gaps is connected with the flow channel.

(10)

According to the nutrient solution tray, further, a plurality of pattern structures are provided in at least one of the receptacle part and the nutrient solution-inflow area, and the pattern structure causes a flow of the water or the nutrient solution to diverge or diffuse in the shorter side direction of the nutrient solution tray.

(11)

According to the nutrient solution tray, further, at least one of side wall parts of the nutrient solution tray extending in the longer side direction of the nutrient solution tray is provided with a cutout part.

(12)

According to the nutrient solution tray, further, the bottom surface is to be connected with a side wall part extending in the longer side direction of the nutrient solution tray, through a step extending in the longer side direction of the nutrient solution tray.

(13)

A spacing set that is capable of being housed in the receptacle part of the nutrient solution tray, including:

a plurality of cultivation plates that include a cultivation hole for housing a plant therein, a cultivation plate spacer, and a cultivation panel that is capable of housing at least one of the cultivation plate and the cultivation plate spacer, is provided.

(14)

According to the spacing set, further, the plurality of cultivation plates are housed in the receptacle part of the nutrient solution tray at different intervals according to an arrangements of the cultivation plate and/or the cultivation plate spacer.

(15)

According to the spacing set, further, a first integer multiple of a length of one side of the cultivation plate and the cultivation plate spacer corresponds to a length in the longer side direction of the receptacle part of the nutrient solution tray, and a second integer multiple of a length of one side of the cultivation plate and the cultivation plate spacer corresponds to a length in the shorter side direction of the receptacle part of the nutrient solution tray.

(16)

According to the spacing set, further, a third integer multiple of a length of a short side of the cultivation panel corresponds to a length in the shorter side direction of the receptacle part of the nutrient solution tray, a fourth integer multiple of a length of a long side of the cultivation panel corresponds to a length in the longer side direction of the receptacle part of the nutrient solution tray, the cultivation panel is provided with at least one opening, a fifth integer multiple of a length of one side of the cultivation plate and the cultivation plate spacer corresponds to a length in a longer side direction of the opening, and a sixth integer multiple of a length of one side of the cultivation plate and the cultivation plate spacer corresponds to a length in a shorter side direction of the opening.

(17)

According to the spacing set, further, the opening includes a first opening surface at an upper side and a second opening surface at a lower side, an area of the first opening surface is larger than an area of the second opening surface, the opening is provided with an edge area around the second opening surface, and at least a part of the cultivation plate and the cultivation plate spacer which is housed in the opening comes in contact with the edge area.

(18)

According to the spacing set, further, at a case where the plurality of cultivation plates are housed in the receptacle part, in:

a first configuration in which only the cultivation plates are housed in the receptacle part, a second configuration in which the cultivation plates and the cultivation plate spacer are housed in the receptacle part, or a third configuration in which the cultivation plates, the cultivation plate spacer, and the cultivation panel are housed in the receptacle part, and an interval of the cultivation plate in the second configuration and the third configuration is, at least partially, wider than an interval of the cultivation plates in the first configuration.

Please notice that the present invention is not limited to the above-described embodiments, and various modifications can be included. For example, the above-described embodiments have been described in detail for the purpose of illustrating the present invention easily, and are not necessarily limited to those having all the described configurations. Also, it is possible to replace a part of the configuration of one embodiment with the configuration of another embodiment, and it is also possible to add the configuration of another embodiment to the configuration of one embodiment. Further, it is possible to add, delete, or replace a part of the configuration of each embodiment with other configuration.

It should be noted that the above-described embodiments disclose at least the configurations described in the claims.

DESCRIPTION OF SIGN

100 . . . Planting unit,
101 . . . Planting pot,
102 . . . Nutrient solution tray,
103 . . . Spacer,
105 . . . Receptacle area,
701 . . . First-end potpiece,
702 . . . Second-end potpiece,
703 . . . Intermediate potpiece,
2101 . . . Bottom surface,
2104 . . . First leg part (or third installation surface),
2105 . . . Second leg part (or fourth installation surface),
2201 . . . First installation part (or first installation surface),
2202 . . . Second installation part (or second installation surface),
2401 . . . Nutrient solution-inflow area,
2403 . . . Nutrient solution-outflow area,
3600 . . . Cultivation plate,
3610 . . . Cultivation hole,
3700 . . . Cultivation plate spacer,
3800 . . . Cultivation panel,
4200 . . . Nutrient solution tray,
4920 . . . Receptacle area (or receptacle part),
4930 . . . Nutrient solution-outflow area,
4400 . . . Bottom surface

What is claimed is:

1. A nutrient solution tray, comprising:

a receptacle part for housing a plant, a nutrient solution-inflow area for allowing inflow of water or nutrient solution, and a nutrient solution-outflow area having at least one nutrient solution-outflow port for allowing the water or the nutrient solution to flow out, wherein at least the receptacle part, the nutrient solution-inflow area, and the nutrient solution-outflow area form a bottom surface positioned inside the nutrient solution tray, wherein the nutrient solution tray includes, on a surface opposite to the bottom surface, a first installation planar surface pair configured on a first geometric plane comprising a first installation planar surface and a second installation planar surface, and a second installation planar surface pair configured on a second geometric plane comprising a third installation planar surface and a fourth installation planar surface, wherein the first installation planar surface is formed in a side of the nutrient solution-inflow area in a longer side direction of the nutrient solution tray, wherein the second installation planar surface is formed in a side of the nutrient solution-outflow area in the longer side direction of the nutrient solution tray, wherein the first installation planar surface is farther away from the bottom surface than the second installation planar surface, wherein the third installation planar surface is formed in a side of the nutrient solution-inflow area in the longer side direction of the nutrient solution tray, wherein the fourth installation planar surface is formed in a side of the nutrient solution-outflow area in the longer side direction of the nutrient solution tray, wherein the fourth installation planar surface is farther away from the bottom surface than the third installation planar surface, wherein the first geometric plane, on which the first installation planar surface pair comprising the first installation planar surface and the second installation planar surface is located, extends in an inclined manner with respect to the bottom surface, wherein the second geometric plane, on which the second installation planar surface pair comprising the third installation planar surface and the fourth installation planar surface is located, extends in an inclined manner with respect to the bottom surface, and the bottom surface forms a second inclination opposite to the first inclination with respect to the second geometric plane, wherein while the nutrient solution tray is installed using the first installation planar surface pair comprising the first installation planar surface and the second installation planar surface, the bottom surface forms a first inclination with respect to the first geometric plane on which the first installation planar surface pair is located, and the nutrient solution, based on the first inclination, flows through the receptacle part from the nutrient solution-inflow area toward the nutrient solution-outflow area and flows out from the nutrient solution-outflow port; and wherein while the nutrient solution tray is installed using the second installation planar surface pair comprising the third installation planar surface and the fourth installation planar surface, the bottom surface forms a second inclination opposite to the first inclination with respect to the second geometric plane on which the second installation planar surface pair is located, and the nutrient solution, based on the second inclination, flows through the receptacle part from the nutrient solution outflow area toward the nutrient solution inflow area, and the nutrient solution-outflow port is located above a liquid level of the nutrient solution.

2. The nutrient solution tray according to claim 1, wherein the nutrient solution-outflow area includes at least one projecting structure projecting within the inside of the nutrient solution tray from the bottom surface of the nutrient solution-outflow area, and wherein the projecting structure has a shape that, when the water or the nutrient solution flowing toward the nutrient solution-outflow area comes into contact with the projecting structure, the flow is caused to bypass along the projecting structure.

3. The nutrient solution tray according to claim 2, wherein the at least one projecting structure comprises a plurality of projecting structures projecting within the inside of the nutrient solution tray from the bottom surface of the nutrient solution-outflow area, and the at least one nutrient solution outflow port comprises a plurality of nutrient solution-outflow ports, wherein the at least one projecting structure comprises a plurality of projecting structures that have a shape such that when the water or the nutrient solution comes into contact with the projecting structures, the flow is divided along the projecting structures, and wherein the plurality of projecting structures are arranged at positions that guide the flow toward the plurality of nutrient solution-outflow ports.

4. The nutrient solution tray according to claim 1, further comprising a plurality of side wall parts extending in the longer side direction of the nutrient solution tray, wherein each of the side wall parts includes a connecting structure projecting outward in a shorter side direction of the nutrient solution tray, wherein the connecting structures connect two nutrient solution trays arranged side by side in the shorter side direction of the nutrient solution tray, wherein one of the side wall parts includes a convex-shaped connecting structure, wherein the other of the side wall parts includes a concave-shaped connecting structure designed to receive the convex-shaped connecting structure, and wherein the two adjacent nutrient solution trays are connected to each other by a convex-shaped connecting structure of one of the nutrient solution trays being received within a concave-shaped connecting structure of the other of the two nutrient solution tray.

5. The nutrient solution tray according to claim 1, wherein a plurality of shorter-side wall parts are provided in the nutrient solution-inflow area or between the receptacle part and the nutrient solution-inflow area, wherein the plurality of shorter-side wall parts extend in the shorter side direction of the nutrient solution tray, project within the inside of the nutrient solution tray from the bottom surface of the nutrient solution outflow area, and are arranged side by side in the shorter side direction, and wherein a gap aligned with the shorter-side wall parts in the shorter side direction is provided between two of the shorter-side wall parts.

6. The nutrient solution tray according to claim 1, wherein a plurality of shorter-side wall parts are provided in the nutrient solution-inflow area or between the receptacle part and the nutrient solution-inflow area, wherein the plurality of shorter-side wall parts extend in the shorter side direction of the nutrient solution tray, project within the inside of the nutrient solution tray from the bottom surface of the nutrient solution outflow area, and are arranged side by side in the shorter side direction, wherein a gap aligned with the shorter-side wall parts in the shorter side direction next to the shorter-side wall parts is provided between two of the shorter-side wall parts, wherein a plurality of longer-side wall parts extending in the longer side direction of the nutrient solution tray are provided in the receptacle part, wherein a flow channel for the water or the nutrient solution is provided between two of the longer-side wall parts, and wherein at least one of the gaps is connected with the flow channel.

7. The nutrient solution tray according to claim 1, wherein a plurality of pattern structures projecting within the inside of the nutrient solution tray from the bottom surface of the nutrient solution outflow area are provided in at least one of the receptacle part and the nutrient solution-inflow area, wherein the pattern structures are arranged with spacing in both the longer side direction and the shorter side direction of the nutrient solution tray at an inclination with respect to both the longer side direction and the shorter side direction, so that the pattern structures cause the flow of the water or the nutrient solution to diverge or diffuse in the shorter side direction of the nutrient solution tray.

8. The nutrient solution tray according to claim 1, further comprising a plurality of side wall parts extending in the longer side direction of the nutrient solution tray, wherein at least one of the side wall parts includes a cutout part that is formed on a side of the nutrient solution outflow area of the side wall parts in the longer side direction of the nutrient solution tray, the cutout part extending downward from an upper edge of the side wall part toward the bottom surface in a height direction of the nutrient solution tray.

9. The nutrient solution tray according to claim 1, further comprising:

a plurality of side wall parts; and a step portion extending in the longer side direction of the nutrient solution tray, wherein the step portion extends outward in a shorter side direction of the nutrient solution tray, is connected with the bottom surface at an inner side in the shorter side direction of the nutrient solution tray, and is connected with the side wall part at an outer side in the shorter side direction of the nutrient solution tray.

10. The nutrient solution tray according to claim 9, further comprising a cultivation panel removably housed in the receptacle part, wherein the cultivation panel includes:

a leg part that contacts the bottom surface; and a top surface part positioned above a height where the step portion is connected with the side wall part and having a length in the shorter side direction corresponding to at least a length of the receptacle part in the shorter side direction, whereby the cultivation panel reduces an amount of incident light directed toward the bottom surface of the receptacle part, wherein the cultivation panel has at least one opening for housing a plant, the opening having an upper first opening surface and a lower second opening surface, wherein an area of the first opening surface is larger than an area of the second opening surface, and wherein the opening includes an edge portion connecting the first opening surface and the second opening surface around the second opening surface.

11. The nutrient solution tray according to claim 10, further comprising at least one of a cultivation plate and a cultivation plate spacer, wherein the opening removably houses at least one of the cultivation plate and the cultivation plate spacer, and wherein a length, in the longer side direction of the nutrient solution tray, of at least one of the cultivation plate and the cultivation plate spacer in a state of being housed in the opening is, as viewed in a direction perpendicular to the bottom surface, shorter than a length of the first opening surface in the longer side direction of the nutrient solution tray, and longer than a length of the second opening surface in the longer side direction of the nutrient solution tray.

* * * * *